(12) United States Patent
Bae et al.

(10) Patent No.: US 12,181,210 B2
(45) Date of Patent: Dec. 31, 2024

(54) VACUUM ADIABATIC BODY AND REFRIGERATOR

(71) Applicant: LG ELECTRONICS INC., Seoul (KR)

(72) Inventors: Jaehyun Bae, Seoul (KR); Wonyeong Jung, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 17/620,071

(22) PCT Filed: Jul. 8, 2020

(86) PCT No.: PCT/KR2020/008966
§ 371 (c)(1),
(2) Date: Dec. 16, 2021

(87) PCT Pub. No.: WO2021/006639
PCT Pub. Date: Jan. 14, 2021

(65) Prior Publication Data
US 2022/0307760 A1    Sep. 29, 2022

(30) Foreign Application Priority Data

Jul. 9, 2019    (KR) .................. 10-2019-0082641

(51) Int. Cl.
*F25D 23/06* (2006.01)
*F25D 17/06* (2006.01)

(52) U.S. Cl.
CPC ......... *F25D 23/069* (2013.01); *F25D 17/065* (2013.01); *F25D 2201/14* (2013.01); *F25D 2317/067* (2013.01)

(58) Field of Classification Search
CPC .... F25D 23/069; F25D 23/067; F25D 23/066; F25D 23/068; F25D 17/065;
(Continued)

(56) References Cited

U.S. PATENT DOCUMENTS 5,512,345 A    4/1996  Tsutsumi et al.
2004/0226956 A1   11/2004  Brooks
(Continued)

FOREIGN PATENT DOCUMENTS

CN    1952543    4/2007
CN    107421201   12/2017
(Continued)

OTHER PUBLICATIONS

Chinese Office Action dated Apr. 26, 2023 issued in Application No. 202080049787.4.
Extended European Search Report dated Jun. 12, 2023 issued in Application No. 20836297.0.
(Continued)

*Primary Examiner* — Miguel A Diaz
(74) *Attorney, Agent, or Firm* — KED & ASSOCIATES, LLP

(57) ABSTRACT

Provided is a vacuum adiabatic body. The vacuum adiabatic body includes a mullion configured to divide the first space into two spaces and a connection pipe supported on the mullion so as to be fixed in position, the connection pipe being configured to connect the two space to each other. According to the embodiment, the vacuum adiabatic body may increase in strength, and also, a passing path of defrosting water may be secured.

20 Claims, 45 Drawing Sheets

(58) Field of Classification Search
CPC ........... F25D 2201/14; F25D 2317/067; F25D 2317/0671; F25D 2317/0672; F25D 2317/066; F25D 2317/0664; F25D 2317/0665; F25D 2317/0666; F25D 2317/0667

See application file for complete search history.

(56) References Cited

U.S. PATENT DOCUMENTS

| | | | |
|---|---|---|---|
| 2012/0118002 | A1 | 5/2012 | Kim et al. |
| 2015/0030800 | A1 | 1/2015 | Jung et al. |
| 2017/0370632 | A1 | 12/2017 | Jeong et al. |
| 2018/0087814 | A1* | 3/2018 | Han .................. F25D 17/065 |
| 2018/0087822 | A1 | 3/2018 | Han et al. |
| 2018/0087823 | A1* | 3/2018 | Han .................. F25D 11/02 |
| 2018/0224193 | A1 | 8/2018 | Jung et al. |
| 2018/0238610 | A1 | 8/2018 | Jung et al. |
| 2020/0370819 | A1 | 11/2020 | Kim et al. |
| 2020/0386471 | A1* | 12/2020 | Kang .................. F25D 23/00 |

FOREIGN PATENT DOCUMENTS

| | | |
|---|---|---|
| EP | 2869006 | 5/2015 |
| JP | 2012-063022 | 3/2012 |
| KR | 10-1998-0003375 | 3/1998 |
| KR | 10-0343719 | 7/2002 |
| KR | 10-2003-0042736 | 6/2003 |
| KR | 10-2004-0048766 | 6/2004 |
| KR | 10-2007-0075835 | 7/2007 |
| KR | 10-2015-0012712 | 2/2015 |
| KR | 10-2017-0016187 | 2/2017 |
| KR | 10-2019-0070753 | 6/2019 |
| KR | 10-2019-0070791 | 6/2019 |
| WO | WO 2019/117599 | 6/2019 |
| WO | WO 2019/117600 | 6/2019 |

OTHER PUBLICATIONS

International Search Report and Written Opinion dated Sep. 29, 2020 issued in PCT Application No. PCT/KR2020/008966.
Chinese Notice of Allowance dated Oct. 12, 2023 issued in Application No. 202080049787.4.

* cited by examiner

[Fig. 1]
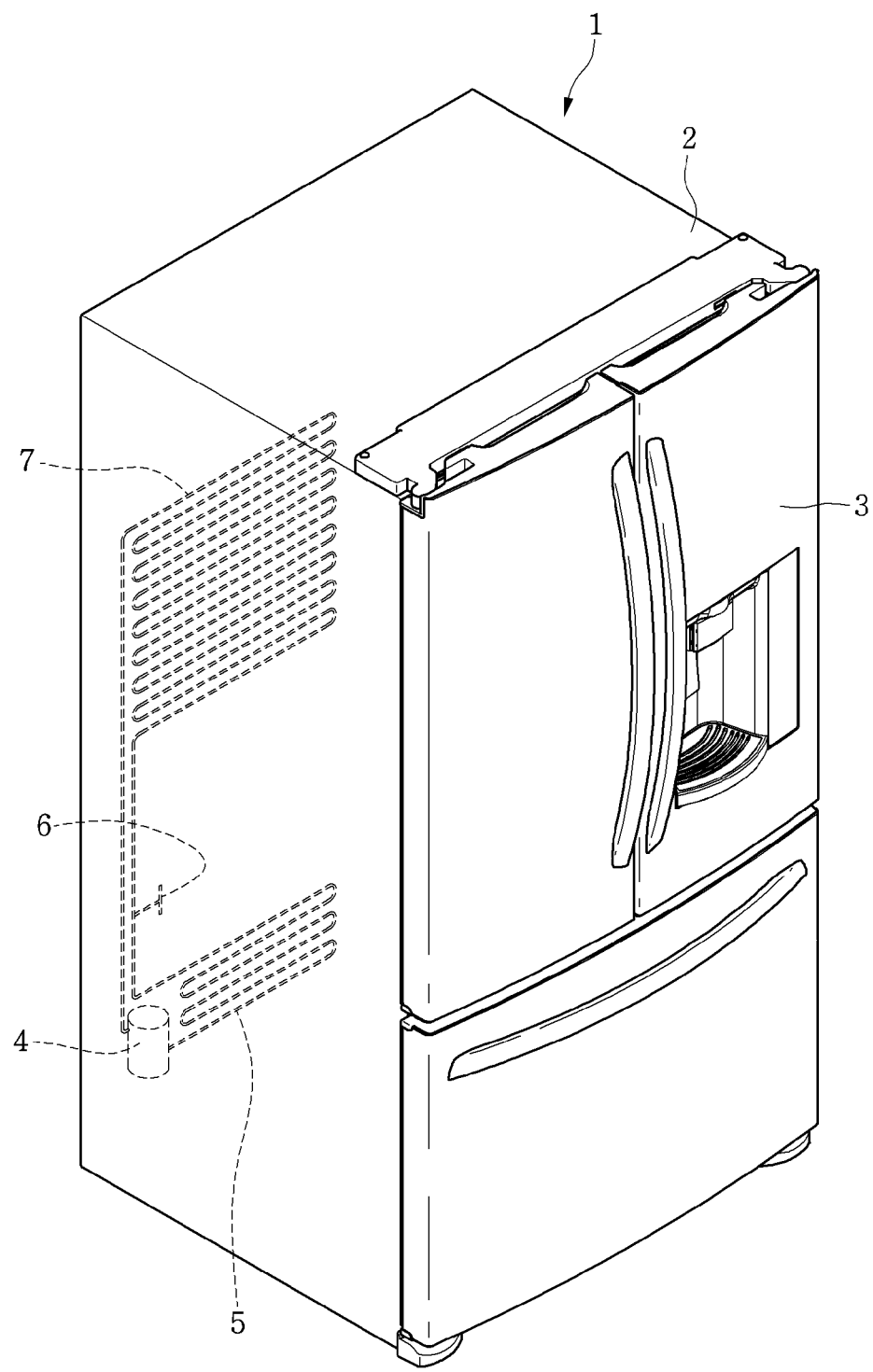

[Fig. 2]
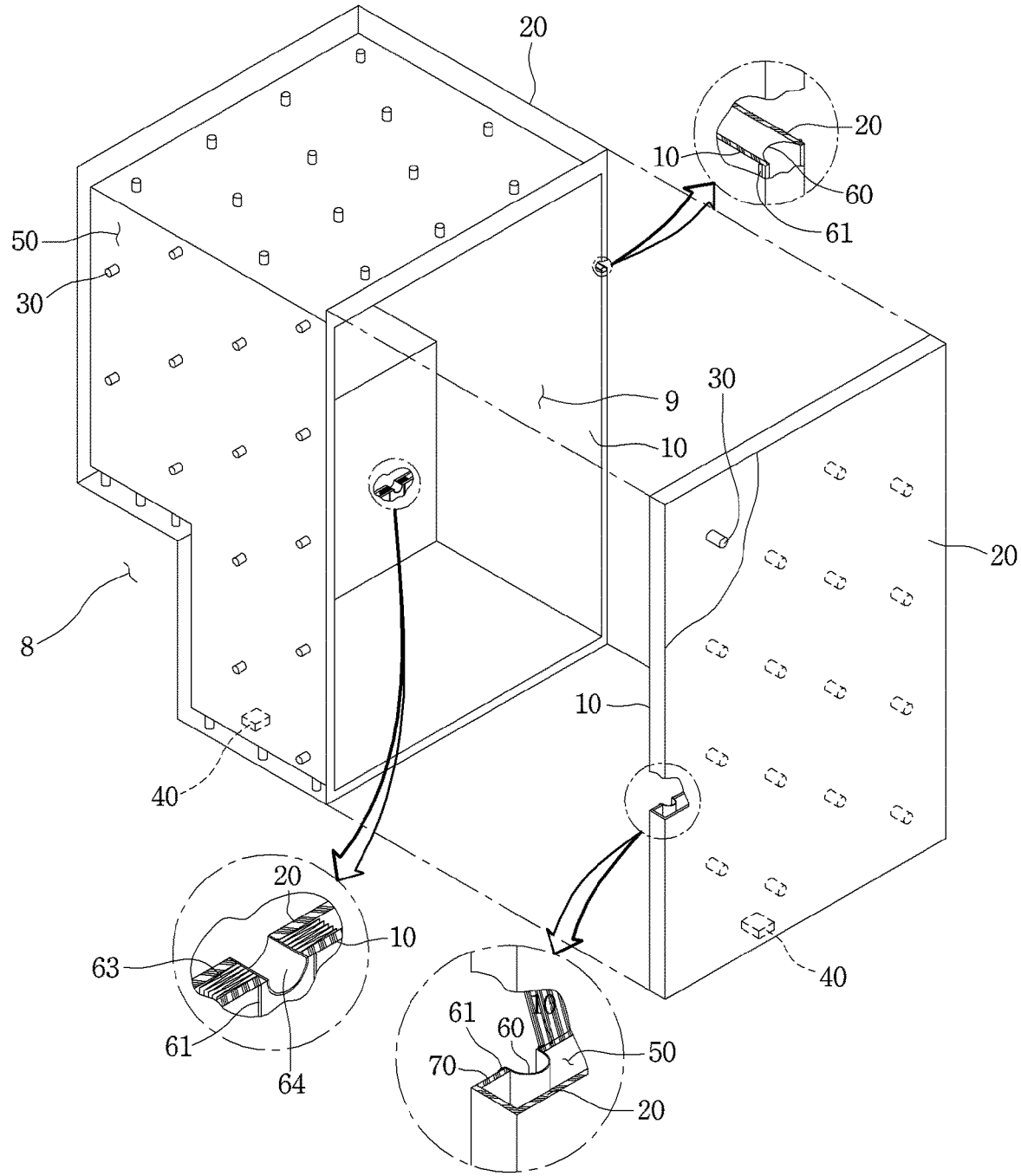

[Fig. 3]
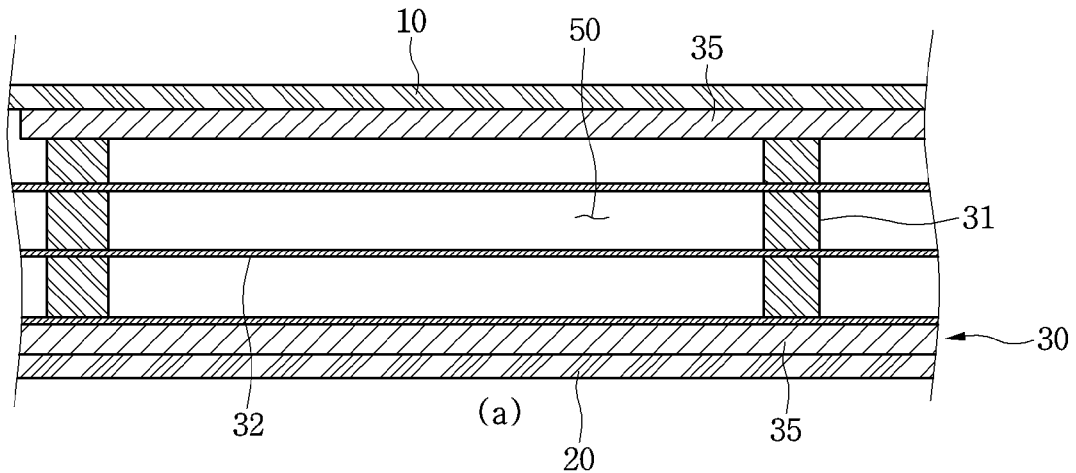
(a)
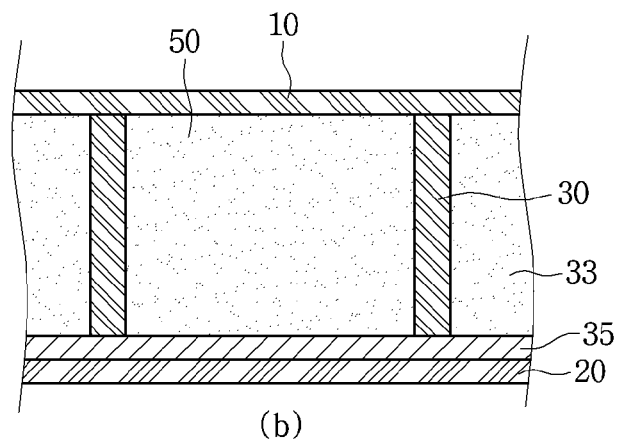
(b)
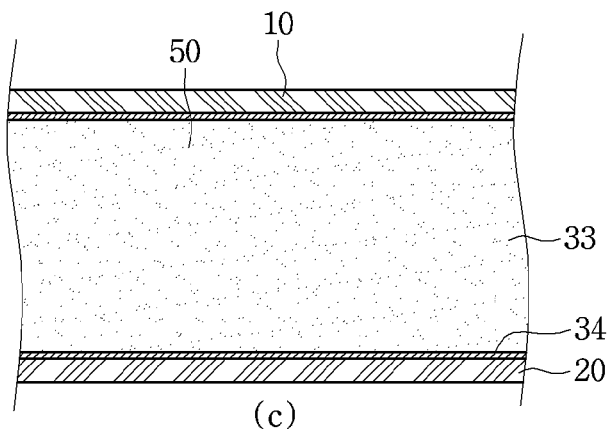
(c)

[Fig. 4]
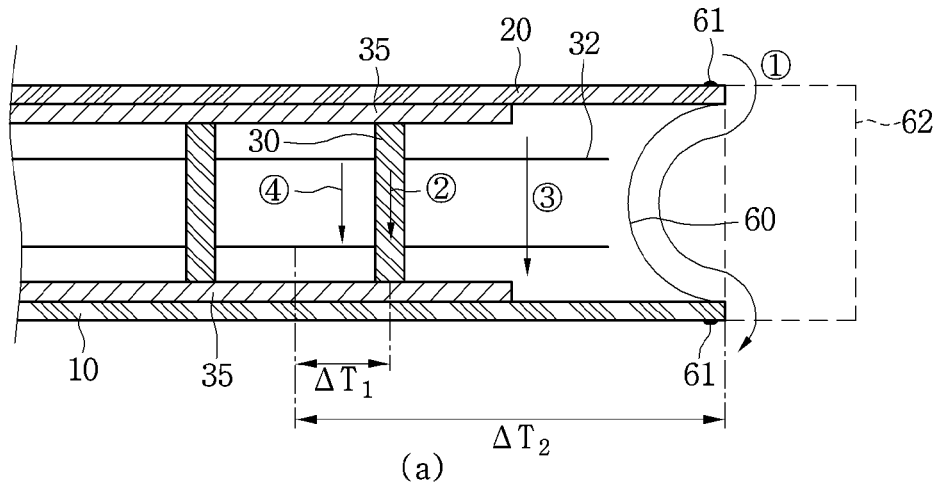
(a)
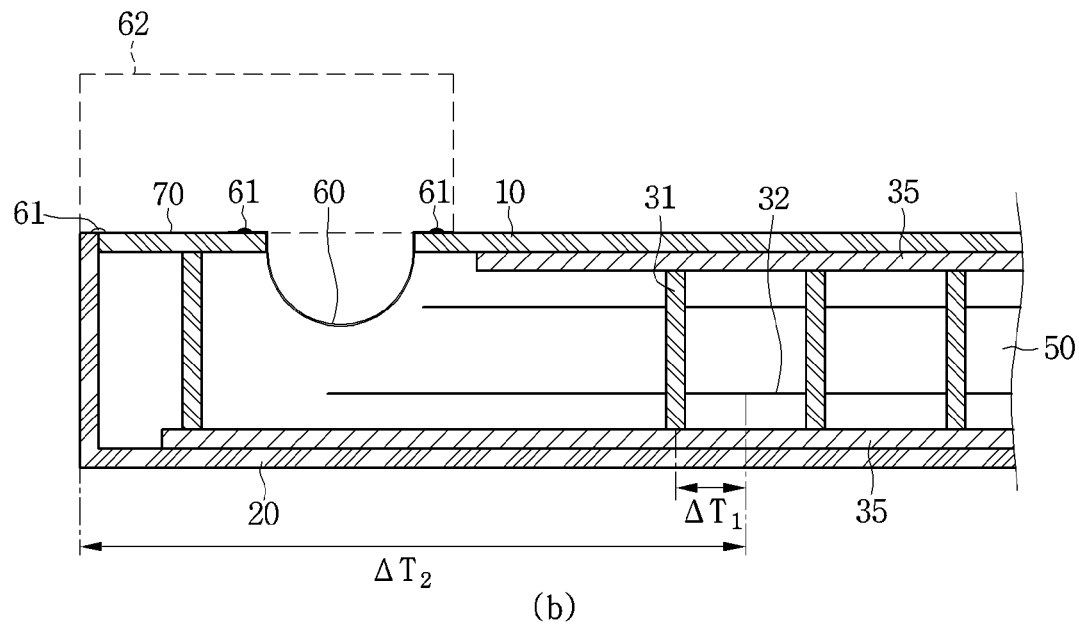
(b)
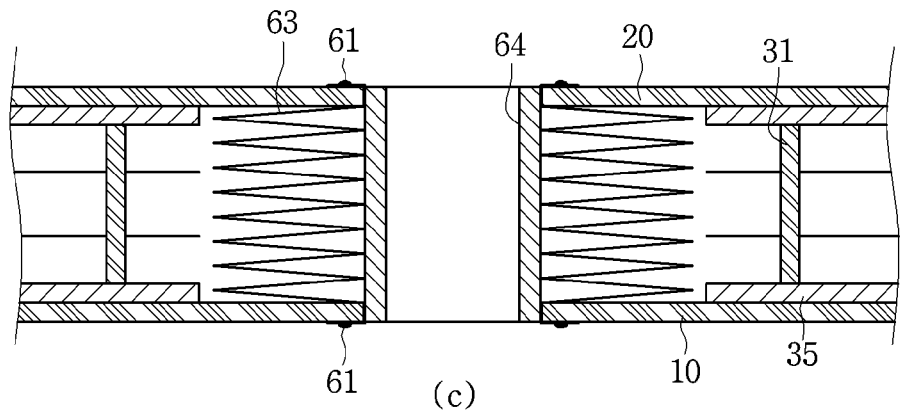
(c)

[Fig. 5]
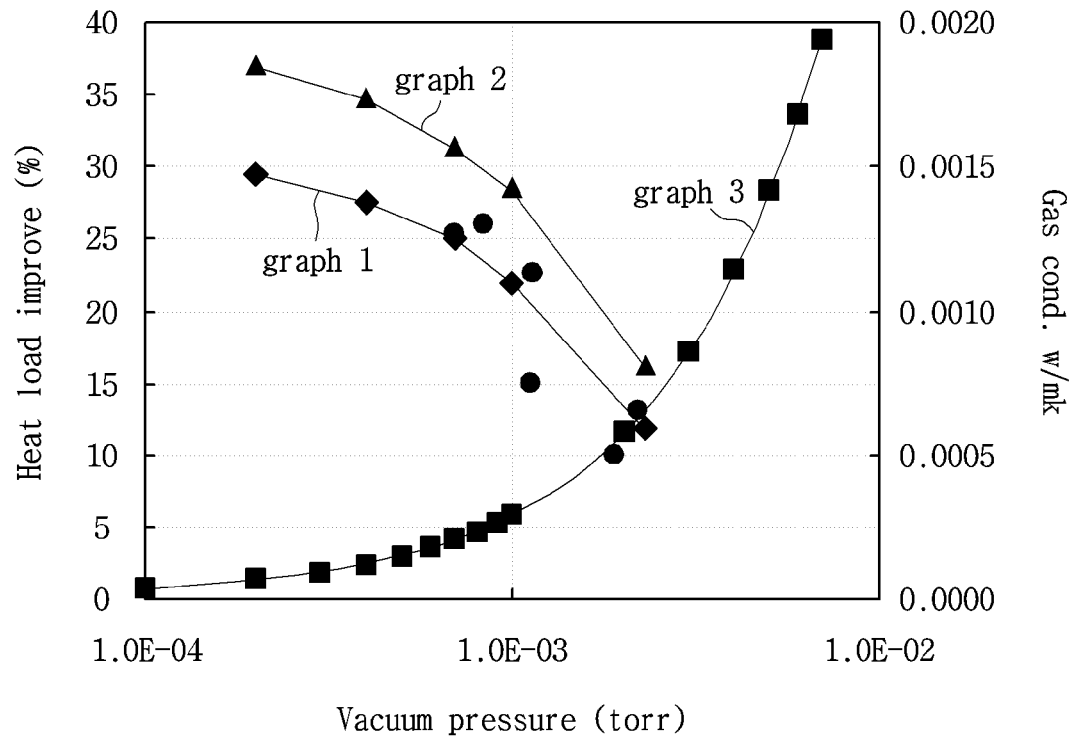
[Fig. 6]
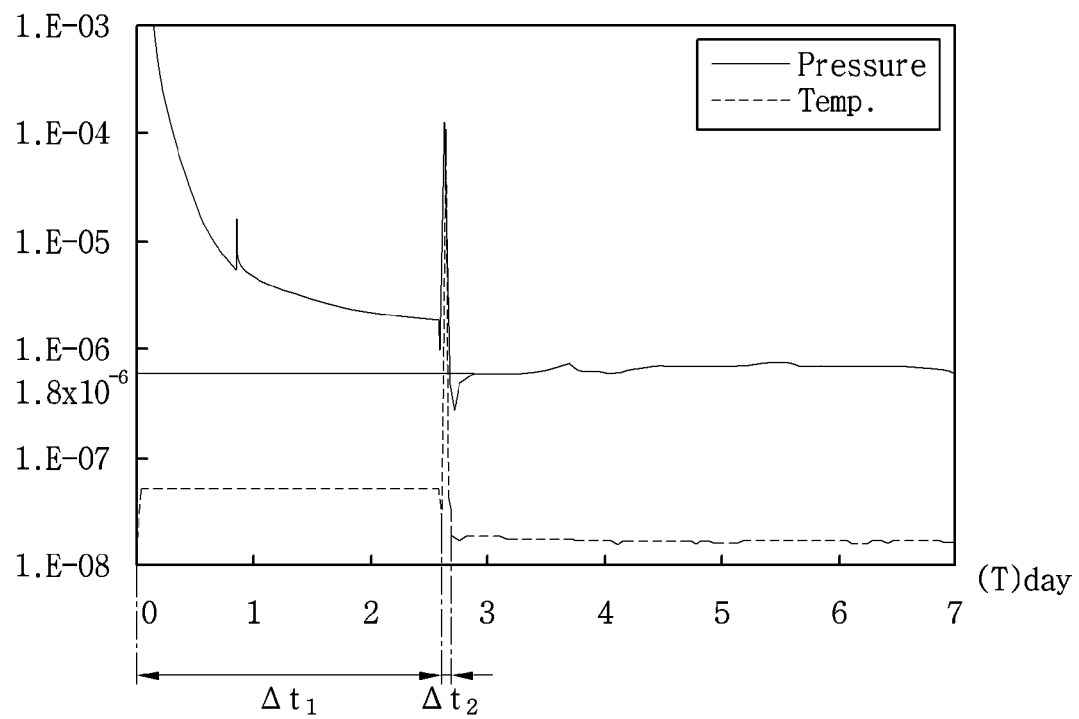

[Fig. 7]
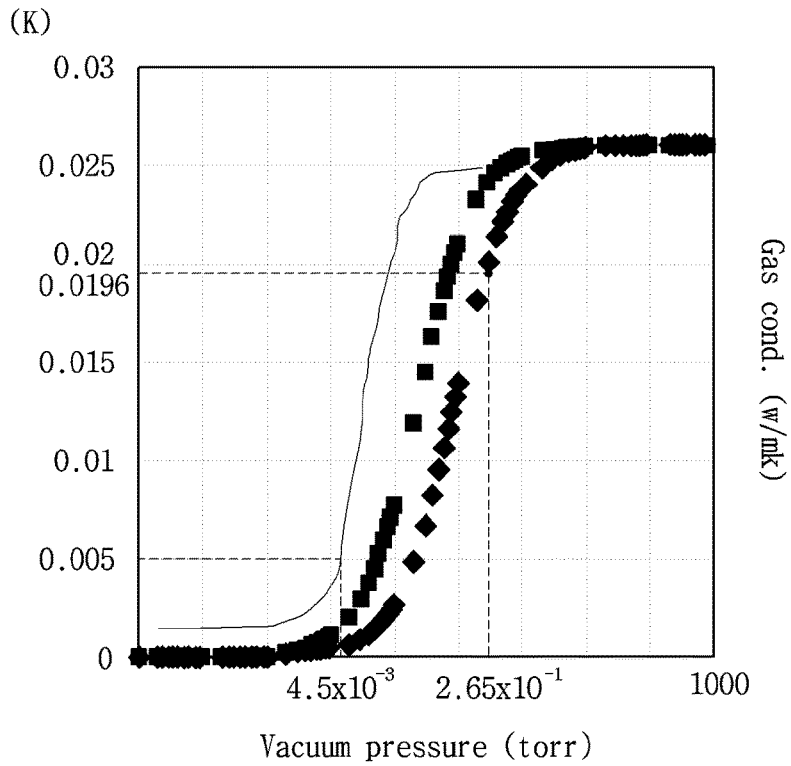
[Fig. 8]
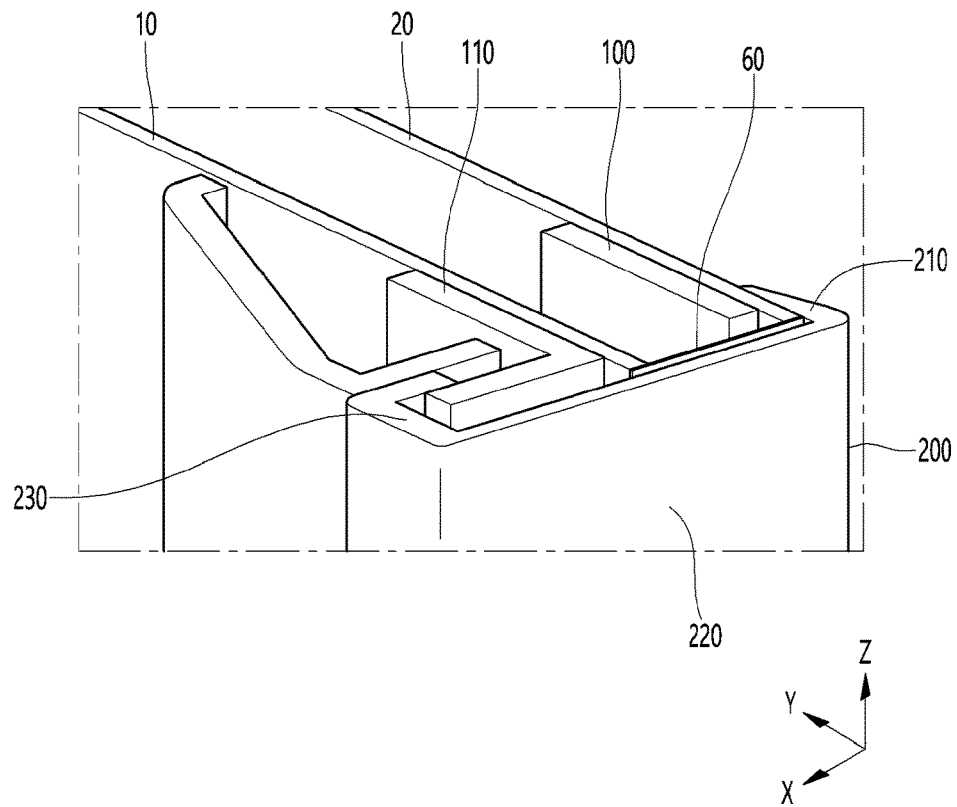

[Fig. 9]
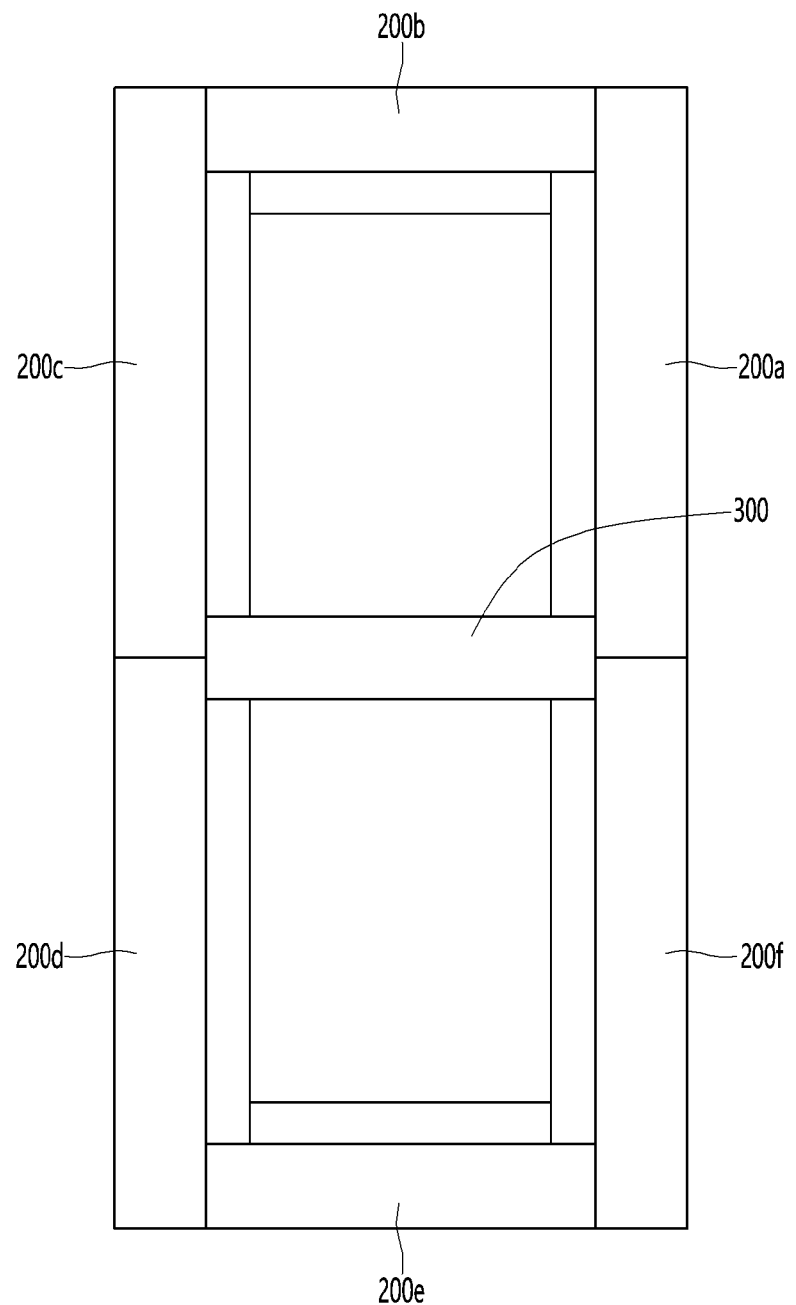

[Fig. 10]
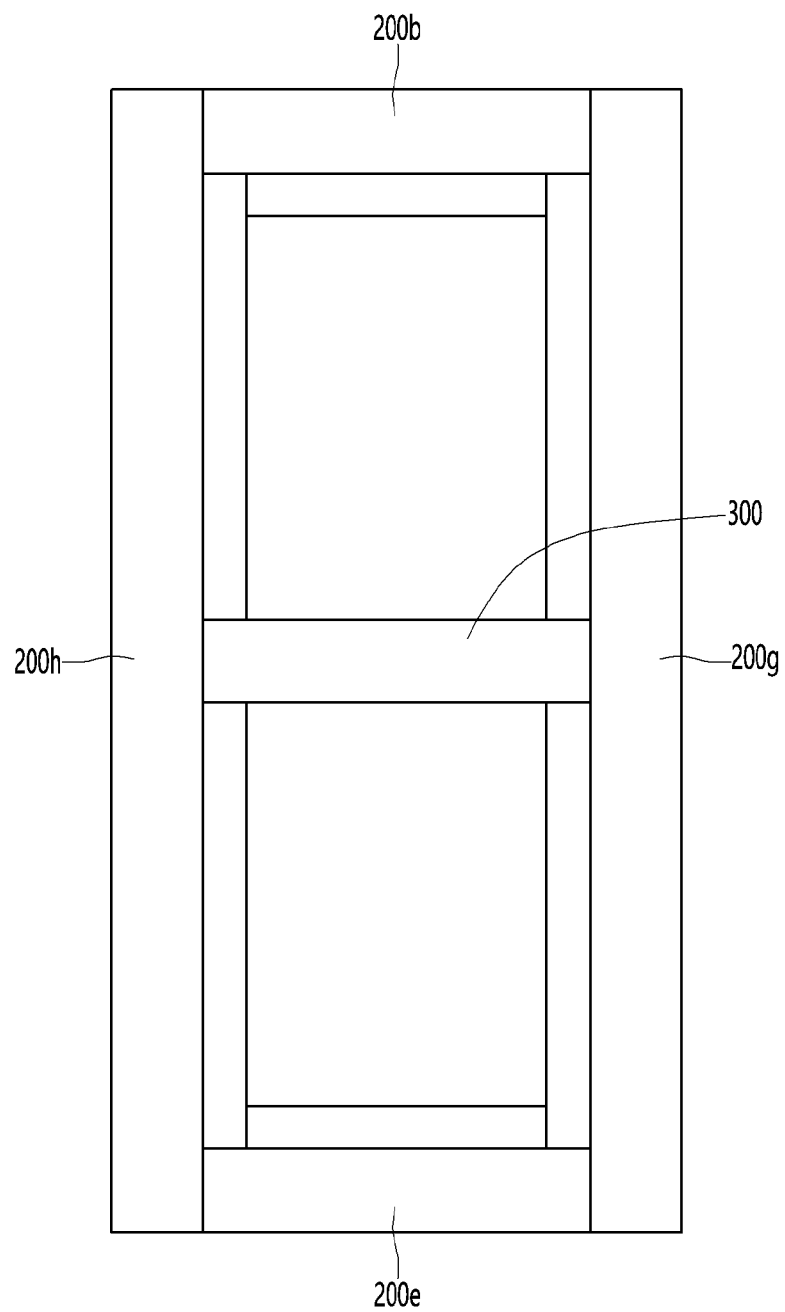

[Fig. 11]
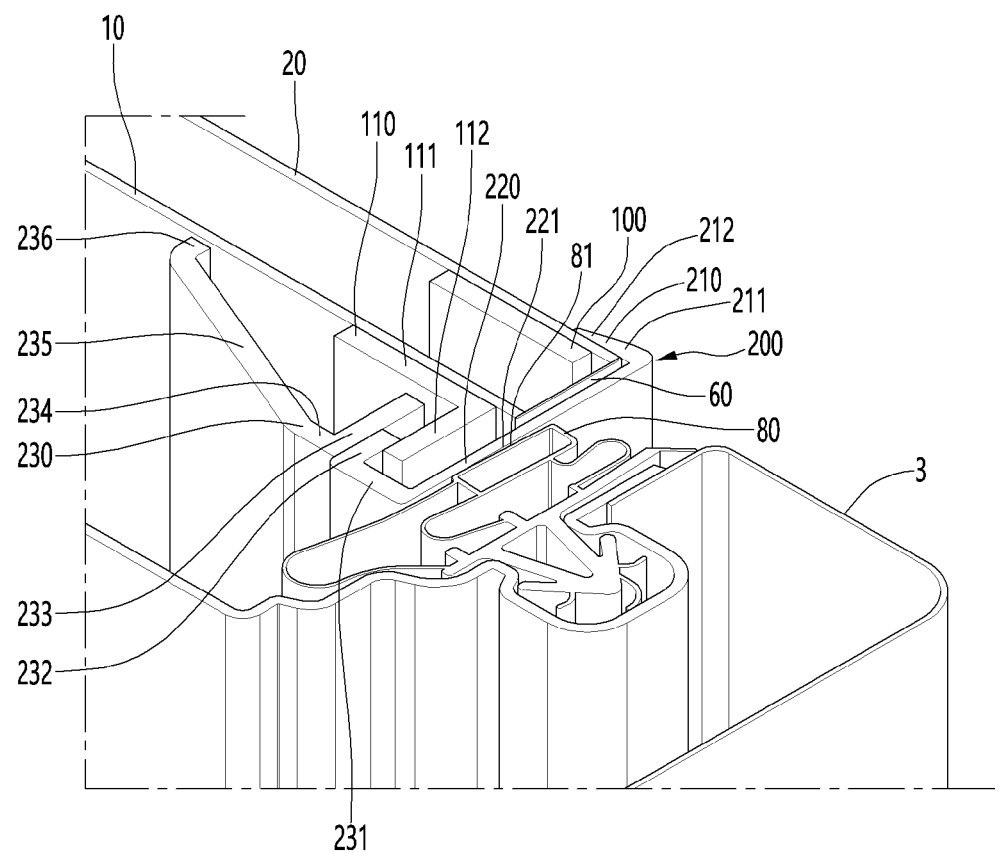

[Fig. 12]
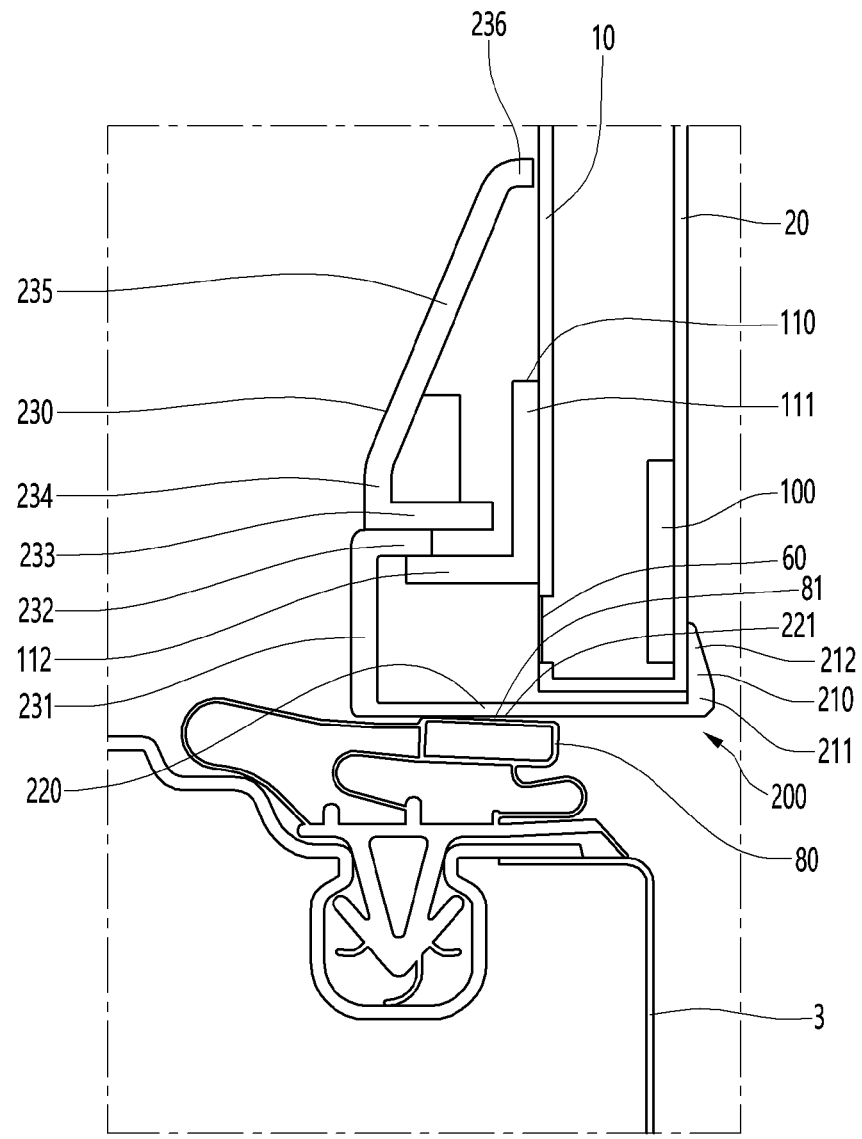

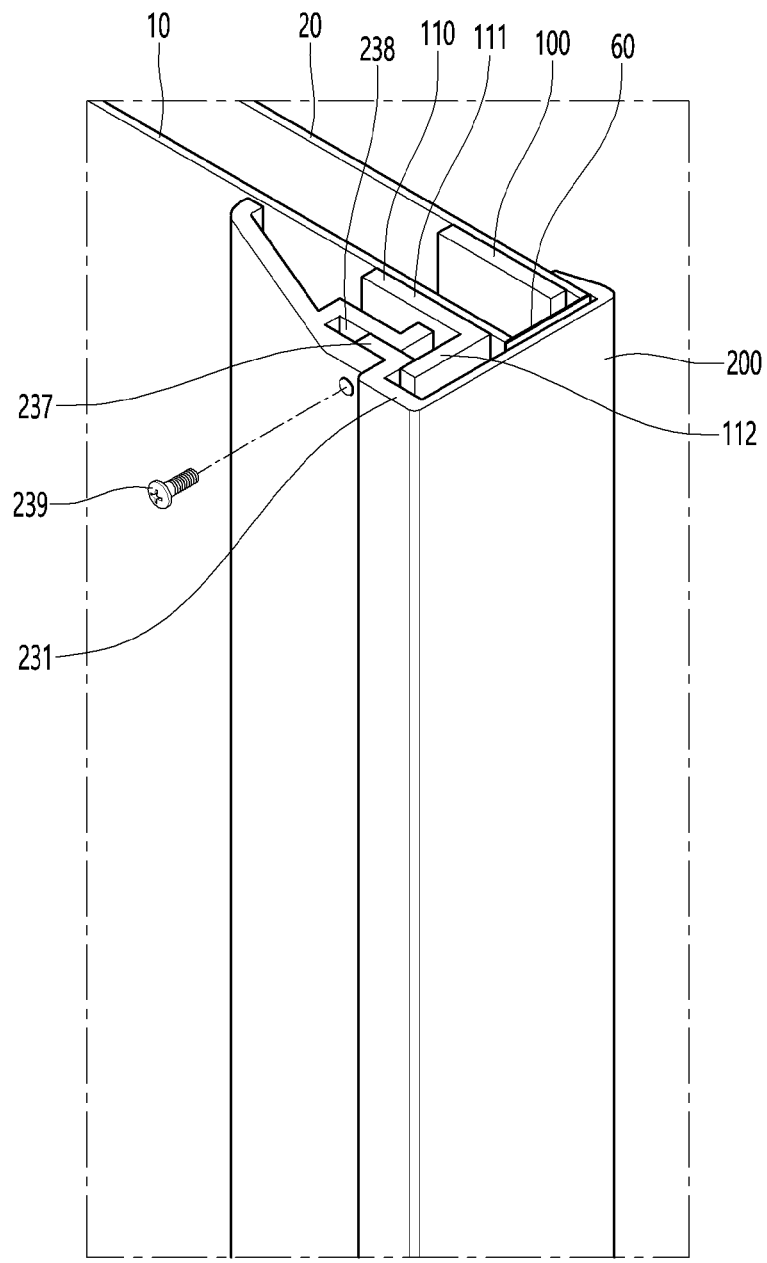
[Fig. 13]

[Fig. 14]
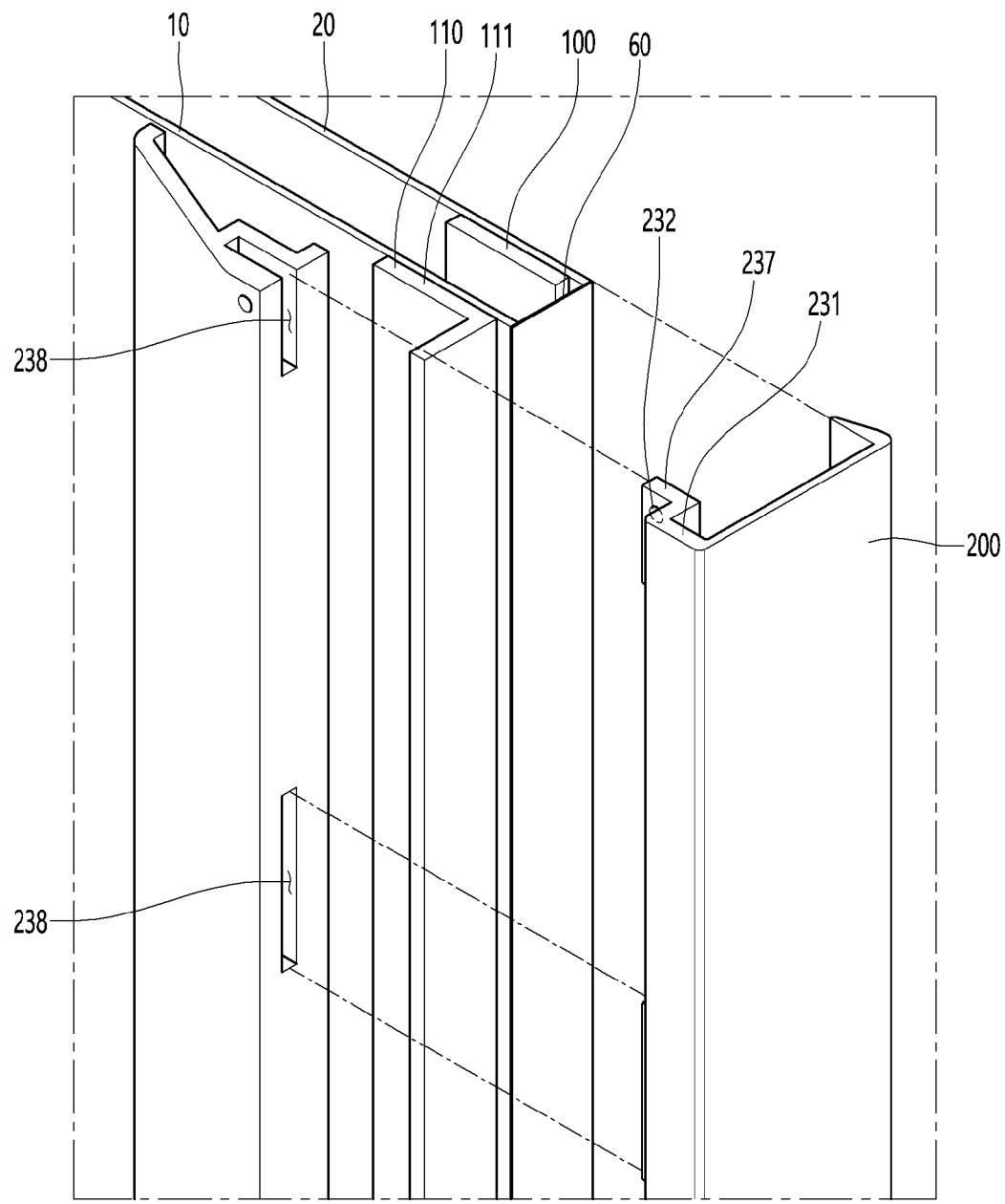

[Fig. 15]
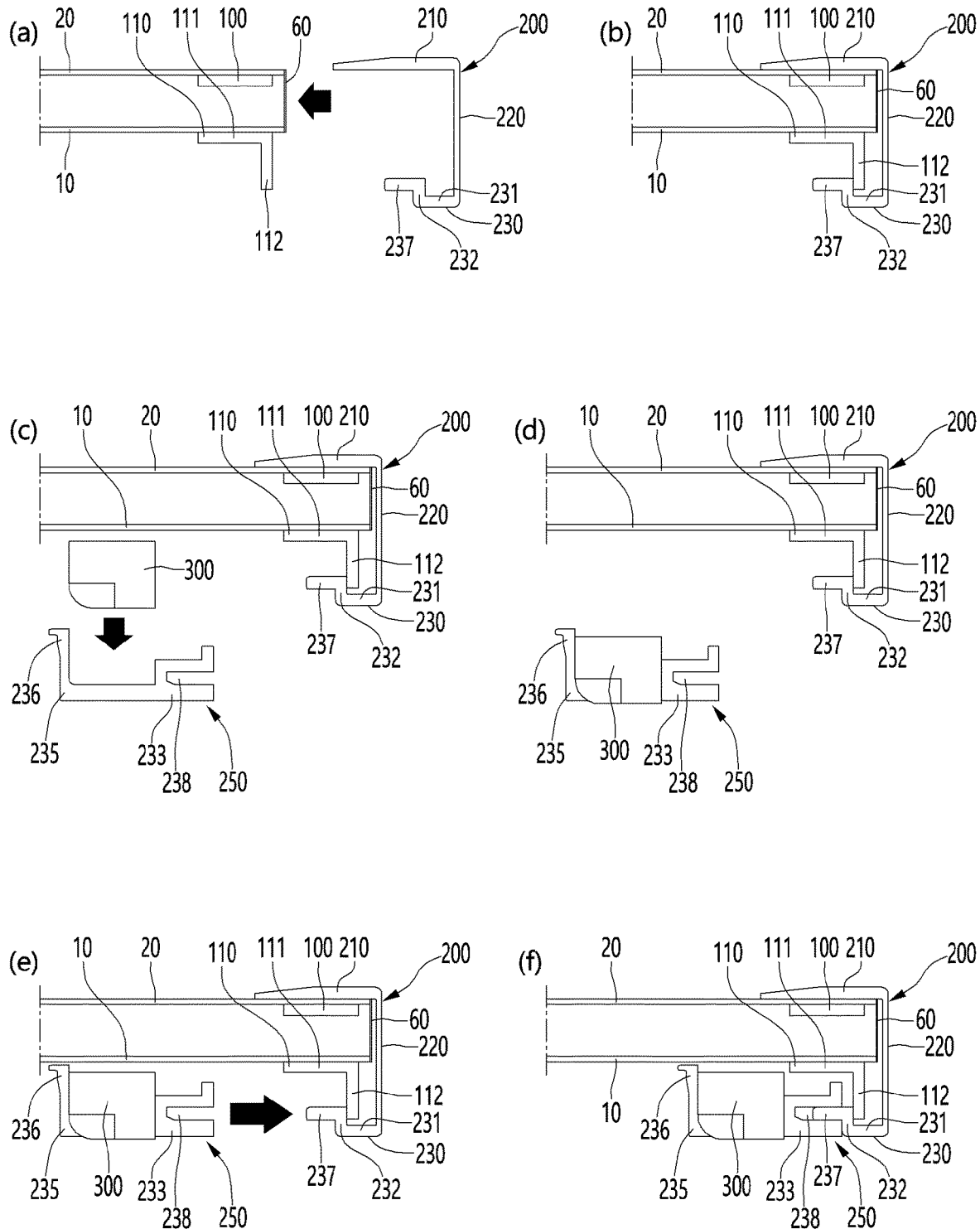

[Fig. 16]
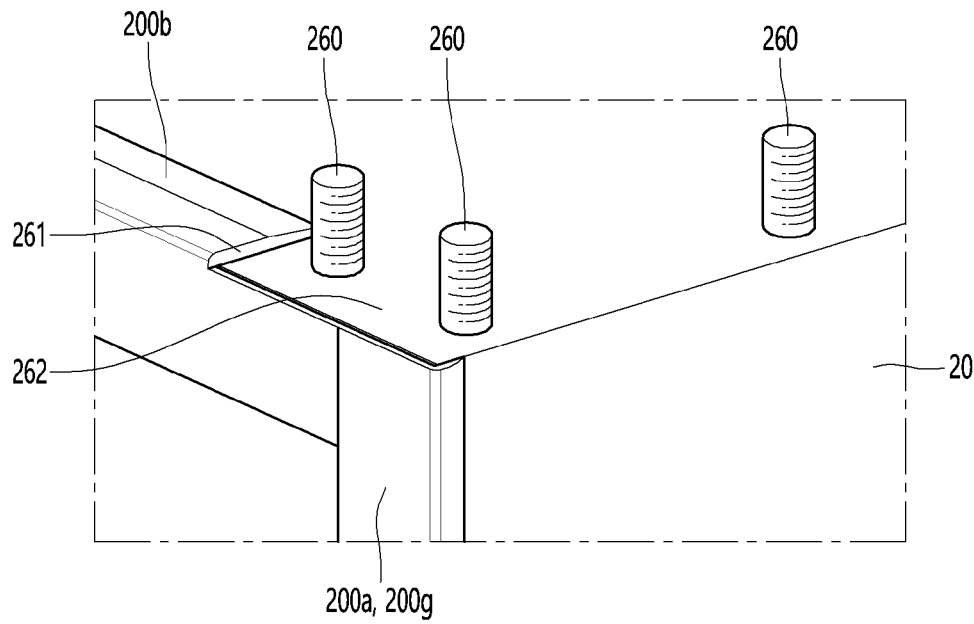
[Fig. 17]
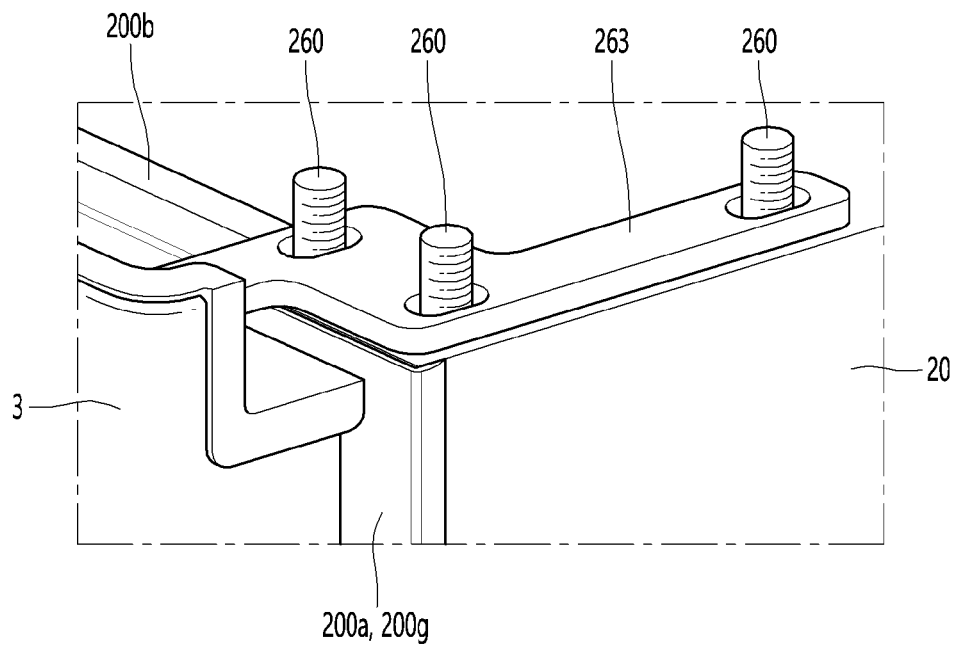

[Fig. 18]
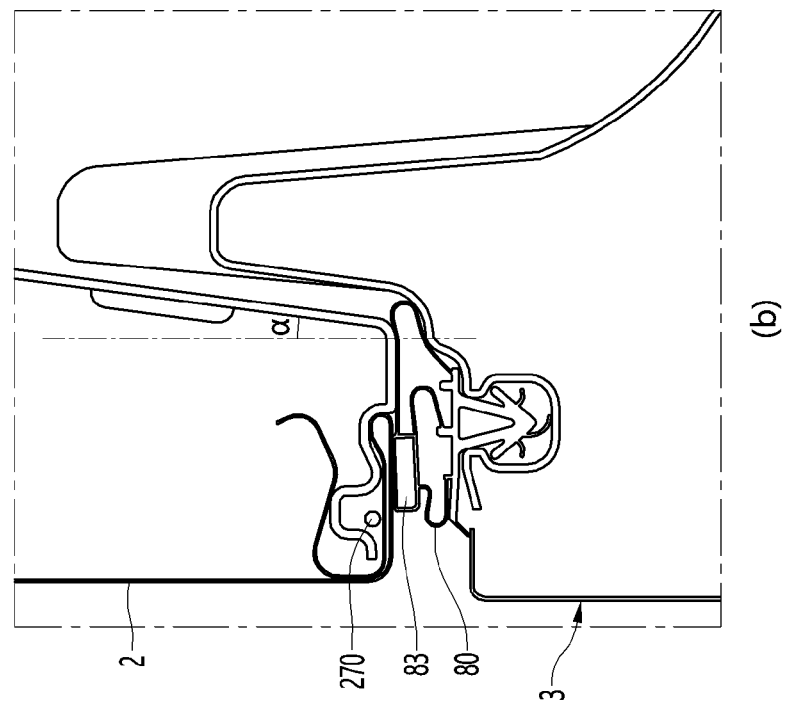
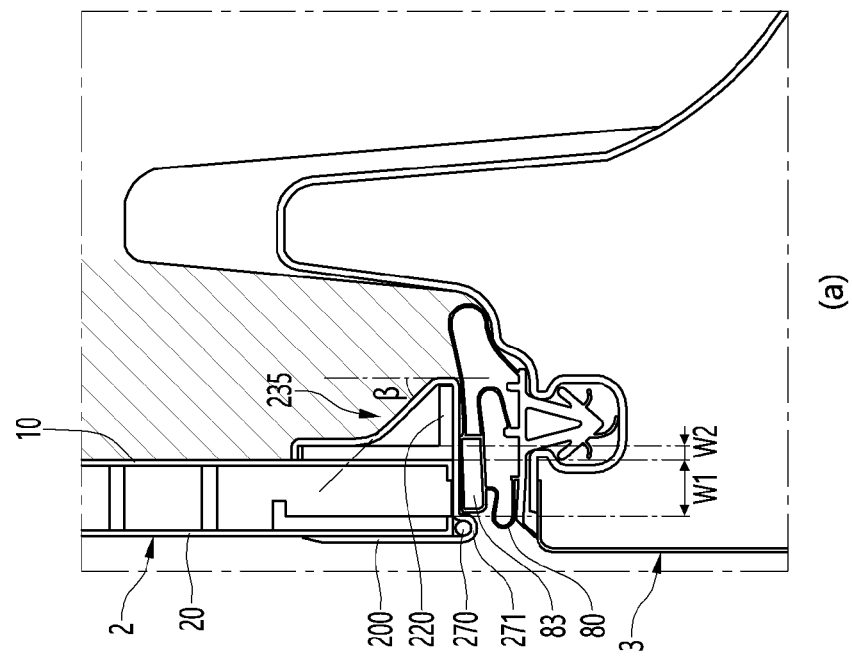

[Fig. 19]
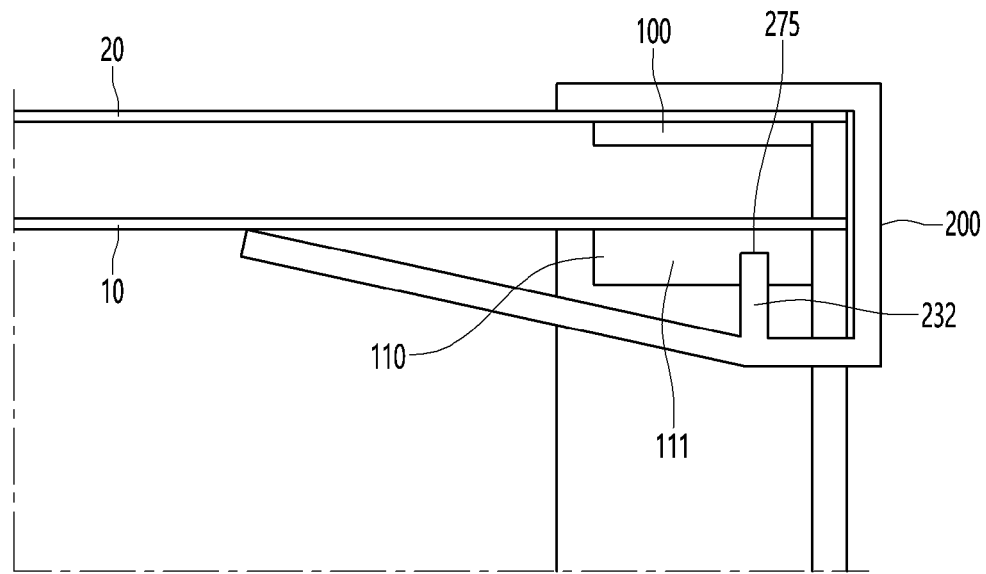
[Fig. 20]
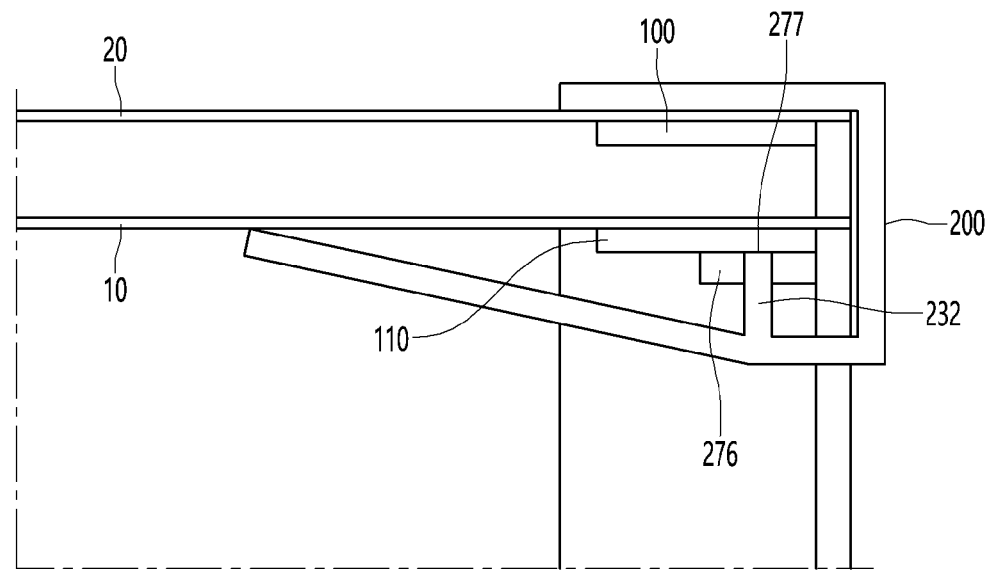

[Fig. 21]
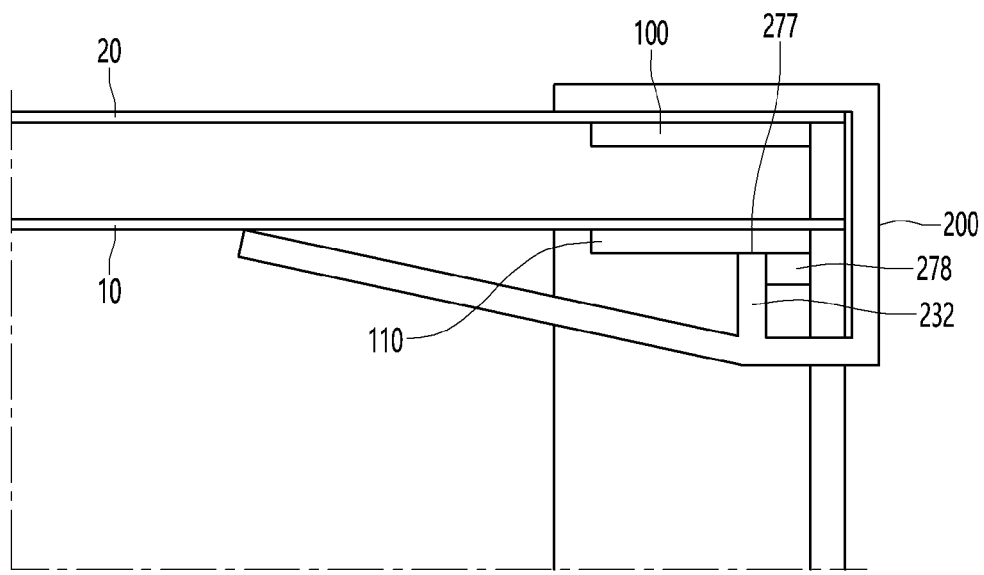
[Fig. 22]
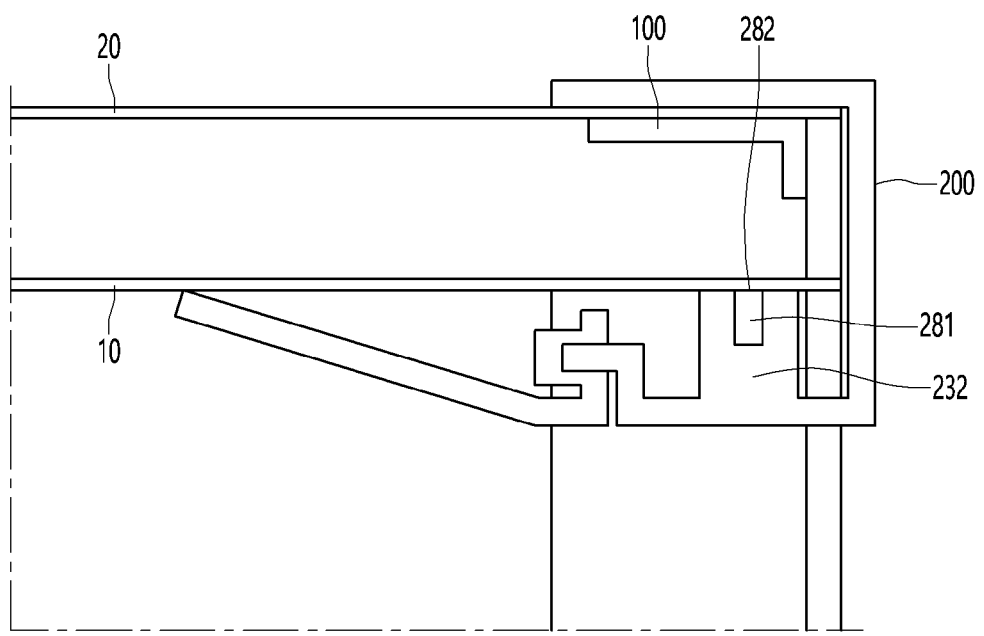

[Fig. 23]
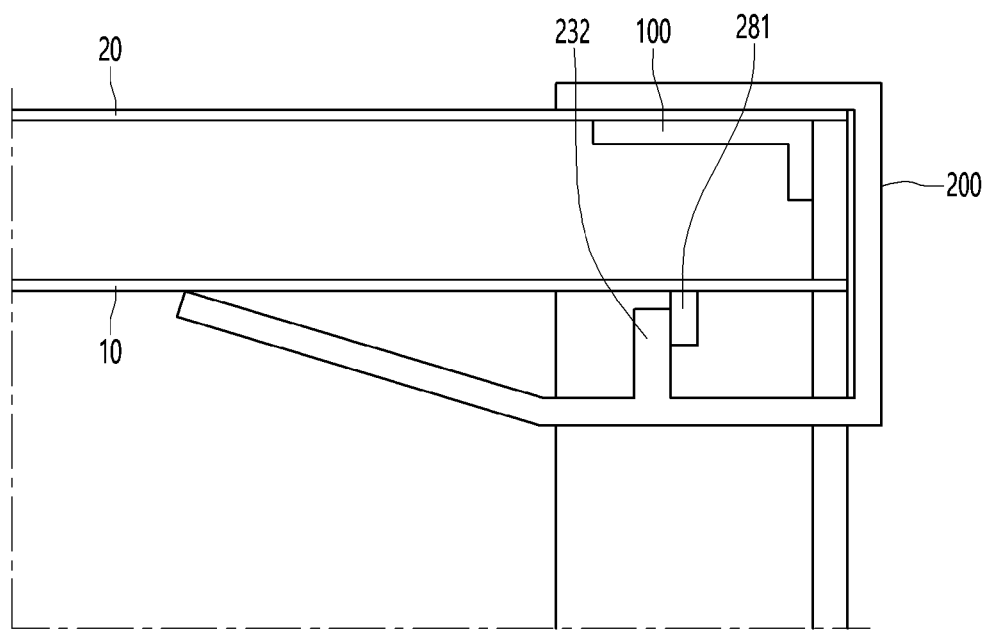
[Fig. 24]
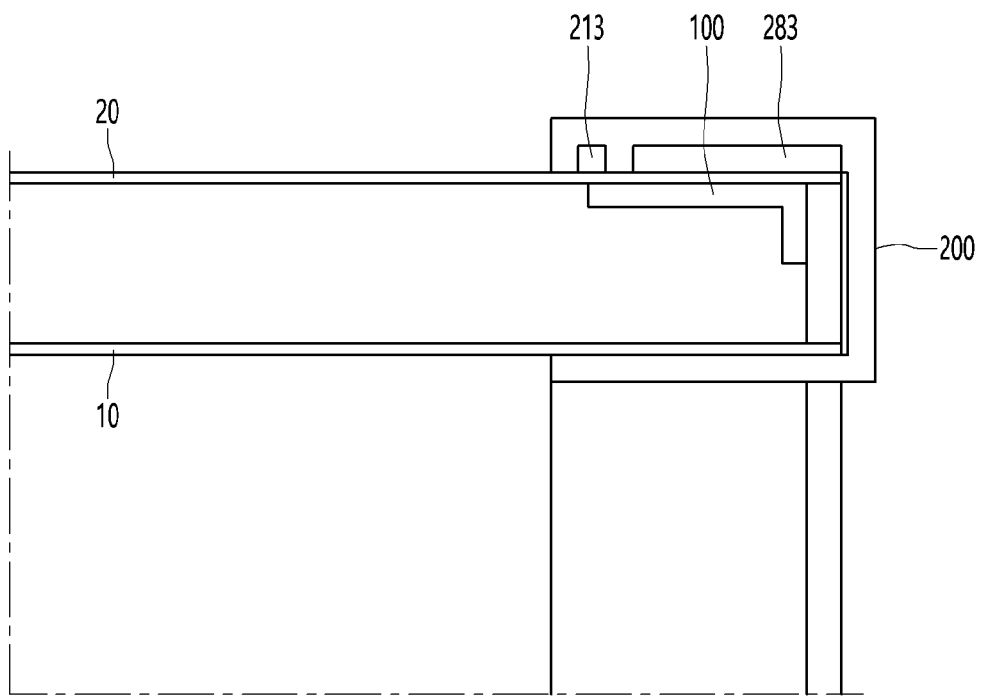

[Fig. 25]
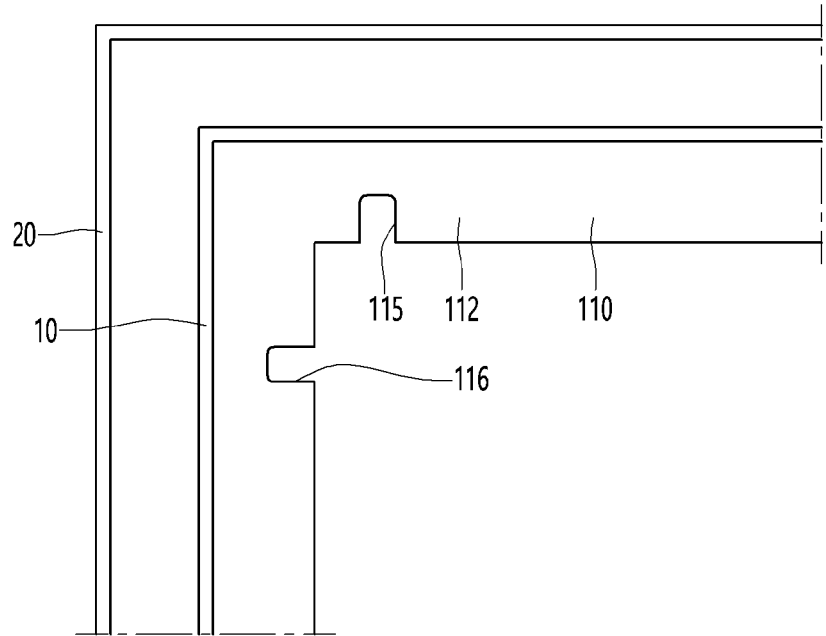
[Fig. 26]
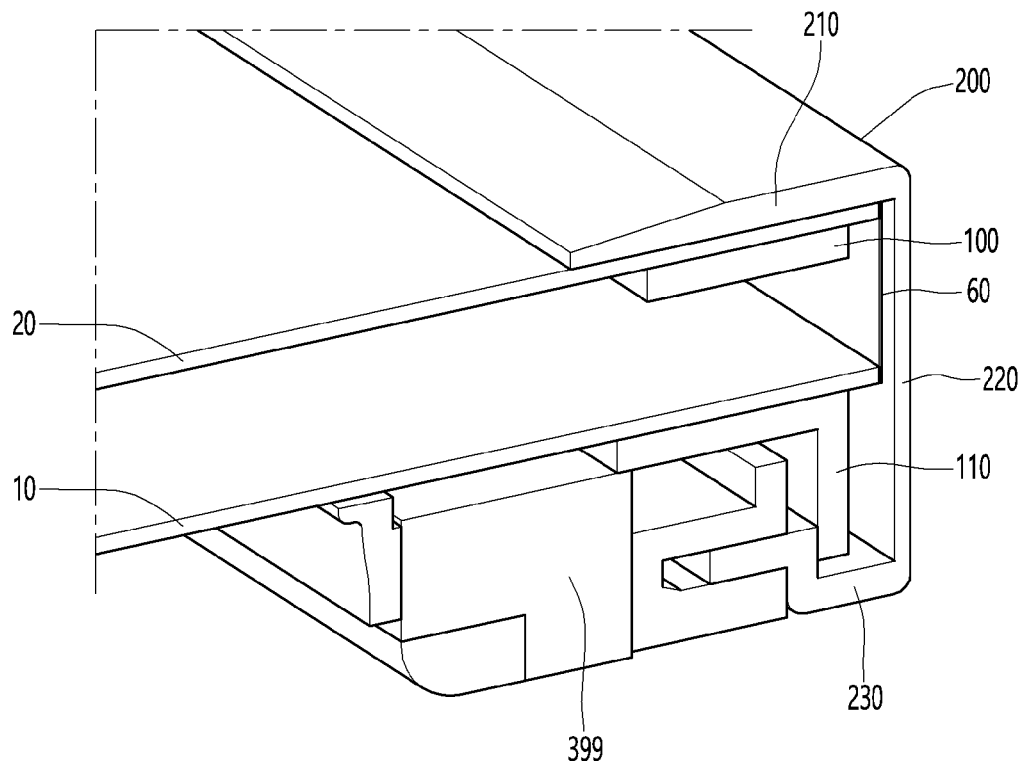

[Fig. 27]
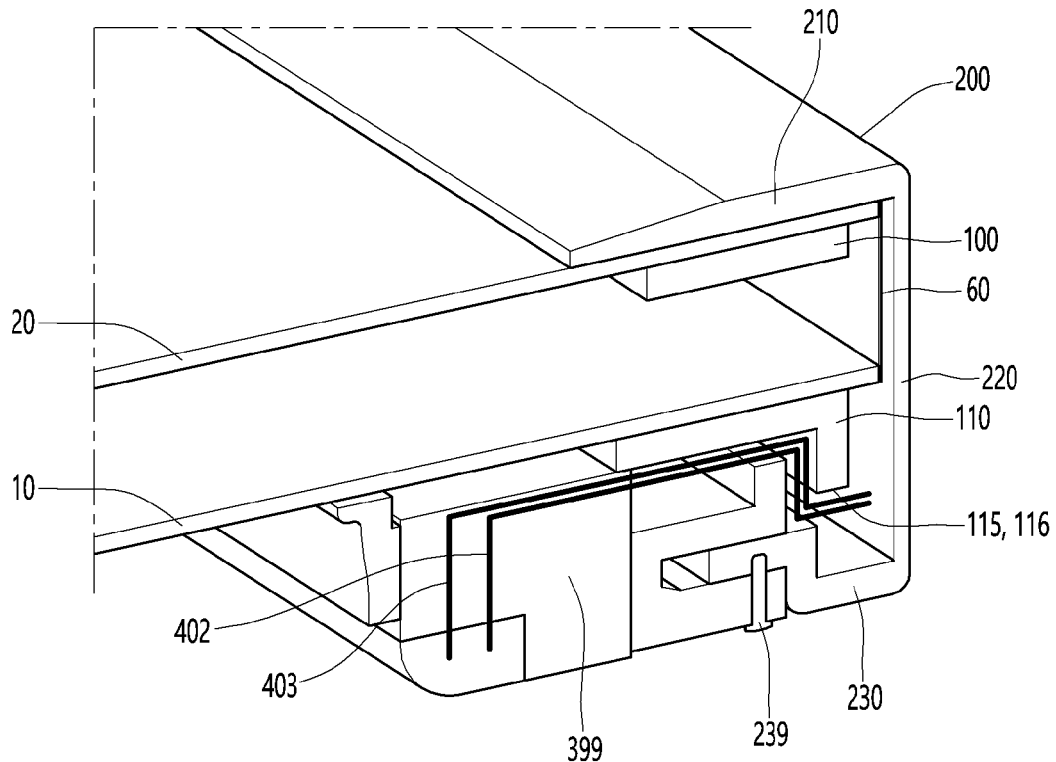
[Fig. 28]
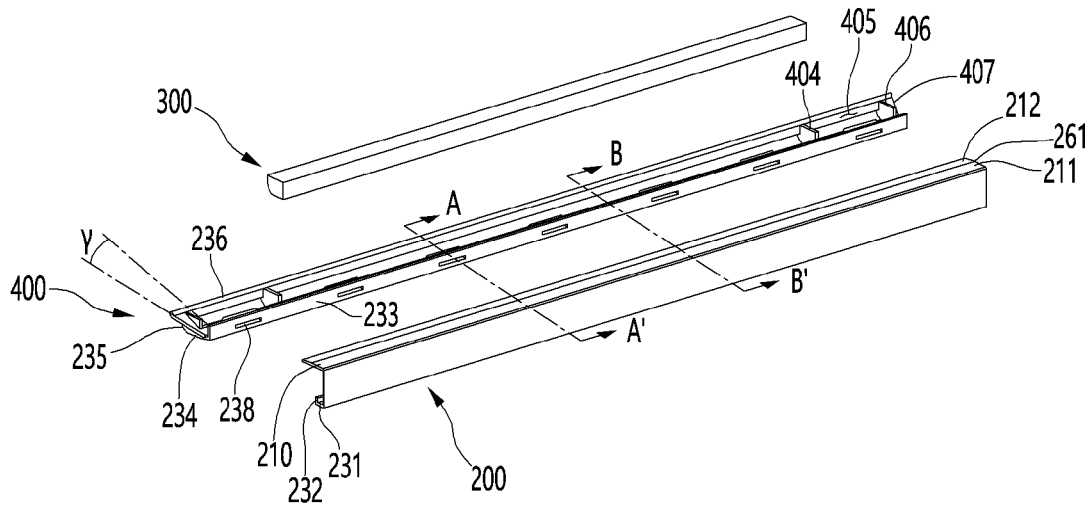

[Fig. 29]
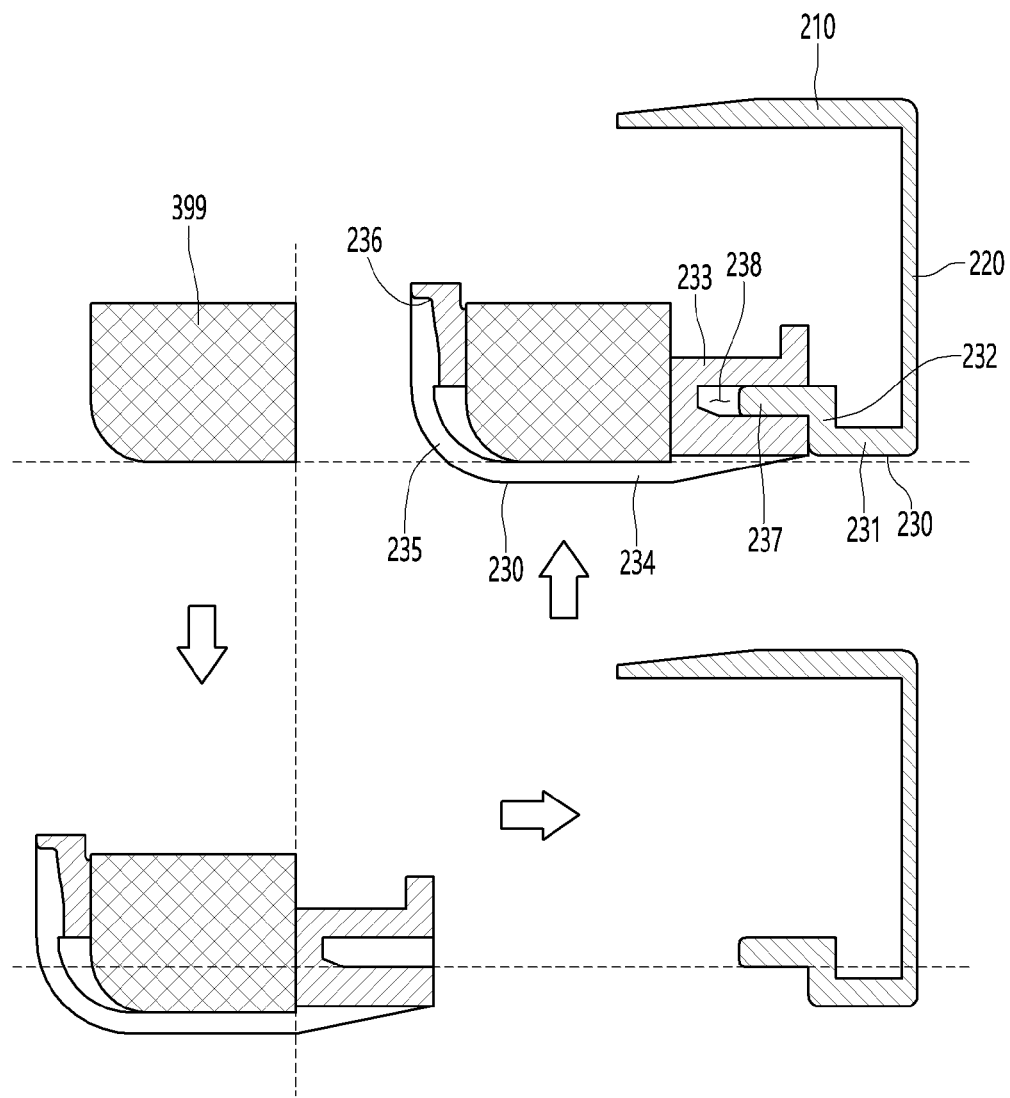

[Fig. 30]
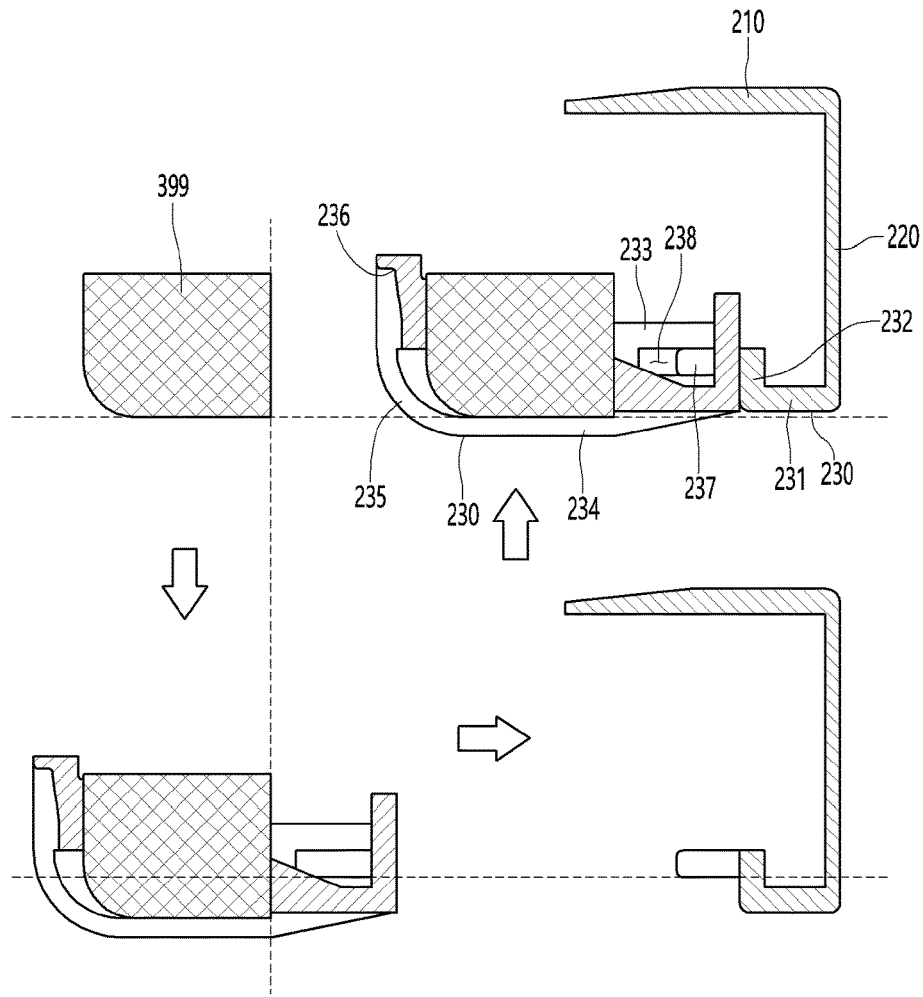
[Fig. 31]
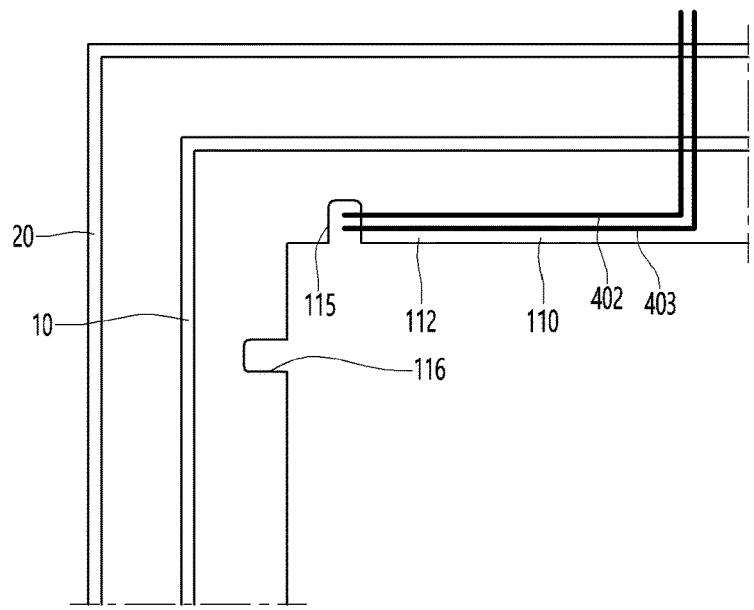

[Fig. 32]
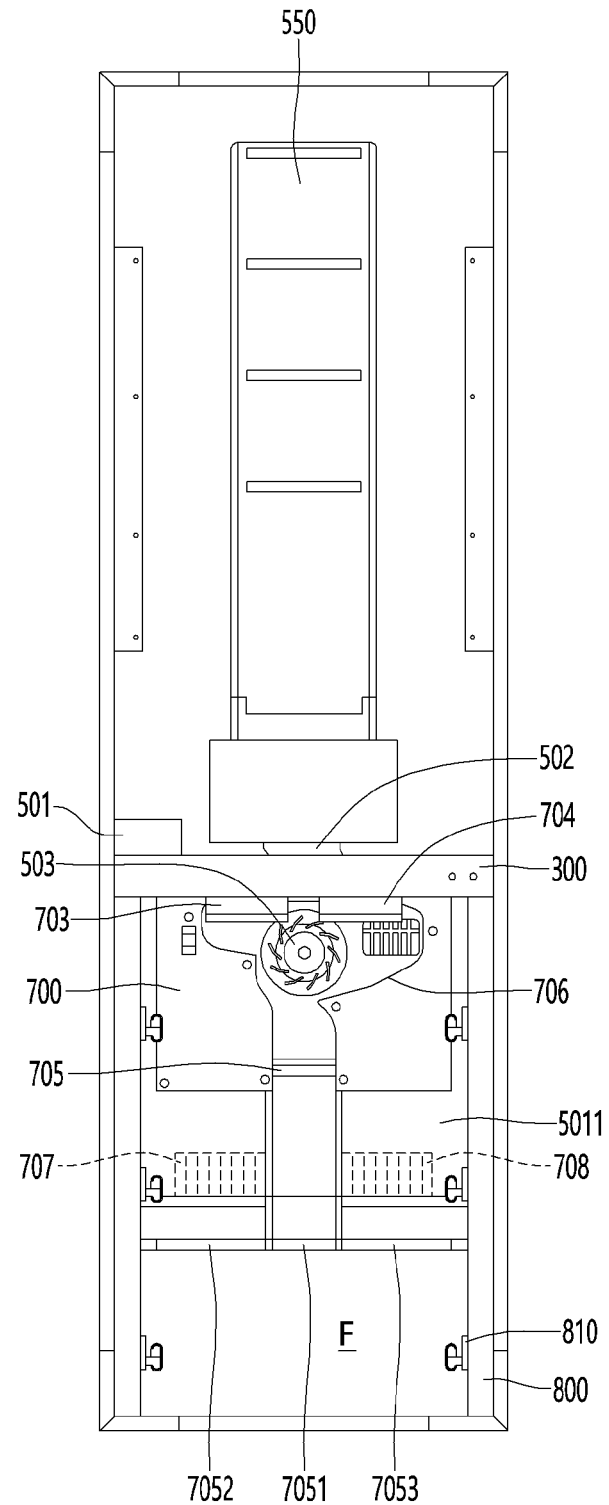

[Fig. 33]
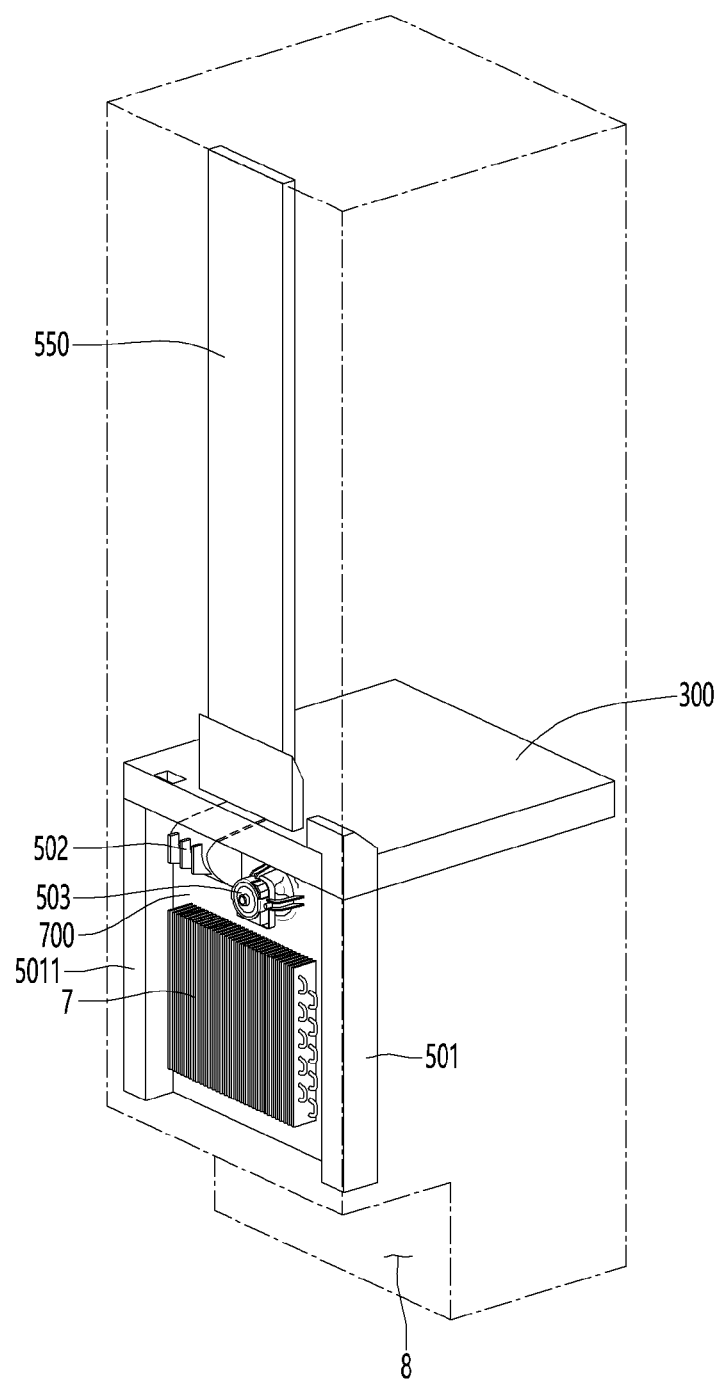

[Fig. 35]
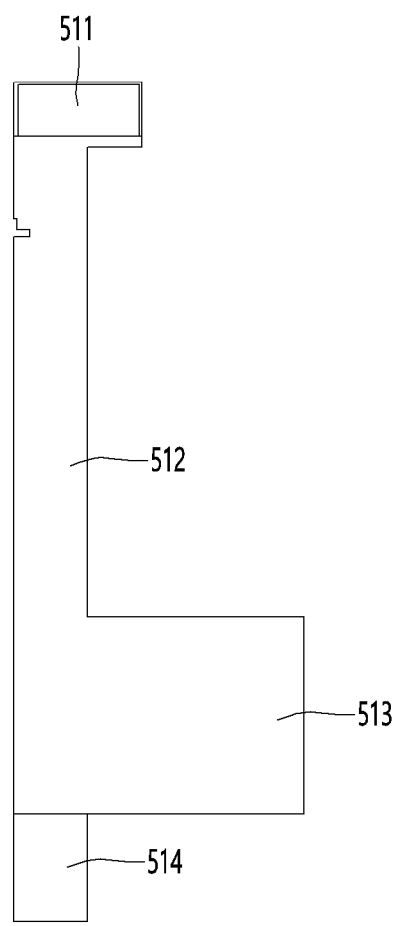

[Fig. 36]
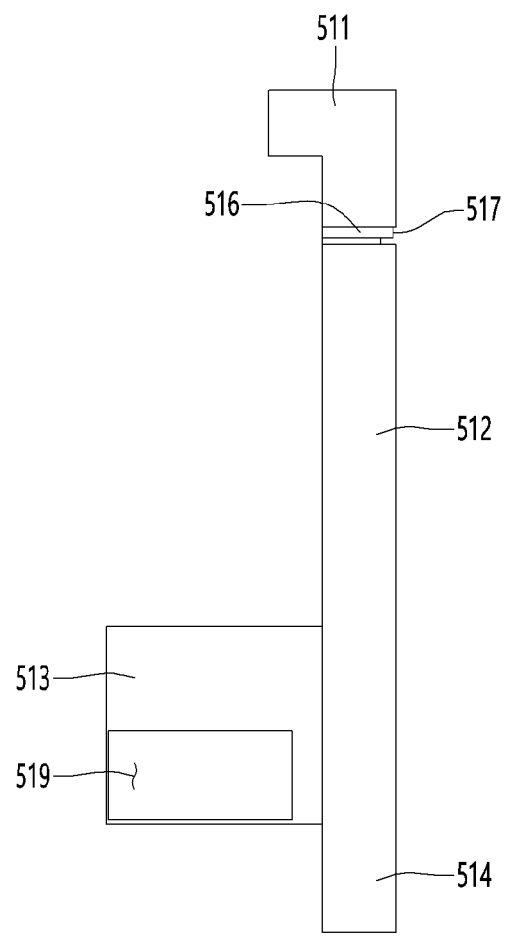

[Fig. 37]
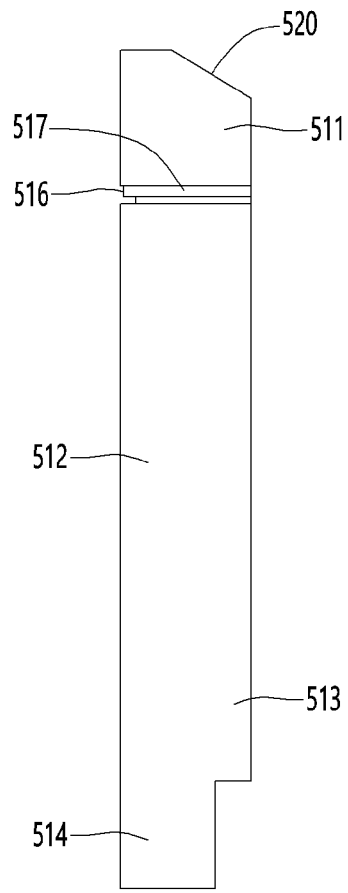
[Fig. 38]
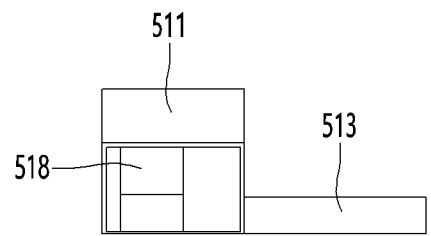

[Fig. 40]
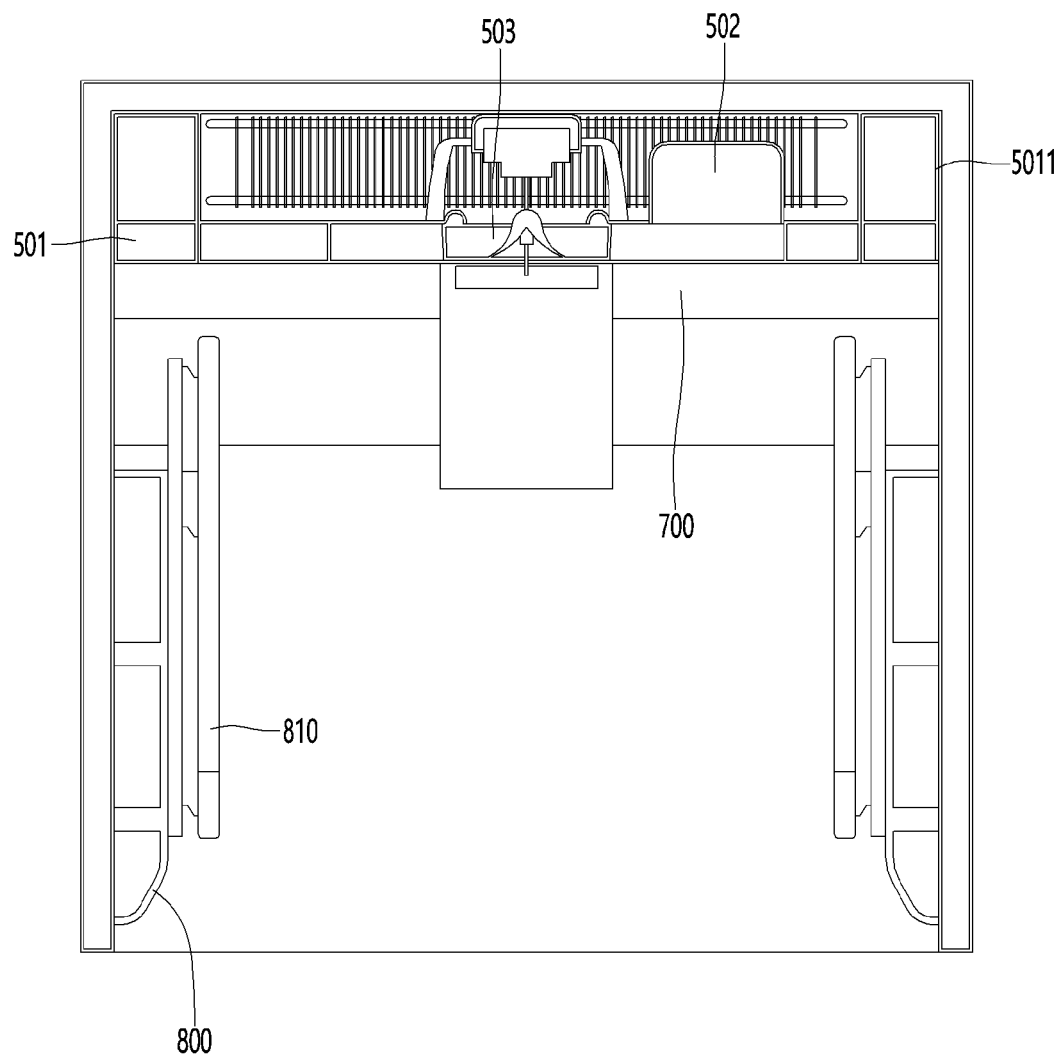

[Fig. 41]
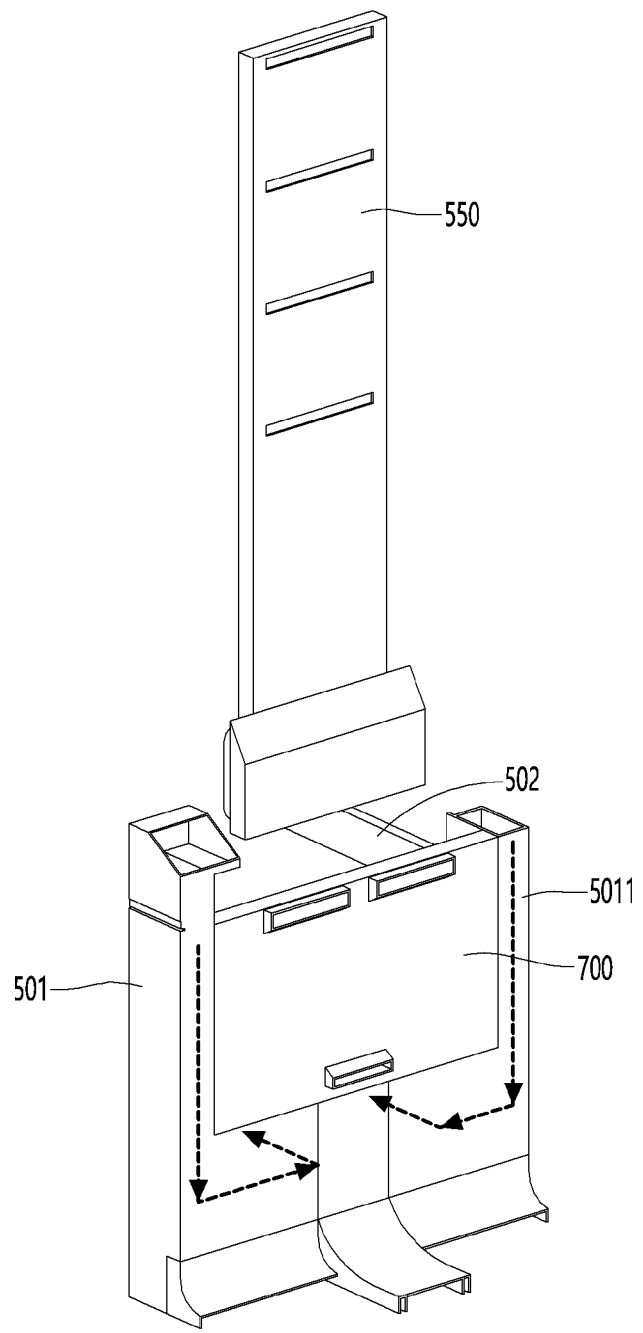

[Fig. 42]
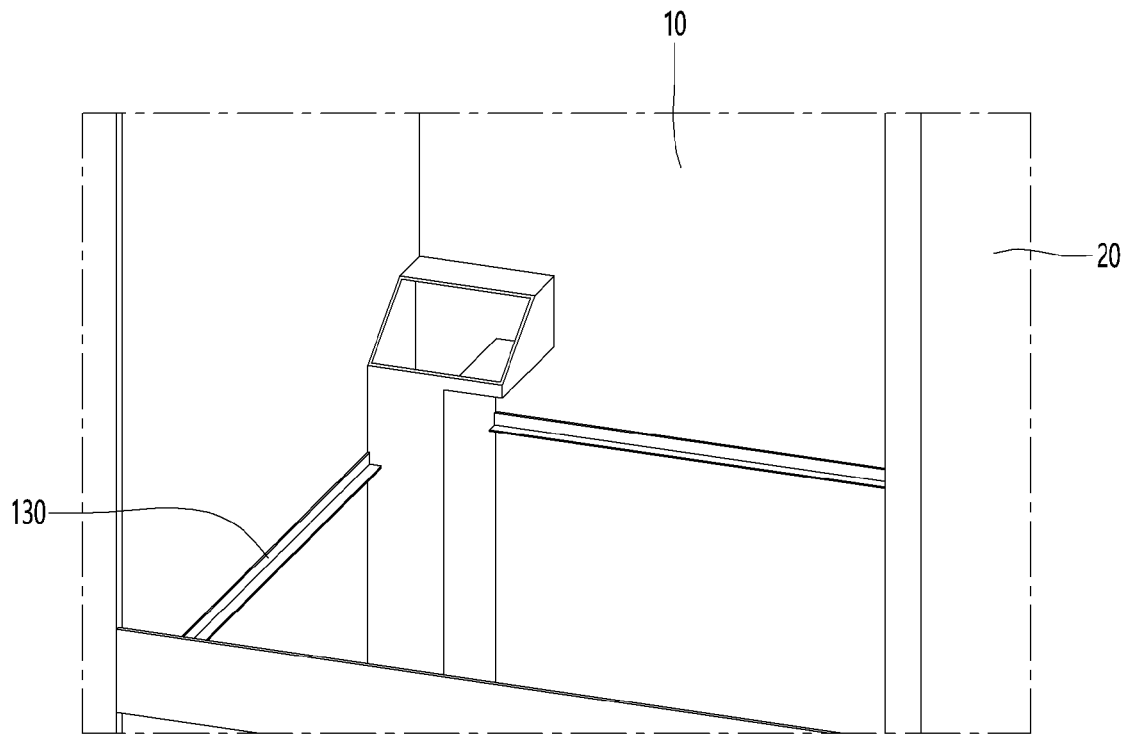
[Fig. 43]
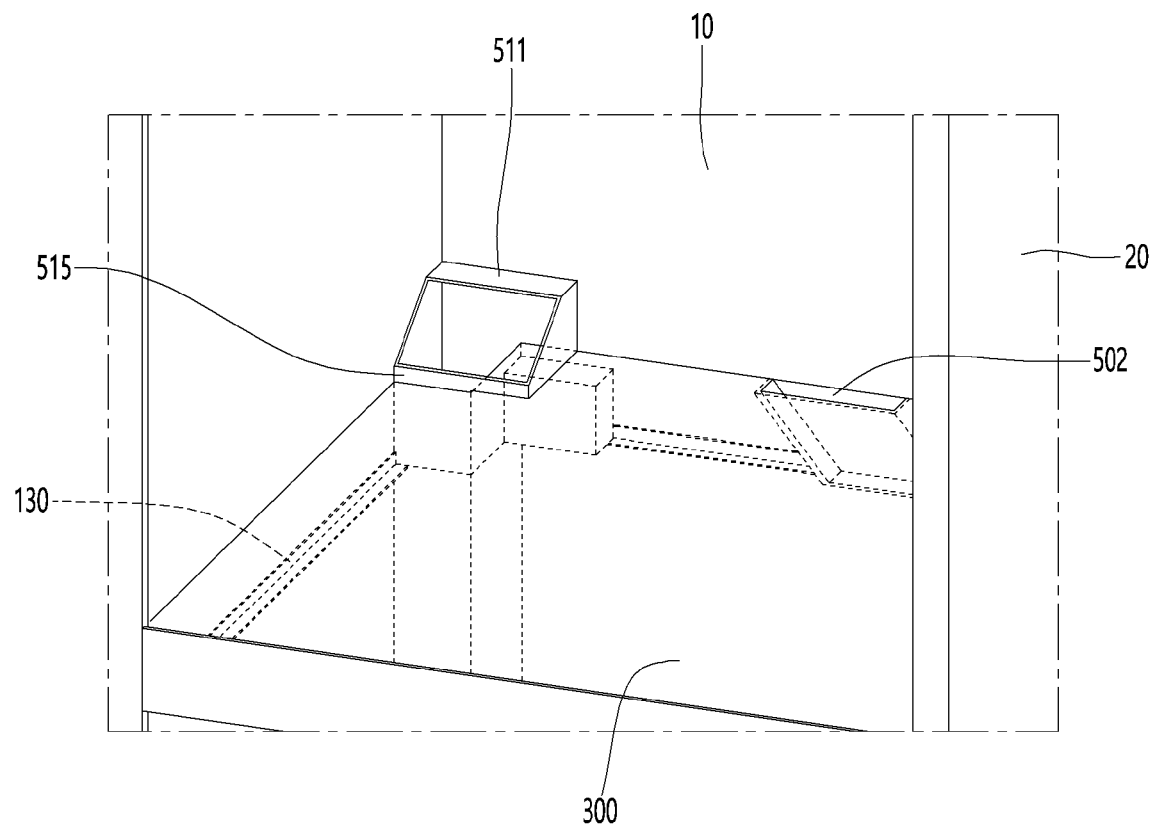

[Fig. 44]
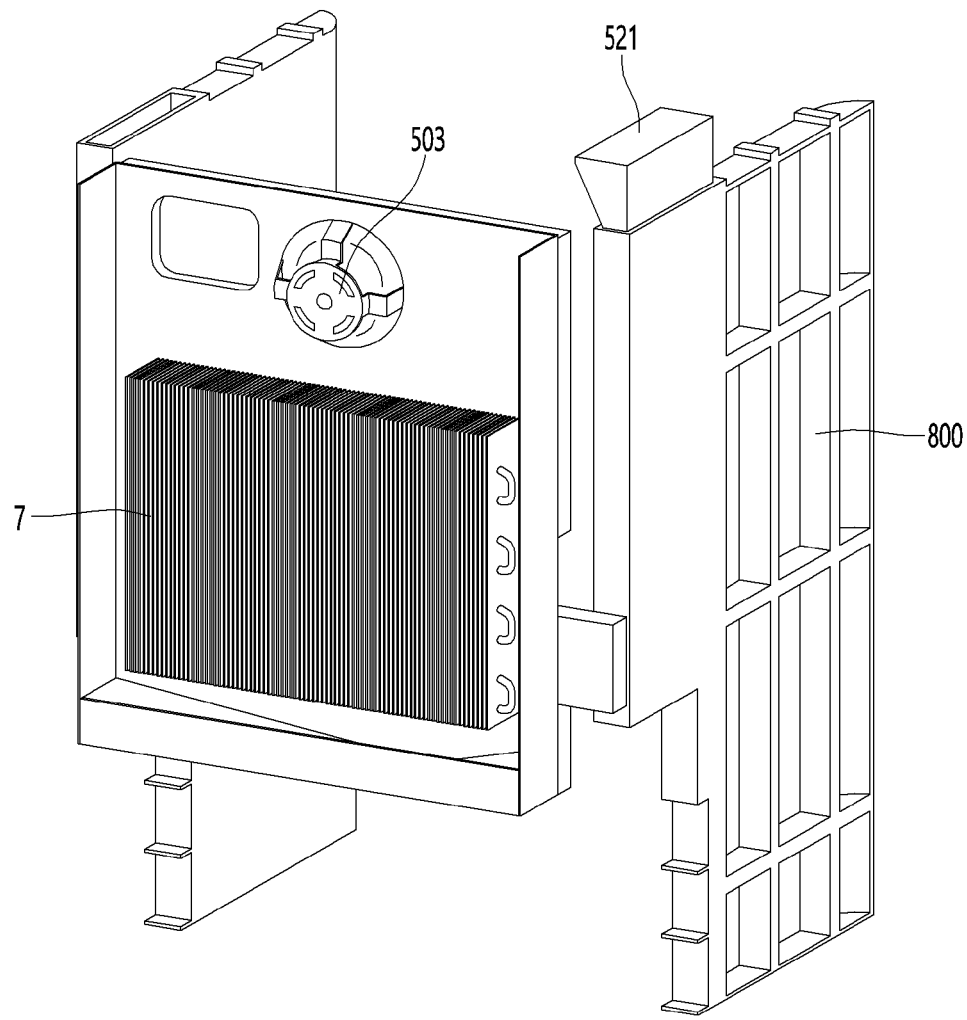

[Fig. 45]
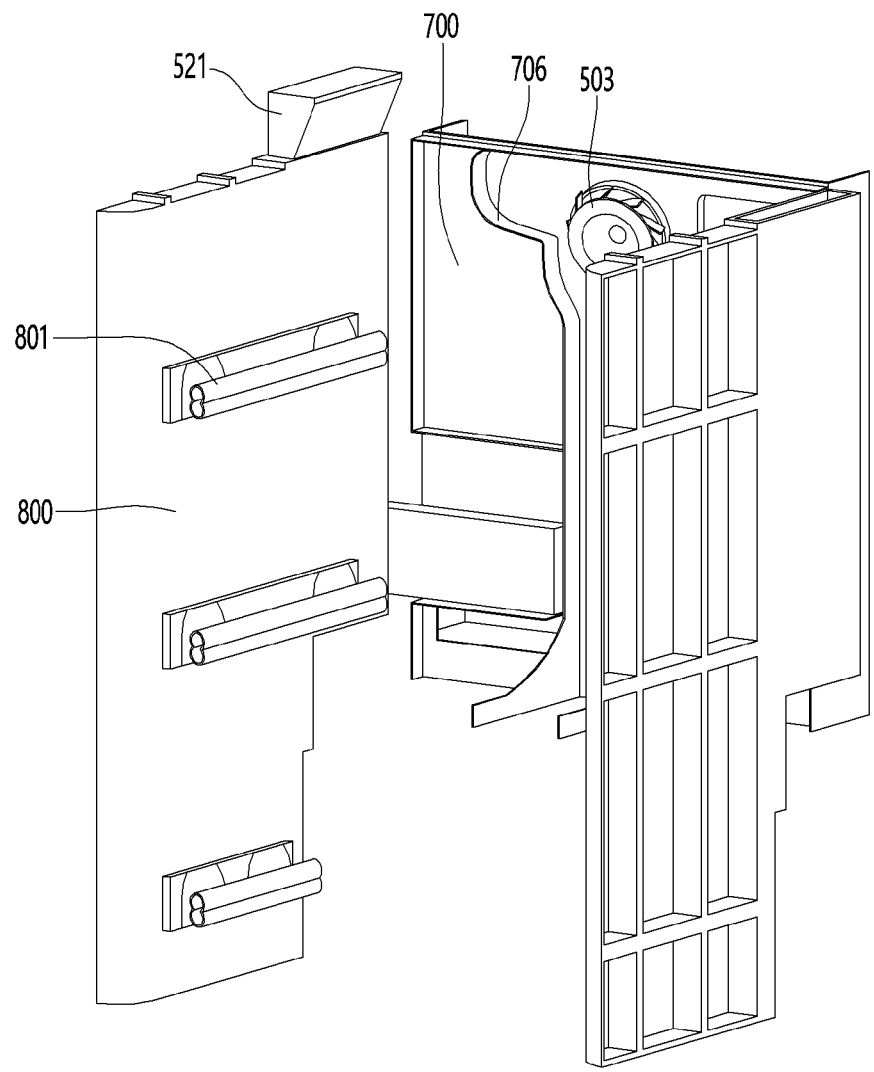

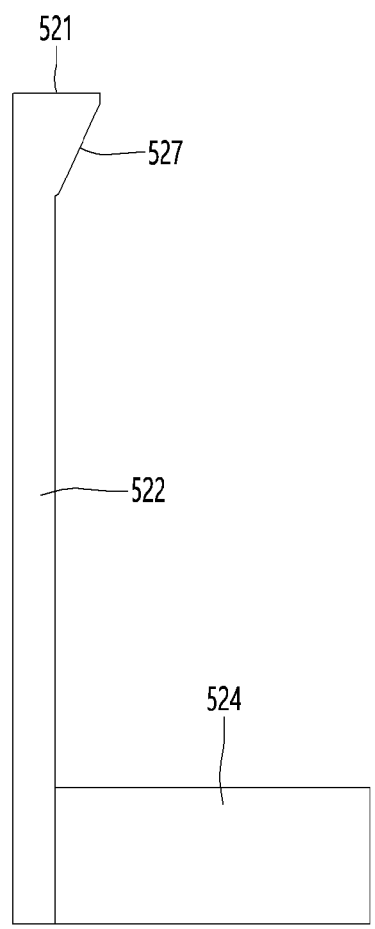
[Fig. 47]

[Fig. 48]
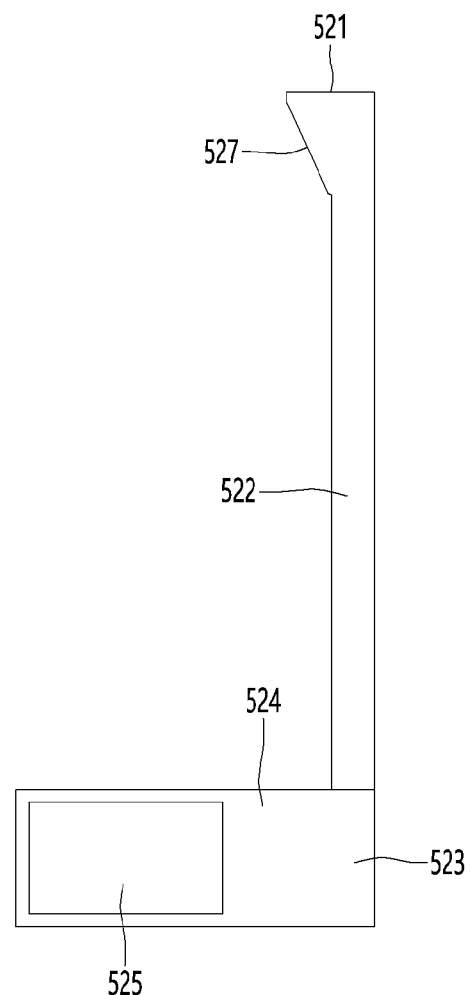

[Fig. 49]
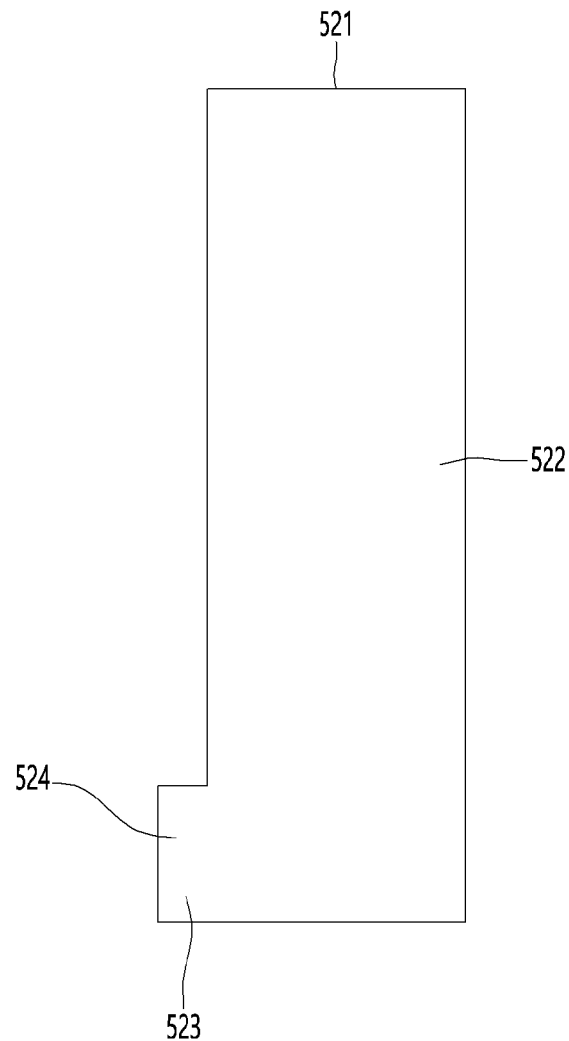
[Fig. 50]
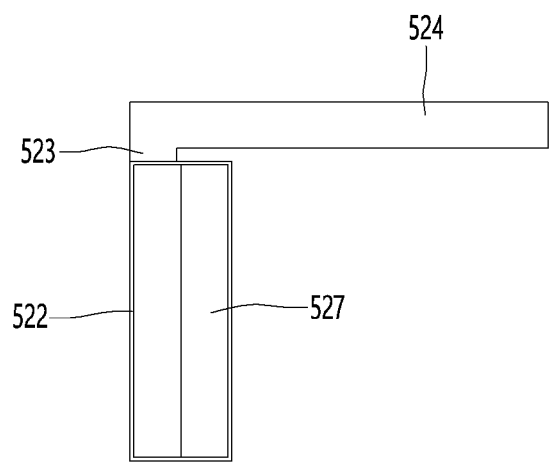

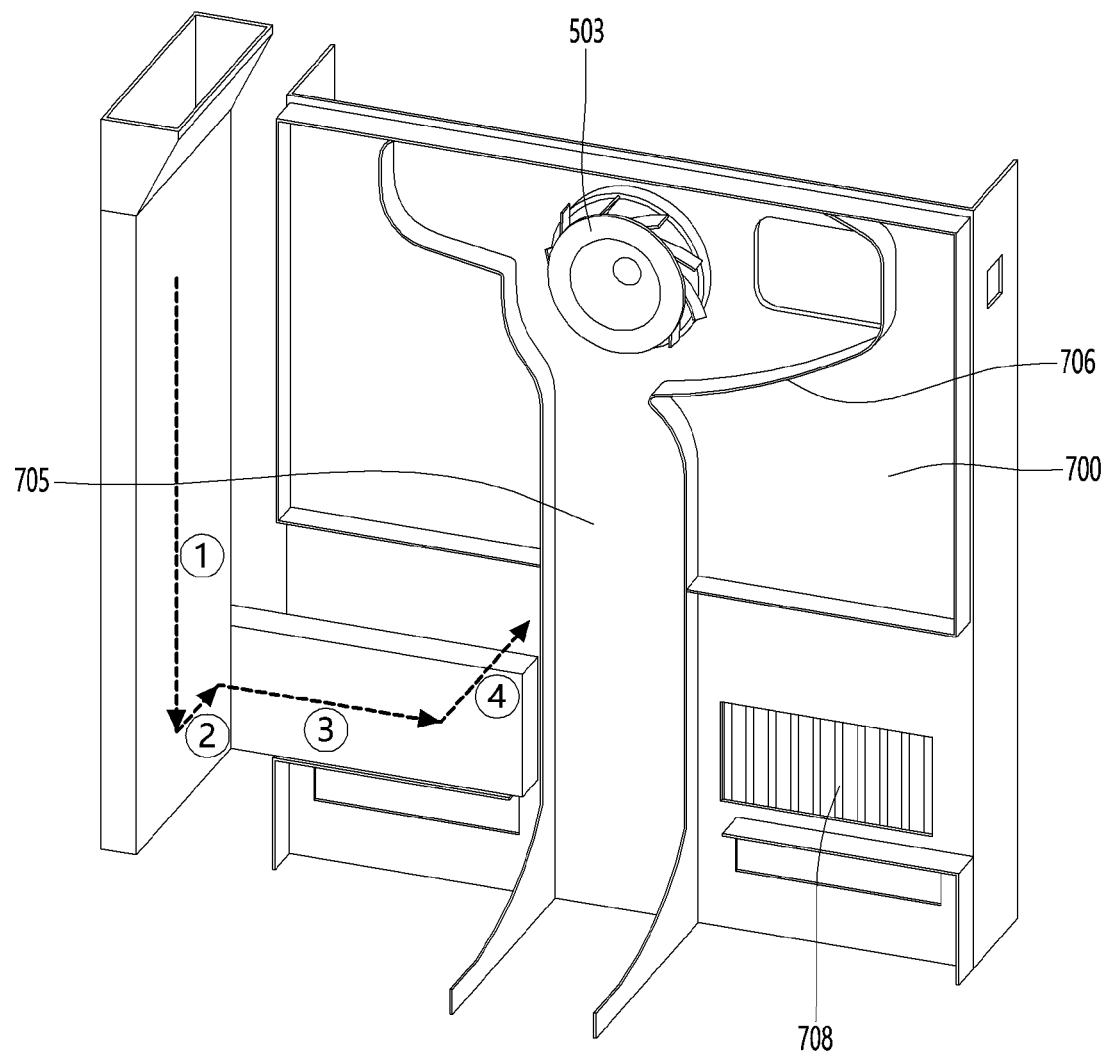
[Fig. 51]

[Fig. 52]
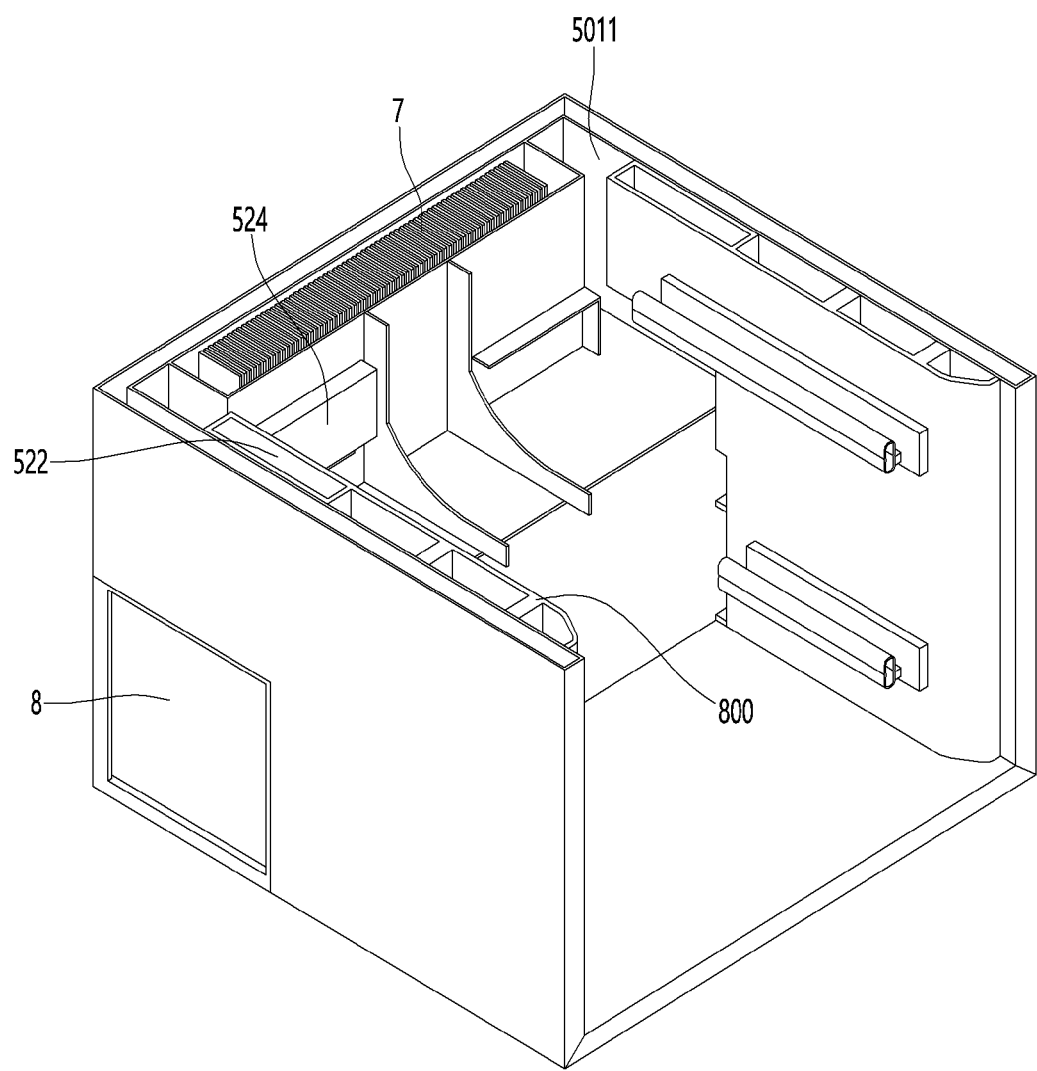

[Fig. 53]
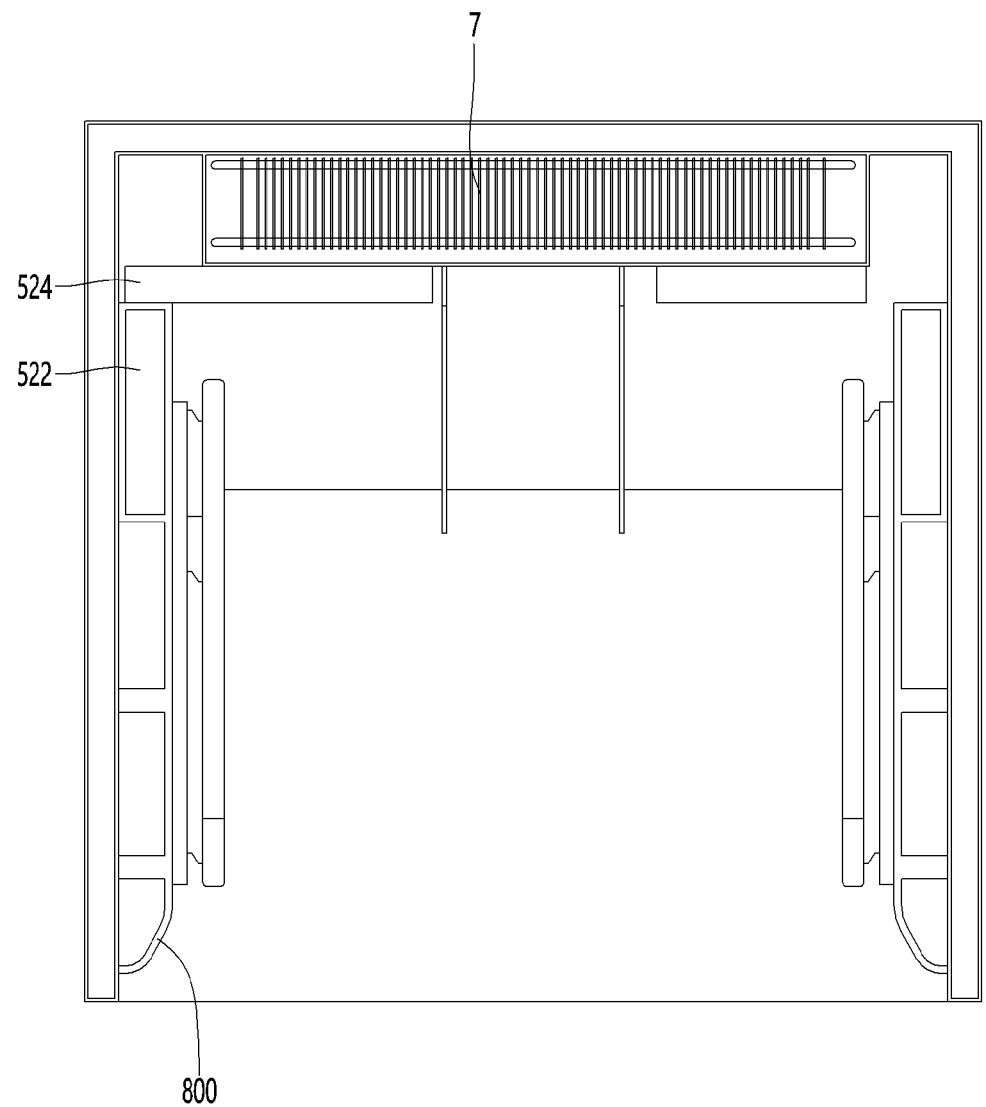

[Fig. 54]
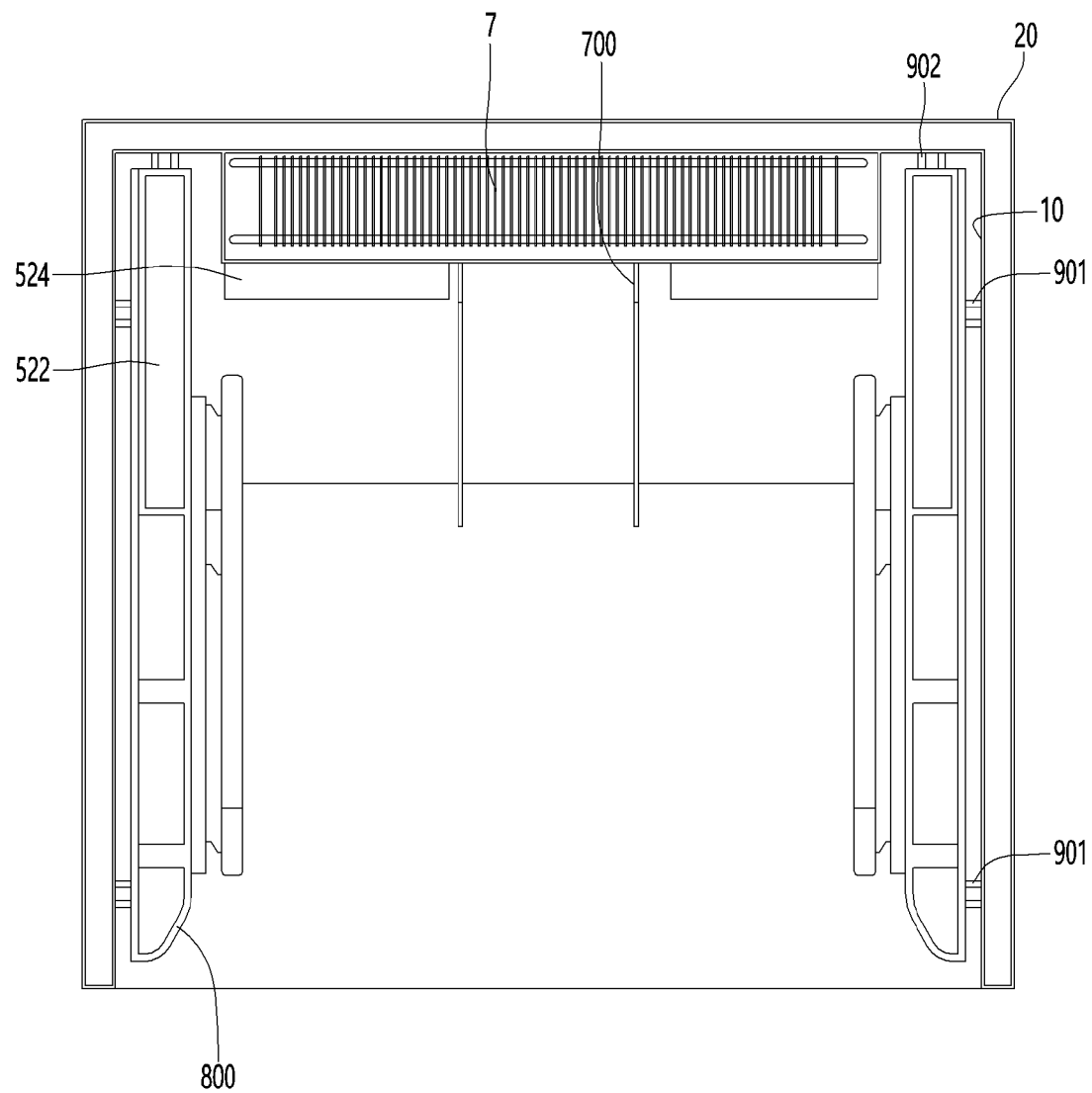

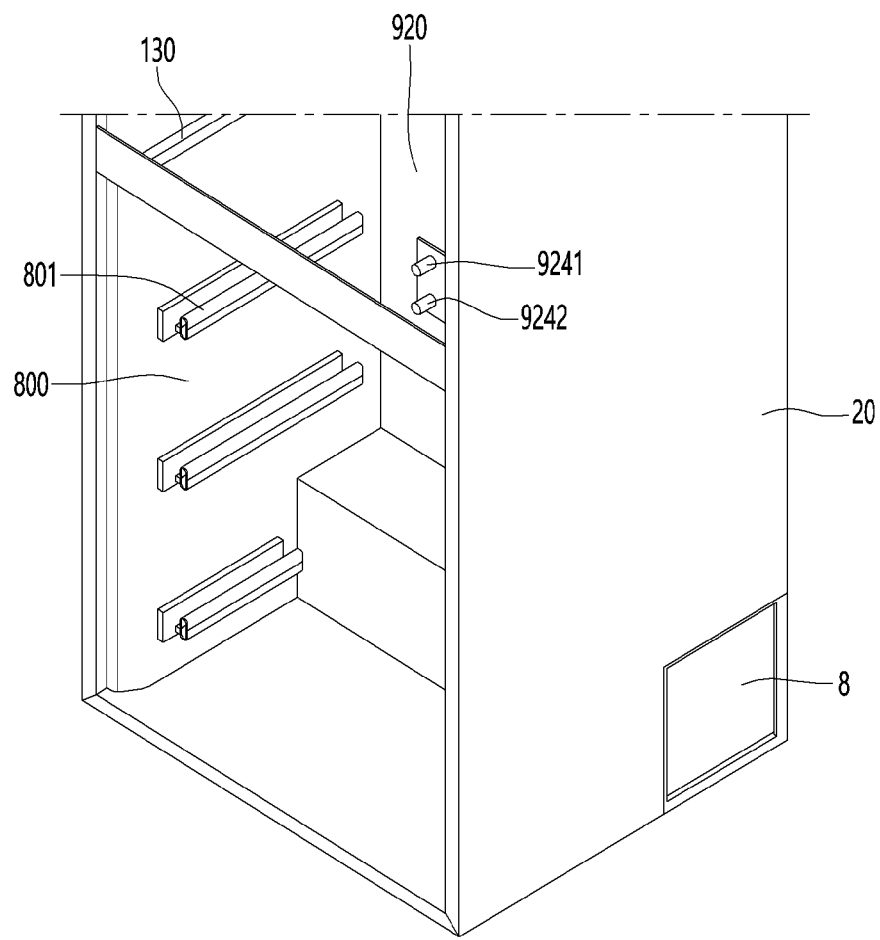
[Fig. 55]

[Fig. 56]
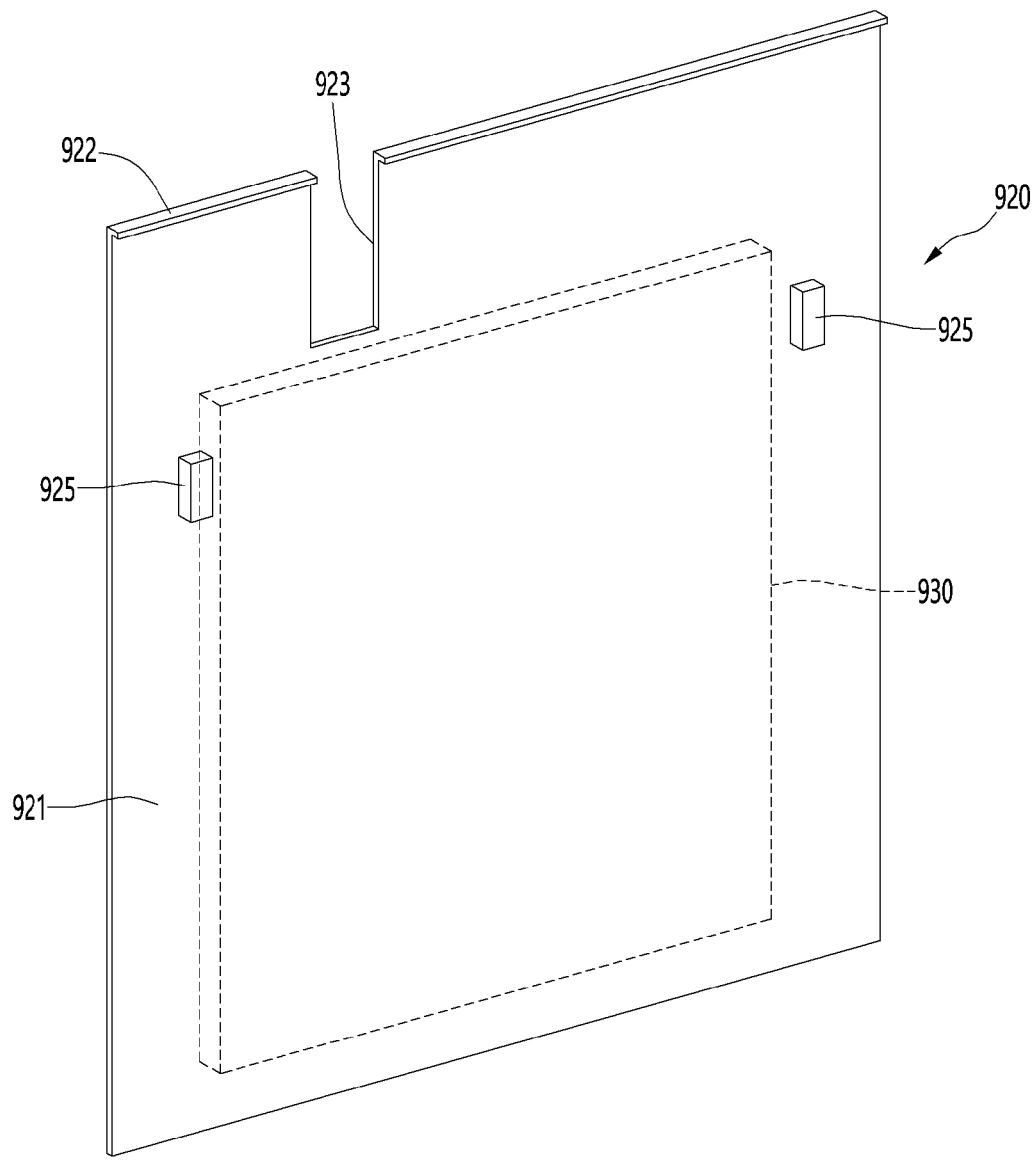

[Fig. 57]
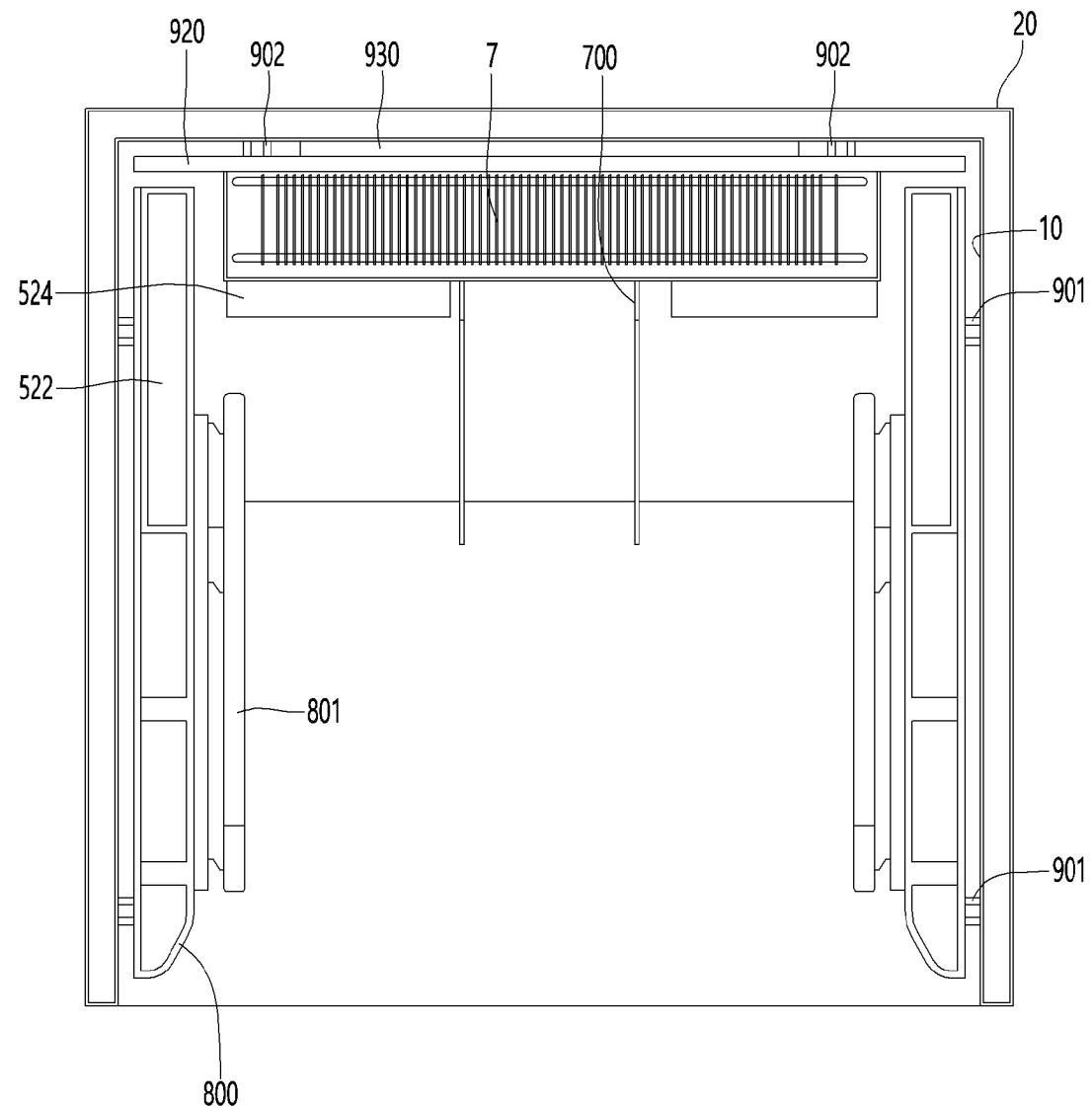

though it is differently applied in refrigeration and freezing, a foam urethane adiabatic wall having a thickness of about 30 cm or more is generally provided. However, the internal volume of the refrigerator is therefore reduced.

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2020/008966, filed Jul. 8, 2020, which claims priority to Korean Patent Application No. 10-2019-0082641, filed Jul. 9, 2019, whose entire disclosures are hereby incorporated by reference.

TECHNICAL FIELD

The present disclosure relates to a vacuum adiabatic body and a refrigerator.

BACKGROUND ART

A vacuum adiabatic body is a product for suppressing heat transfer by vacuuming the inside of a main body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the outside of the vacuum adiabatic panel is finished with a separate molding as Styrofoam. According to the method, additional foaming is not required, and the adiabatic performance of the refrigerator is improved. However, fabrication cost increases, and a fabrication method is complicated.

As another example, a technique of providing walls using a vacuum adiabatic material and additionally providing adiabatic walls using a foam filling material has been disclosed in Korean Patent Publication No. 10-2015-0012712 (Reference Document 2). Also, fabrication cost increases, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2004/0226956A1 (Reference Document 3). However, it is difficult to obtain a practical level of an adiabatic effect by providing a wall of the refrigerator with sufficient vacuum. In detail, there are limitations that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

Alternatively, the present applicant has applied for Korean Patent Publication No. 10-2017-0016187 (Reference Document 4) that discloses a vacuum adiabatic body and a refrigerator. The present technology proposes a refrigerator in which both a main body and a door are provided with a vacuum adiabatic body.

The vacuum adiabatic body only performs an adiabatic operation by itself, and the necessary components have to be installed in a product such as a refrigerator to which the vacuum adiabatic body is applied, but this has not been considered.

In the refrigerator, the supply of cool air to the inner space of the refrigerator is performed to allow the cool air generated in an evaporator within the refrigerator to be supplied to various places in the refrigerator by a fan. It is important not only that the cool air generated in the evaporator is properly supplied to a refrigerating compartment, but also that the supplied cool air smoothly returns to the evaporator after being used for cooling articles. A return duct structure of a refrigerator has been disclosed in KR10-2004-0048766 (Reference Document 5) as a prior art for allowing cool air to return to the evaporator.

In the above technique, a return duct and an auxiliary return duct are embedded in a foam portion providing a wall of the refrigerator, and cool air returns to the evaporator through the ducts. In more detail, the ducts are embedded in a sidewall of the refrigerator and the inside of a mullion.

According to the above technology, there is a limitation in that an inner space of the duct is reduced on the whole because it is difficult to thermally insulate the ducts to increase in a loss of cool air to the outside, and a thickness of the foam portion needs to increase so as to thermally insulate the ducts. In addition, in the case of a vacuum adiabatic body, since an inner space of a vacuum space, which is an adiabatic space, is narrow and thin, it is impossible to embed the ducts in the first place.

DISCLOSURE OF INVENTION

Technical Problem

Embodiments provide a refrigerator in which a limitation, in which a return duct through which cool air returns to an evaporator is not placed in a wall of a vacuum space of a vacuum adiabatic body, is solved. This is a further limitation because relatively high temperature air does not flow in the return duct.

Embodiments also provide a refrigerator in which a limitation, in which an article accommodation space, in which a vacuum adiabatic body is provided, within the refrigerator is reduced due to occupancy of a return duct, is maximally solved. The refrigerator provided as the vacuum adiabatic body may have an important factor in spoiling the merits even though the large accommodation space is a great advantage.

Embodiments also provide a refrigerator in which heat exchange efficiency deterioration of an evaporator, which depends on an arrangement of an inlet end and an outlet led of a return duct, is minimized to significantly improve energy consumption efficiency.

Solution to Problem

In one embodiment, a vacuum adiabatic body includes: a mullion configured to divide the first space into two spaces; and a connection pipe supported on the mullion so as to be fixed in position, the connection pipe being configured to connect the two space to each other. Accordingly, a connection pipeline may be conveniently installed and fixed to provide the compact connection pipe.

A mullion seating frame configured to support the mullion may be coupled to the first plate, and the connection pipe may have a groove with which the mullion seating frame is hooked. Accordingly, the connection pipeline may be more firmly installed and fixed.

In another embodiment, in a refrigerator having a relatively low-temperature section in a first accommodation space that is a relatively high-temperature section by using an adiabatic wall as a vacuum adiabatic body, the cool air collection pipe includes: a vertical transfer portion extending vertically from a side portion of the evaporator to transfer the air in a vertical direction; a side transfer portion extending laterally from a lower portion of the vertical transfer portion to transfer the air in a lateral direction; and a rear discharge hole defined in a rear surface of the side transfer portion to discharge the air backward to the evaporator. Accordingly, heat exchange efficiency may be improved, and a space within the refrigerator may be more largely utilized.

The refrigerator may further include: a mullion configured to partition the first accommodation space from the second accommodation space; and a mullion hook protrusion provided on the cool air collection pipe so as to be supported on the mullion. Accordingly, the cool air collection pipe may be more completely supported.

The vacuum adiabatic body may be configured to provide the second accommodation space, and the mullion is configured to partition the vacuum adiabatic body so that the first accommodation space and the second accommodation space provide a single vacuum adiabatic body. Accordingly, the refrigerator may be simplified in configuration.

The refrigerator may further include a mullion seating frame provided to an inner surface of the vacuum adiabatic body to seat the mullion, wherein the cool air collection pipe may have a groove into which the mullion seating frame is fitted. Accordingly, the cool air collection pipe may be installed to be completely fixed at a fixed position.

The cool air collection pipe may be provided in two to improve collection efficiency of the cool air and reduce resistance in the collection path, and the cool air collection pipe may be provided into two at left and right sides of the evaporator to improve heat exchange efficiency in the evaporator.

The vertical transfer portion may be placed at an inner corner of the vacuum adiabatic body and provided in a lateral direction (hereinafter, the lateral direction is completely distinguished from a rear direction) of the evaporator to more effectively use the space within the refrigerator and more largely provide the inner space of the refrigerator.

The vertical transfer portion may be provided on a side panel provided on a side surface of the first accommodation space to utilize a space of the side panel so that a separate structure for transferring the cool air is not installed in the refrigerator. Accordingly, the space within the refrigerator may be more largely utilized.

A component configured to support an accommodated article is mounted on the side panel, for example, a shelf may be supported. The vertical transfer portion may be accommodated in the side panel that is necessary to perform a function of the refrigerator to more widely utilize the space within the refrigerator.

The refrigerator may further include a rear transfer portion configured to transfer the air backward between the vertical transfer portion and the side transfer portion. Accordingly, difficulty of changing the transfer direction may overcome due to the position of the structure of the side panel, and since a dead space is used, a utilization value of the space within the refrigerator may increase.

The vertical transfer portion may be accommodated in the side panel to more improve space utilization.

The evaporator and the side transfer portion may be aligned with each other in a front and rear direction to more largely provide the space within the refrigerator by using the installation space of the evaporator.

In further another embodiment, a refrigerator includes at least one cool air collection pipe configured to collect cool air by allowing first and second accommodation spaces to communicate with each other, wherein the cool air collection pipe includes: a vertical transfer portion extending vertically from a side of the evaporator to transfer air vertically; and a rear discharge hole configured to discharge the air backward toward the evaporator. Thus, an inner space of the refrigerator may be efficiently utilized to largely provide the space within the refrigerator and significantly improve heat exchange efficiency of the evaporator.

The rear discharge hole may be provided in the side transfer portion configured to transfer the air transferred from the vertical transfer portion in a lateral direction. Thus, since the collected cool air is guided to a desired position of the evaporator, the heat exchange efficiency of the cool air may be more significantly improved.

The at least one cool air collection pipe may be provided in at least two, and a pair of cool air collection pipes may transfer the air in directions facing each other. Accordingly, the air may be transferred in the direction that are symmetrical to each other to symmetrically perform heat exchange of the evaporator, thereby further improving the heat exchange efficiency.

At least one of the cool air collection pipes may extend along the side panel of the first accommodation space. Accordingly, the space within the refrigerator may be more efficiently utilized to largely provide the space within the refrigerator.

At least one of the cool air collection pipes may be placed at an inner corner of the first accommodation space. Accordingly, the space within the refrigerator may be utilized to improve the space utilization.

Advantageous Effects of Invention

According to the embodiment, in the refrigerator to which the vacuum adiabatic body is applied, the transfer portion of the cool air that returns to the evaporator may be effectively provided without passing through the vacuum space within the vacuum adiabatic body.

According to the embodiment, since the user's hand does not reach the cool air collection pipe in the refrigerator, or the cool air collection pipe is inserted into the component within the refrigerator, the space within the refrigerator may be more largely provided to more enhance the enlargement of the accommodation space, which is achieved by the vacuum adiabatic body.

According to the embodiment, since the heat exchange is performed through the wide area of the evaporator, the heat exchange efficiency may be improved, and since the heat exchange is performed symmetrically between the left and right sides, the irreversible loss of the refrigeration engine may be reduced.

BRIEF DESCRIPTION OF DRAWINGS

FIG. 1 is a perspective view of a refrigerator according to an embodiment.

FIG. 2 is a view schematically illustrating a vacuum adiabatic body used in a main body and a door of the refrigerator.

FIG. 3 is a view illustrating an internal configuration of a vacuum space according to various embodiments.

FIG. 4 is a view illustrating a conductive resistance sheet and a peripheral portion thereof according to various embodiments.

FIG. 5 is a graph illustrating a variation in adiabatic performance and a variation in gas conductivity according to a vacuum pressure by applying a simulation.

FIG. 6 is a graph illustrating results obtained by observing a time and a pressure in a process of exhausting the inside of the vacuum adiabatic body when a support is used.

FIG. 7 is a graph illustrating results obtained by comparing a vacuum pressure to gas conductivity.

FIG. 8 is a cross-sectional perspective view of an edge of the vacuum adiabatic body.

FIGS. 9 and 10 are schematic front views of the main body in a virtual state in which an inner surface is spread.

FIG. 11 is a cross-sectional view of a contact portion in a state in which the main body is closed by the door.

FIG. 12 is a cross-sectional view illustrating a contact portion of a main body and a door according to another embodiment.

FIGS. 13 and 14 are partial cutaway perspective views of an inner surface, wherein FIG. 13 illustrates in a state in which coupling is completed, and FIG. 14 illustrates a coupling process.

FIG. 15 is a view for sequentially explaining coupling of a sealing frame when the sealing frame is provided as two portions according to an embodiment.

FIGS. 16 and 17 are views illustrating one end of the sealing frame, wherein FIG. 16 illustrates a state before a door hinge is installed, and FIG. 17 illustrates a state in which the door hinge is installed.

FIG. 18 is a view for explaining an effect of the sealing frame according to an embodiment in comparison with the technique according to the related art, wherein FIG. 18(*a*) is a cross-sectional view of a contact portion of a main body-side vacuum adiabatic body and a door according to an embodiment, and FIG. 18(*b*) is a cross-sectional view of a main body and a door according to the related art.

FIGS. 19 to 24 are views illustrating various examples in which the sealing frame is installed.

FIG. 25 is a view observing an upper right side of the main body-side adiabatic body when viewed from a front side.

FIGS. 26 and 27 are cross-sectional views of an edge of the vacuum adiabatic body in a state in which a lamp is installed, wherein FIG. 26 is a cross-sectional view of a portion through which an electric wire of the lamp does not pass, and FIG. 27 is a cross-sectional view of a portion through the electric wire of the lamp pass.

FIG. 28 is an exploded perspective view of a peripheral portion of a component.

FIGS. 29 and 30 are cross-sectional views taken along line A-A' and B-B'.

FIG. 31 is a view observing a portion of an upper portion of the refrigerator when viewed from a front side.

FIG. 32 is a front view of the refrigerator according to an embodiment.

FIG. 33 is a rear perspective view of the refrigerator according to an embodiment.

FIGS. 34 to 38 are views of a first cool air collection pipe, wherein FIG. 34 is a front view, FIG. 35 is a front view, FIG. 36 is a left view, FIG. 37 is a rear view, and FIG. 38 is a top view.

FIG. 40 is a cross-sectional view illustrating the relationship between the evaporator and the cool air collection pipe.

FIG. 41 is a view for explaining a flow of cool air in the cool air collection pipe.

FIG. 42 is a view for explaining a support relationship between a mullion seating frame and the cool air collection pipe.

FIG. 43 is a view for explaining a state in which the cool air collection pipe is placed in a state in which the mullion is illustrated by a virtual line.

FIG. 44 is a front perspective view illustrating the cool air collection pipe and a peripheral portion of the cool air collection pipe.

FIG. 45 is a rear perspective view illustrating the cool air collection pipe and the peripheral portion of the cool air collection pipe.

FIGS. 46 to 50 are views of a first cool air collection pipe, wherein FIG. 46 is a front perspective view, FIG. 47 is a front view, FIG. 48 is a rear view, FIG. 49 is a side view, and FIG. 50 is a top view.

FIG. 51 is a detailed view illustrating a direction in which cool air flows along the first cool air collection pipe.

FIG. 52 is a cross-sectional perspective view illustrating a relationship between the evaporator and the cool air collection pipe.

FIG. 53 is a cross-sectional view illustrating the relationship between the evaporator and the cool air collection pipe.

FIG. 54 is a cross-sectional view for explaining coupling of a side panel and the vacuum adiabatic body.

FIG. 55 is a schematic view illustrating the inside of the refrigerator in which the rear panel is provided.

FIG. 56 is a perspective view of the rear panel.

FIG. 57 is a schematic view of the refrigerator in which the rear panel is provided.

MODE FOR THE INVENTION

Figure 34:
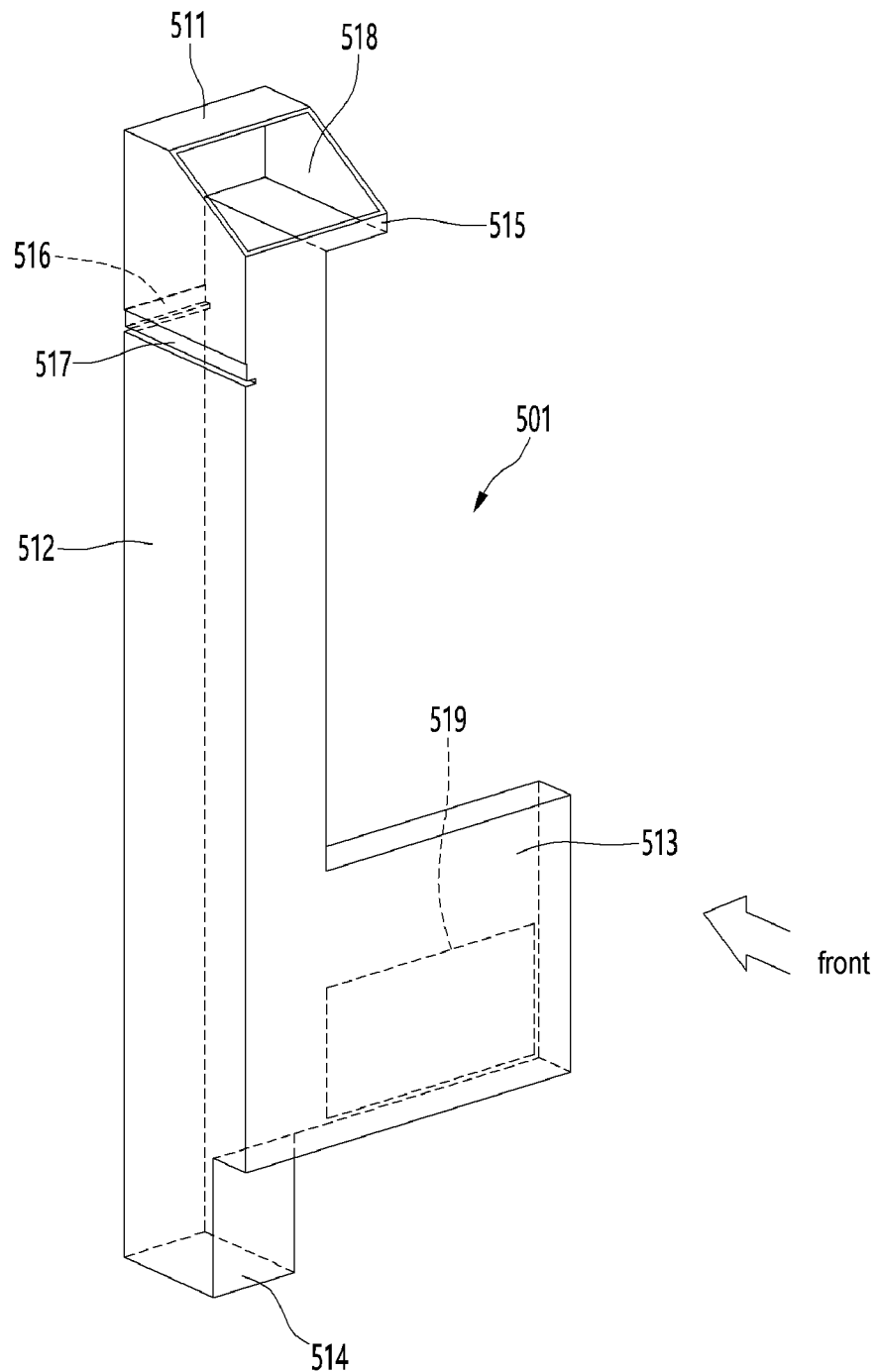

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

Hereinafter, for description of embodiments, the drawings shown below may be displayed differently from the actual product, or exaggerated or simple or detailed parts may be deleted, but this is intended to facilitate understanding of the technical idea of the present invention. It should not be construed as limited. However, it will try to show the actual shape as much as possible.

The following embodiments may be applied to the description of another embodiment unless the other embodiment does not collide with each other, and some configurations of any one of the embodiments may be modified in a state in which only a specific portion is modified in another configuration may be applied.

In the following description, the vacuum pressure means any pressure state lower than the atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open and close the main body 2. The door 3 may be rotatably or slidably movably disposed to open/close the cavity 9. The cavity 9 may provide at least one of a refrigerating compartment and a freezing compartment.

Components constituting a refrigeration cycle in which cool air is supplied into the cavity 9. In detail, the components include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically illustrating a vacuum adiabatic body used in the main body and the door of the refrigerator. In FIG. 2, a main body-side vacuum adiabatic body is illustrated in a state in which walls of top and side surfaces are removed, and a door-side vacuum adiabatic body is illustrated in a state in which a portion of a wall of a front surface is removed. In addition, sections of portions at conductive resistance sheets are provided are schematically illustrated for convenience of understanding.

Referring to FIG. 2, the vacuum adiabatic body includes a first plate 10 for providing a wall of a low-temperature space, a second plate 20 for providing a wall of a high-temperature space, a vacuum space 50 defined as a gap between the first and second plates 10 and 20. Also, the vacuum adiabatic body includes the conductive resistance sheets 60 and 63 for preventing thermal conduction between the first and second plates 10 and 20. A seal 61 for sealing the first and second plates 10 and 20 is provided so that the vacuum space 50 is in a sealing state. When the vacuum adiabatic body is applied to a refrigerator or a heating cabinet, the first plate 10 may be referred to as an inner case that is installed inside a control space controlling a temperature, and the second plate 20 may be referred to as an outer case that is installed outside the control space. A machine room 8 in which components providing a refrigeration cycle are accommodated is placed at a lower rear side of the main body-side vacuum adiabatic body, and an exhaust port 40 for forming a vacuum state by exhausting air in the vacuum space 50 is provided at any one side of the vacuum adiabatic body. In addition, a pipeline 64 passing through the vacuum space 50 may be further installed so as to install a defrosting water line and electric wires.

The first plate 10 may define at least a portion of a wall for a first space provided thereto. The second plate 20 may define at least a portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal conduction between the first and second plates 10 and 20, heat radiation between the first and second plates 10 and 20, and gas conduction of the vacuum space 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view illustrating an internal configuration of the vacuum space according to various embodiments.

First, referring to FIG. 3A, the vacuum space 50 may be provided in a third space having a pressure different from that of each of the first and second spaces, preferably, a vacuum state, thereby reducing an adiabatic loss. The third space may be provided at a temperature between the temperature of the first space and the temperature of the second space. Since the third space is provided as a space in the vacuum state, the first and second plates 10 and 20 receive a force contracting in a direction in which they approach each other due to a force corresponding to a pressure difference between the first and second spaces. Therefore, the vacuum space 50 may be deformed in a direction in which the vacuum space 50 is reduced in volume. In this case, the adiabatic loss may be caused due to an increase in amount of heat radiation, caused by the contraction of the vacuum space 50, and an increase in amount of thermal conduction, which is caused by contact between the plates 10 and 20.

The support 30 may be provided to reduce the deformation of the vacuum space 50. The support 30 includes a bar 31. The bar 31 may extend in a substantially vertical direction with respect to the plates to support a distance between the first plate and the second plate. A support plate 35 may be additionally provided on at least any one end of the bar 31. The support plate 35 may connect at least two or more bars 31 to each other to extend in a horizontal direction with respect to the first and second plates 10 and 20. The support plate 35 may be provided in a plate shape or may be provided in a lattice shape so that an area of the support plate contacting the first or second plate 10 or 20 decreases, thereby reducing heat transfer. The bars 31 and the support plate 35 are fixed to each other at at least a portion so as to be inserted together between the first and second plates 10 and 20. The support plate 35 contacts at least one of the first and second plates 10 and 20, thereby preventing the deformation of the first and second plates 10 and 20. In addition, based on the extension direction of the bars 31, a total sectional area of the support plate 35 is provided to be greater than that of the bars 31, so that heat transferred through the bars 31 may be diffused through the support plate 35.

The support 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 for reducing heat radiation between the first and second plates 10 and 20 through the vacuum space 50 will be described. The first and second plates 10 and 20 may be made of a stainless material capable of preventing corrosion and providing a sufficient strength. Since the stainless material has a relatively high emissivity of 0.16, a large amount of radiation heat may be transferred. In addition, the support 30 made of the resin has a lower emissivity than the plates, and is not entirely provided to inner surfaces of the first and second plates 10 and 20. Thus, the support 30 does not have great influence on the radiation heat. Therefore, the radiation resistance sheet 32 may be provided in a plate shape over a majority of the area of the vacuum space 50 so as to concentrate on reduction of radiation heat transferred between the first and second plates 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet, at least two radiation resistance sheets 32 may be provided at a certain distance so as not to contact each other. Also, at least one radiation resistance sheet may be provided in a state of contacting the inner surface of the first or second plate 10 or 20.

Referring back FIG. 3b, the distance between the plates is maintained by the support 30, and a porous material 33 may be filled in the vacuum space 50. The porous material 33 may have a higher emissivity than that of the stainless material of the first and second plates 10 and 20. However, since the porous material 33 is filled in the vacuum space 50, the porous material 33 has a high efficiency for resisting the radiation heat transfer.

In this embodiment, the vacuum adiabatic body may be fabricated without the radiation resistance sheet 32.

Referring to FIG. 3c, the support 30 for maintaining the vacuum space 50 may not be provided. A porous material 333 may be provided to be surrounded by a film 34 instead of the support 30. Here, the porous material 33 may be provided in a state of being compressed so that the gap of the vacuum space is maintained. The film 34 made of, for example, a PE material may be provided in a state in which a hole is punched in the film 34.

In this embodiment, the vacuum adiabatic body may be fabricated without the support 30. That is to say, the porous material 33 may perform the function of the radiation resistance sheet 32 and the function of the support 30 together.

FIG. 4 is a view illustrating the conductive resistance sheet and the peripheral portion thereof according to various embodiments. A structure of each of the conductive resistance sheets are briefly illustrated in FIG. 2, but will be understood in detail with reference to the drawings.

First, a conductive resistance sheet proposed in FIG. 4a may be applied to the main body-side vacuum adiabatic body. Specifically, the first and second plates 10 and 20 are to be sealed so as to vacuum the inside of the vacuum adiabatic body. In this case, since the two plates have different temperatures from each other, heat transfer may occur between the two plates. A conductive resistance sheet 60 is provided to prevent thermal conduction between different two kinds of plates.

The conductive resistance sheet 60 may be provided with the seal 61 at which both ends of the conductive resistance sheet 60 are sealed to define at least a portion of the wall for the third space and maintain the vacuum state. The conductive resistance sheet 60 may be provided as a thin foil in unit of micrometer so as to reduce the amount of heat conducted along the wall for the third space. The seals 610 may be provided as a weld. That is, the conductive resistance sheet 60 and the plates 10 and 20 may be fused to each other. To cause a fusing operation between the conductive resistance sheet 60 and the plates 10 and 20, the conductive resistance sheet 60 and the plates 10 and 20 may be made of the same material, and a stainless material may be used as the material. The seal 610 may not be limited to the weld and may be provided through a process such as cocking. The conductive resistance sheet 60 may be provided in a curved shape. Thus, a thermal conduction distance of the conductive resistance sheet 60 is provided longer than a linear distance of each of the plates so that an amount of thermal conduction is further reduced.

A change in temperature occurs along the conductive resistance sheet 60. Therefore, to block the heat transfer to the outside of the conductive resistance sheet 60, a shield 62 may be provided at the outside of the conductive resistance sheet 60 so that an adiabatic operation occurs. In other words, in case of the refrigerator, the second plate 20 has a high temperature, and the first plate 10 has a low temperature. In addition, thermal conduction from high temperature to low temperature occurs in the conductive resistance sheet 60, and thus the temperature of the conductive resistance sheet 60 is suddenly changed. Therefore, when the conductive resistance sheet 60 is opened with respect to the outside thereof, the heat transfer through the opened place may seriously occur. To reduce the heat loss, the shield 62 is provided outside the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shield 62 may be provided as a porous material contacting an outer surface of the conductive resistance sheet 60. The shield 62 may be provided as an adiabatic structure, e.g., a separate gasket, which is placed at the outside of the conductive resistance sheet 60. The shield 62 may be provided as a portion of the vacuum adiabatic body, which is provided at a position facing a corresponding conductive resistance sheet 60 when the main body-side vacuum adiabatic body is closed with respect to the door-side vacuum adiabatic body. To reduce the heat loss even when the main body and the door are opened, the shield 62 may be provided as a porous material or a separate adiabatic structure.

A conductive resistance sheet proposed in FIG. 4b may be applied to the door-side vacuum adiabatic body. In FIG. 4b, portions different from those of FIG. 4a are described in detail, and the same description is applied to portions identical to those of FIG. 4a. A side frame 70 is further provided outside the conductive resistance sheet 60. A component for the sealing between the door and the main body, an exhaust port necessary for an exhaust process, a getter port for vacuum maintenance, and the like may be placed on the side frame 70. This is because the mounting of components is convenient in the main body-side vacuum adiabatic body, but the mounting positions of components are limited in the door-side vacuum adiabatic body.

In the door-side vacuum adiabatic body, it is difficult to place the conductive resistance sheet 60 on a front end of the vacuum space, i.e., an edge side surface of the vacuum space. This is because, unlike the main body, a corner edge of the door is exposed to the outside. In more detail, if the conductive resistance sheet 60 is placed on the front end of the vacuum space, the corner edge of the door is exposed to the outside, and hence there is a disadvantage in that a separate adiabatic portion has to be configured so as to thermally insulate the conductive resistance sheet 60.

A conductive resistance sheet proposed in FIG. 4c may be installed in the pipeline passing through the vacuum space. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path may be lengthened, and deformation caused by a pressure difference may be prevented. In addition, a separate shield may be provided to improve the adiabatic performance of the conductive resistance sheet.

A heat transfer path between the first and second plates 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, support conduction heat ② conducted along the support 30 provided inside the vacuum adiabatic body, gas conduction heat ③ conducted through an internal gas in the vacuum space, and radiation transfer heat ④ transferred through the vacuum space.

The transfer heat may be changed depending on various depending on various design dimensions. For example, the support may be changed so that the first and second plates 10 and 20 may endure a vacuum pressure without being deformed, the vacuum pressure may be changed, the distance between the plates may be changed, and the length of the conductive resistance sheet may be changed. The transfer heat may be changed depending on a difference in temperature between the spaces (the first and second spaces) respectively provided by the plates. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the support conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to the heat transfer distribution, effective heat transfer coefficients (eK: effective K) (W/mK) of the surface conduction heat ①, the support conduction heat ②, the gas conduction heat ③, and the radiation transfer heat ④ may have an order of Math Equation 1 when comparing the transfer heat ①, ②, ③, and ④.

$$eK_{solid\ conduction\ heat} > eK_{radiation\ conduction\ heat} > eK_{gas\ conduction\ heat}$$ [Equation 1]

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference $\Delta T$ between an entrance and an exit of the conductive resistance sheet 60 or 63, a sectional area A of the conductive resistance sheet, a length L of the conductive resistance sheet, and a thermal conductivity (k) of the conductive resistance sheet (the thermal conductivity of the conductive resistance sheet is a material property of a material and may be obtained in advance). For the support conduction heat, a conductive calorific value may be obtained through a temperature difference $\Delta T$ between an entrance and an exit of the support 30, a sectional area A of the support, a length L of the support, and a thermal conductivity (k) of the support. Here, the thermal conductivity of the support may be a material property of a material and may be obtained in advance. The sum of the gas conduction heat ③, and the radiation transfer heat ④ may be obtained by subtracting the surface conduction heat and the support conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space 50.

When a porous material is provided inside the vacuum space 50, porous material conduction heat ⑤ may be a sum of the support conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be provided to be less than 0.5° C. Also, a temperature difference $\Delta T_2$ between the geometric center formed by the adjacent bars 31 and an edge of the vacuum adiabatic body may be provided to be less than 0.5° C. In the second plate 20, a temperature difference between an average temperature of the second plate and a temperature at a point at which a heat transfer path passing through the conductive resistance sheet 60 or 63 meets the second plate may be the largest. For example, when the second space is a region hotter than the first space, the temperature at the point at which the heat transfer path passing through the conductive resistance sheet meets the second plate becomes lowest. Similarly, when the second space is a region colder than the first space, the temperature at the point at which the heat transfer path passing through the conductive resistance sheet meets the second plate becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. For this, a temperature variation of the conductive resistance sheet may be controlled to be larger than that of the plate.

Physical characteristics of the components constituting the vacuum adiabatic body will be described. In the vacuum adiabatic body, force due to a vacuum pressure is applied to all of the components. Therefore, a material having a strength (N/m$^2$) of a certain level may be used.

Under such circumferences, the plates 10 and 20 and the side frame 70 may be made of a material having sufficient strength with which the plates 10 and 20 are not damaged by even the vacuum pressure. For example, when the number of bars 31 decreases to limit the support conduction heat, the deformation of each of the plates occurs due to the vacuum pressure, which may bad influence on an outer appearance of the refrigerator. The radiation resistance sheet 32 may be made of a material that has a low emissivity and may be easily subjected to thin film processing. Also, the radiation resistance sheet 32 has to ensure strength enough without being deformed by an external impact. The support 30 is provided to strength that is enough to support the force by the vacuum pressure and endure the external impact, and is to have processability. The conductive resistance sheet 60 may be made of a material that has a thin plate shape and may endure the vacuum pressure.

In an embodiment, the plate, the side frame, and the conductive resistance sheet may be made of stainless materials having the same strength. The radiation resistance sheet may be made of aluminum having weaker strength than that of each of the stainless materials. The support may be made of a resin having weaker strength than that of the aluminum.

Unlike the strength from the point of view of the materials, an analysis from the point of view of stiffness is required. The stiffness (N/m) may be a property that is not be easily deformed. Thus, although the same material is used, its stiffness may vary depending on its shape. The conductive resistance sheets 60 or 63 may be made of a material having strength, but the stiffness of the material may be low so as to increase in heat resistance and minimize the radiation heat as the conductive resistance sheet is uniformly spread without any roughness when the vacuum pressure is applied. The radiation resistance sheet 32 requires stiffness having a certain level so as not to contact another component due to deformation. Particularly, an edge of the radiation resistance sheet may generate the conduction heat due to drooping caused by the self-load of the radiation resistance sheet. Therefore, the stiffness having the certain level is required. The support 30 requires a stiffness enough to endure compressive stress from the plate and the external impact.

In an embodiment, the plate and the side frame may have the highest stiffness so as to prevent the deformation caused by the vacuum pressure. The support, particularly, the bar may have the second highest stiffness. The radiation resistance sheet may have stiffness that is lower than that of the support but higher than that of the conductive resistance sheet. Lastly, the conductive resistance sheet may be made of a material that is easily deformed by the vacuum pressure and has the lowest stiffness.

Even when the porous material 33 is filled in the vacuum space 50, the conductive resistance sheet may have the lowest stiffness, and each of the plate and the side frame may have the highest stiffness.

Hereinafter, the vacuum pressure may be determined depending on internal states of the vacuum adiabatic body. As already described above, a vacuum pressure is to be maintained inside the vacuum adiabatic body so as to reduce heat transfer. Here, it will be easily expected that the vacuum pressure is maintained as low as possible so as to reduce the heat transfer.

The vacuum space may resist to heat transfer by only the support 30. Here, a porous material 33 may be filled with the support inside the vacuum space 50 to resist to the heat transfer. The heat transfer to the porous material may resist without applying the support.

The case in which only the support is applied will be described.

FIG. 5 is a graph illustrating a variation in adiabatic performance and a variation in gas conductivity according to the vacuum pressure by applying a simulation.

Referring to FIG. 5, it may be seen that, as the vacuum pressure decreases, i.e., as the vacuum degree increases, a heat load in the case of only the main body (Graph 1) or in the case in which the main body and the door are combined together (Graph 2) decreases as compared to that in the case of the typical product formed by foaming polyurethane, thereby improving the adiabatic performance. However, it may be seen that the degree of improvement of the adiabatic performance is gradually lowered. Also, it may be seen that, as the vacuum pressure decreases, the gas conductivity (Graph 3) decreases. However, it may be seen that, although the vacuum pressure decreases, a ratio at which the adiabatic performance and the gas conductivity are improved is gradually lowered. Therefore, it is preferable that the vacuum pressure decreases as low as possible. However, it takes long time to obtain an excessive vacuum pressure, and much cost is consumed due to an excessive use of the getter. In the embodiment, an optimal vacuum pressure is proposed from the above-described point of view.

FIG. 6 is a graph illustrating results obtained by observing a time and a pressure in a process of exhausting the inside of the vacuum adiabatic body when the support is used.

Referring to FIG. 6, to create the vacuum space 50 to be in the vacuum state, a gas in the vacuum space 50 is exhausted by a vacuum pump while evaporating a latent gas remaining in the components of the vacuum space 50 through baking. However, if the vacuum pressure reaches a certain level or more, there exists a point at which the level of the vacuum pressure does not increase any more ($\Delta t_1$). Thereafter, the getter is activated by disconnecting the vacuum space 50 from the vacuum pump and applying heat to the vacuum space 50 ($\Delta t_2$). If the getter is activated, the pressure in the vacuum space 50 decreases for a certain period of time, but then normalized to maintain a vacuum pressure having a certain level. The vacuum pressure that maintains the certain level after the activation of the getter is approximately $1.8 \times 10^{-6}$ Torr.

In the embodiment, a point at which the vacuum pressure does not substantially decrease any more even though the gas is exhausted by operating the vacuum pump is set to the lowest limit of the vacuum pressure used in the vacuum adiabatic body, thereby setting the minimum internal pressure of the vacuum space 50 to $1.8 \times 10^{-6}$ Torr.

FIG. 7 is a graph illustrating results obtained by comparing the vacuum pressure with gas conductivity.

Referring to FIG. 7, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three sizes of 2.76 mm, 6.5 mm, and 12.5 mm. The gap in the vacuum space 50 is defined as follows. When the radiation resistance sheet 32 exists inside vacuum space 50, the gap is a distance between the radiation resistance sheet 32 and the plate adjacent thereto. When the radiation resistance sheet 32 does not exist inside vacuum space 50, the gap is a distance between the first and second plates.

It was seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it was seen that the point at which reduction in adiabatic effect caused by the gas conduction heat is saturated even though the vacuum pressure decreases is a point at which the vacuum pressure is approximately $4.5 \times 10^{-3}$ Torr. The vacuum pressure of $4.5 \times 10^{-3}$ Torr may be defined as the point at which the reduction in adiabatic effect caused by the gas conduction heat is saturated. Also, when the effective heat transfer coefficient is 0.1 W/mK, the vacuum pressure is $1.2 \times 10^{-2}$ Torr.

When the vacuum space 50 is not provided with the support but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by the gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the support and the porous material are provided together in the vacuum space, a vacuum pressure may be created and used, which is middle between the vacuum pressure when only the support is used and the vacuum pressure when only the porous material is used. When only the porous material is used, the lowest vacuum pressure may be used.

The vacuum adiabatic body includes a first plate defining at least a portion of a wall for the first space and a second plate defining at least a portion of a wall for the second space and having a temperature different from the first space. The first plate may include a plurality of layers. The second plate may include a plurality of layers The vacuum adiabatic body may further include a seal configured to seal the first plate and the second plate so as to provide a third space that is in a vacuum state and has a temperature between a temperature of the first space and a temperature of the second space.

When one of the first plate and the second plate is disposed in an inner space of the third space, the plate may be represented as an inner plate. When the other one of the first plate and the second plate is disposed in an outer space of the third space, the plate may be represented as an outer plate. For example, the inner space of the third space may be a storage room of the refrigerator. The outer space of the third space may be an outer space of the refrigerator.

The vacuum adiabatic body may further include a support that maintains the third space.

The vacuum adiabatic body may further include a conductive resistance sheet connecting the first plate to the second plate to reduce an amount of heat transferred between the first plate and the second plate.

At least a portion of the conductive resistance sheet may be disposed to face the third space. The conductive resistance sheet may be disposed between an edge of the first plate and an edge of the second plate. The conductive resistance sheet may be disposed between a surface on which the first plate faces the first space and a surface on which the second plate faces the second space. The conductive resistance sheet may be disposed between a side surface of the first plate and a side surface of the second plate.

At least a portion of the conductive resistance sheet may extend in a direction that is substantially the same as the direction in which the first plate extends.

A thickness of the conductive resistance sheet may be thinner than at least one of the first plate or the second plate. The more the conductive resistance sheet decreases in thickness, the more heat transfer may decrease between the first plate and the second plate.

The more the conductive resistance sheet decreases in thickness, the more it may be difficult to couple the conductive resistance sheet between the first plate and the second plate.

One end of the conductive resistance sheet may be disposed to overlap at least a portion of the first plate. This is to provide a space for coupling one end of the conductive resistance sheet to the first plate. Here, the coupling method may include welding.

The other end of the conductive resistance sheet may be arranged to overlap at least a portion of the second plate. This is to provide a space for coupling the other end of the conductive resistance sheet to the second plate. Here, the coupling method may include welding.

As another embodiment of replacing the conductive resistance sheet, the conductive resistance sheet may be deleted, and one of the first plate and the second plate may be thinner than the other. In this case, any thickness may be greater than that of the conductive resistance sheet. In this case, any length may be greater than that of the conductive resistance sheet. With this configuration, it is possible to reduce the increase in heat transfer by deleting the conductive resistance sheet. Also, this configuration may reduce difficulty in coupling the first plate to the second plate.

At least a portion of the first plate and at least a portion of the second plate may be disposed to overlap each other. This is to provide a space for coupling the first plate to the second plate. An additional cover may be disposed on any one of the first plate and the second plate, which has a thin thickness. This is to protect the thin plate.

The vacuum adiabatic body may further include an exhaust port for discharging a gas in the vacuum space.

The vacuum adiabatic body may further include a decor disposed outside the conductive resistance sheet.

Here, the decor may be represented as a sealing frame 200 in FIGS. 8 to 29.

FIG. 8 is a cross-sectional perspective view of an edge of the vacuum adiabatic body.

Referring to FIG. 8, a first plate 10, a second plate 20, and a conductive resistance sheet 60 are provided. The conductive resistance sheet 60 may be provided as a thin plate to resist to thermal conduction between the plates 10 and 20. Although the conductive resistance sheet 60 is provided in a flat plane shape as a thin plate, the conductive resistance sheet 60 may have a curved shape by being pulled inward when vacuum is applied to the vacuum space 50.

Since the conductive resistance sheet 60 has the thin plate shape and low strength, the conductive resistance sheet 60 may be damaged by even an external small impact. As a result, when the conductive resistance sheet 60 is damaged, the vacuum of the vacuum space may be broken, and thus, performance of the vacuum adiabatic body may not be properly exerted. To solve this limitation, a sealing frame 200 may be disposed on an outer surface of the conductive resistance sheet 60. According to the sealing frame 200, components of the door 3 or other components may not directly contact the conductive resistance sheet 60 but indirectly contact the conductive resistance sheet 60 through the sealing frame 200 to prevent the conductive resistance sheet 60 from being damaged. To allow the sealing frame 200 to prevent an impact from being applied to the conductive resistance sheet 60, the two portions may be spaced apart from each other, and a buffer may be interposed between the two portions.

To reinforce the strength of the vacuum adiabatic body, a reinforcement may be provided on each of the plates 10 and 20. For example, the reinforcement may include a first reinforcement 100 coupled to an edge of the second plate 10 and a second reinforcement 110 coupled to an edge of the first plate 10. To improve the strength of the vacuum adiabatic body, a portion having a thickness and strength greater than that of the plate 10 may be applied to the reinforcements 100 and 110. The first reinforcement 100 may be provided in an inner space of the vacuum space 50, and the second reinforcement 110 may be provided on an inner surface of the main body 2.

The conductive resistance sheet 60 may not contact the reinforcements 100 and 110. This is done because thermal conductive resistance characteristics generated in the conductive resistance sheet 60 is destroyed by the reinforcements. That is to say, a width of a narrow heat bridge (heat bridge) that resists to the thermal conduction is greatly expanded by the reinforcement, and the narrow heat bridge characteristics are destroyed.

Since the width of the inner space of the vacuum space 50 is narrow, the first reinforcement 100 may be provided in a flat plate shape in cross-section. The second reinforcement 110 provided on the inner surface of the main body 2 may be provided in a shape of which a cross-section is bent.

The sealing frame 200 may include an inner surface 230 disposed in the inner space of the main body 2 and supported by the first plate 10, an outer surface 210 disposed in the outer space of the main body 2 and supported by the second plate 20, and a side surface 220 disposed on a side surface of the edge of the vacuum adiabatic body constituting the main body 2 to cover the conductive resistance sheet 60 and connect the inner surface 230 to the outer surface 210.

The sealing frame 200 may be made of a resin material that is slightly deformable. A mounted position of the sealing frame 200 may be maintained by an interaction between the inner surface 230 and the outer surface 210, i.e., by a holding operation. That is to say, the set position may not be separated.

The position fixing of the sealing frame 200 will be described in detail.

First, movement of the plates 10 and 20 in the extension direction (a y-axis direction in FIG. 8) on the plane may be fixed by being supported by the inner surface 230 by being hooked on the second reinforcement 110. In more detail, the sealing frame 200 may move out of the vacuum adiabatic body by interfering with the inner surface 230 of the second reinforcement 110. On the other hand, the movement of the sealing frame 200 to the inside of the vacuum adiabatic body may be interrupted by at least one operation of a first operation in which the inner surface 230 is hooked to be supported by the second reinforcement 110 (this operation may act in both directions in addition to elastic restoring force of the sealing frame made of a resin), a second operation in which the side surface 220 is stopped with respect to the plate 10, or a third operation in which the inner surface 230 prevents the first plate 10 from moving in the y-axis direction.

The movement of the sealing frame 200 in the vertical extension direction (an x-axis direction in FIG. 8) with respect to the cross-section of the plates 10 and 20 may be fixed by hooking and supporting the outer surface 210 to the second plate 20. In the auxiliary operation, the movement of the sealing frame 200 in the x-axis direction may be interrupted by the operation of hooking the second reinforcement 110 and the folding operation.

The movement of the sealing frame 200 in the extension direction (a z-axis direction in FIG. 8) may be stopped by at least one of a first operation in which the inner surface 230 of one sealing frame 200 contacts the inner surface of the other sealing frame 200 or a second operation in which the inner surface 230 of one sealing frame 200 contacts a mullion 300.

FIGS. 9 and 10 are schematic views of the main body when viewed from the front side. In the drawings, it should be noted that the sealing frame 200 shows a virtual state in which the inner surface 230 is spread in a direction parallel to the side surface 220.

Referring to FIGS. 9 and 10, the sealing frame 200 may include portions 200b and 200e that respectively seal upper and lower edges of the main body 2. The side edge of the main body 2 may be divided according to whether the spaces within the refrigerator, which are divided on the basis of the mullion 300, are separately (in FIG. 9) or integrally (in FIG. 10) sealed.

When the side edge of the main body 2 is separated as illustrated in FIG. 9, it may be divided into four sealing frames 200a, 200c, 200d and 200f. When the side edge of the main body 2 is integrally sealed as illustrated in FIG. 10, it may be divided into two sealing frames 200g and 200c.

When the side edge of the main body 2 is sealed with the two sealing frames 200g and 200c as illustrated in FIG. 10, since two coupling operations may be required, the fabrication may be facilitated. However, it is necessary to cope with such a limitation because there is a risk of a loss of cool air.

In the case of sealing the side edge of the main body 2 with the four sealing frames 200a, 200c, 200d and 200f as illustrated in FIG. 9, four coupling operations may be required, and thus, the fabrication may be inconvenient. However, the thermal conduction may be interrupted to reduce the heat transfer between the separated storage rooms, thereby reducing the loss of the cool air.

The embodiment of the vacuum adiabatic body illustrated in FIG. 8 may be preferably exemplify the vacuum adiabatic body on the main body. However, it does not exclude that it is provided to the door-side vacuum adiabatic body. Since a gasket is installed on the door 3, the sealing frame 200 may be disposed on the main body-side vacuum adiabatic body. In this case, the side surface 220 of the sealing frame 200 may further have an advantage that the gasket provides a sufficient width for the contact.

In more detail, since the width of the side surface 220 is greater than the adiabatic thickness of the vacuum adiabatic body, that is, the width of the vacuum adiabatic body, an adiabatic width of the gasket may be provided at a sufficiently wide width. For example, when the adiabatic thickness of the vacuum adiabatic body is about 10 mm, there is an advantage that the storage space of the refrigerator is enlarged by providing a large storage space in the cavity. However, there is a problem that the gap of about 10 mm does not provide a sufficient gap for the contact of the gasket. In this case, since the side surface 220 provides a wide gap corresponding to the contact area of the gasket, it is possible to effectively prevent the cool air from being lost through the contact interval between the main body 2 and the door 3. That is, when the contact width of the gasket is about 20 mm, even though the width of the side surface 220 may be about 20 mm or more, the side surface 220 may have a width about 20 mm or more to corresponding to the contact width of the gasket.

It may be understood that the sealing frame 200 performs the shielding of the conductive resistance sheet and the sealing function to prevent the cool air from being lost.

FIG. 11 is a cross-sectional view of a contact portion in a state in which the main body is closed by the door.

Referring to FIG. 11, the gasket 80 is disposed between the main body 2 and the door 3. The gasket 80 may be coupled to the door 3 and provided as a portion that is made of a soft deformable material. The gasket 80 includes a magnet as one component. When the magnet approaches by pulling a magnetic body (i.e., a magnetic body of an edge of the main body), a contact surface between the main body 2 and the door 3 may be blocked by the sealing surface having a predetermined width due to the smooth deformation of the gasket 80.

In detail, when a gasket sealing surface 81 of the gasket contacts the side surface 220, a sealing surface 221 of the side surface having a sufficient width may be provided. The sealing surface 221 of the side surface may be defined as a contact surface on the side surface 220 which is in contact with the gasket sealing surface 81 when the gasket 80 contacts the side surface 220.

Thus, it is possible to secure the sealing surfaces 81 and 221 having a sufficient area irrespective of the adiabatic thickness of the vacuum adiabatic body. This is because even if the adiabatic thickness of the vacuum adiabatic body is narrow, and the adiabatic thickness of the vacuum adiabatic body is narrower than the gasket sealing surface 81, if the width of the side surface 220 increases, the sealing surface 221 of the side surface having the sufficient width may be obtained. In addition, the sealing surfaces 81 and 221 having the sufficient area may be ensured irrespective of the deformation of the portion, which may affect the deformation of the contact surface between the main body and the door. This is because it is possible to provide a predetermined clearance in and out of the side surface sealing surface 221 in designing the side surface 220 so that even if the slight deformation occurs between the sealing surfaces 81 and 221, the width and area may be maintained.

In the sealing frame 200, the outer surface 210, the side surface 220, and the inner surface 230 may be provided, and their set positions may be maintained. Briefly, the outer surface 210 and the inner surface 230 may be provided in a shape, i.e., a recessed groove shape that is capable of holding end of the vacuum adiabatic body, more particularly, the plates 10 and 20. Here, it may be understood that the recessed groove has a configuration of a recessed groove as a constitution in which width between the ends of the outer surface 210 and the inner surface 230 is less than the width of the side surface 220.

The coupling of the sealing frame 200 will be briefly described. First, the side surface 220 and the outer surface 210 rotate in the direction of the second plate 20 in a state in which the inner surface 230 is hooked with the second reinforcement 110. Thus, the sealing frame 200 is elastically deformed, and the outer surface 210 may move inward along the outer surface of the second plate 20 to complete the coupling. When the coupling of the sealing frame is completed, the sealing frame may return to its original shape before being deformed. When the coupling is completed, the installation position may be maintained as described above.

Detailed configuration and operation of the sealing frame 200 will be described.

The outer surface 210 is provided with an extension 211 that extends to the outside of the refrigerator (hereinafter, referred to as an outward extension), which extends inward from an end of the second plate 20 and a contact portion 212 outside the refrigerator (hereinafter, referred to as an outside contact portion), which contacts the outer surface of the second plate 20 at an end of the outside extension 211.

The outward extension 211 may have a predetermined length to prevent the outer surface 210 from being separated by external weak force. That is to say, even though the outer surface 210 is forced to be pulled toward the door due to carelessness of the user, the outer surface 210 may not be completely separated from the second plate 20. However, if it is excessively long, there is difficulty in intentional removal at the time of repair, and it is preferable that the length is limited to a predetermined length because the coupling operation becomes difficult.

The outside contact portion 212 may be provided with a structure in which an end of the outside extension 211 is slightly bent toward the outer surface of the second plate 20. Thus, the sealing due to the contact between the outer surface 210 and the second plate 20 may be completed to prevent foreign substances from being introduced.

The side surface 220 is bent at an angle of about 90 degrees from the outer surface 210 toward the opening of the main body 2 and is provided with a width enough to secure the sufficient width of the side surface sealing surface 221. The side surface 220 may be provided thinner than the inner surface 210 and the outer surface 230. This is for the purpose of permitting the elastic deformation at the time of coupling or removing the sealing frame 200 and the purpose of not permitting a distance to cause magnetic force between the magnet disposed on the gasket 80 and the magnetic body on the side of the main body so that the magnetic force is weakened. The side surface 220 may have a purpose of protecting the conductive resistance sheet 60 and arranging an outer appearance as an exposed portion of the outside. When the adiabatic portion is provided inside the side surface 220, the adiabatic performance of the conductive resistance sheet 60 may be reinforced.

The inner surface 230 extends from the side surface 220 in the direction of the inside of the refrigerator, that is, in the rear surface direction of the main body, at about 90 degrees. The inner surface 230 may perform an operation for fixing the sealing frame 200, an operation for installing components that are necessary for operation of a product to which the vacuum adiabatic body is installed, such as a refrigerator, and an operation for preventing an external inflow of foreign substances.

The operation corresponding to each constituent of the inner surface 230 will be described.

The inner surface 230 is provided with an extension 231 that extends to inside of the refrigerator (hereinafter, referred to as an inward extension), which is bent from an inner end of the side surface 220 to extend and a first portion coupling portion 232 bent from an inner end of the inward extension 231, i.e., toward the inner surface of the first plate 10. The first portion coupling portion 232 may contact a protrusion 112 of the second reinforcement 110 so as to be hooked. The inward extension 231 may provide an interval extending toward the inside of the refrigerator so that the first portion coupling portion 232 is hooked with the inside of the second reinforcement 110.

Since the first portion coupling portion 232 is hooked with the second reinforcement 110, the supporting operation of the sealing frame 200 may be realized. The second reinforcement 110 may further include a base 111 coupled to the first plate 10 and a protrusion 112 bent and extending from the base 111. An inertia of the second reinforcement 110 may increase by a structure of the base 111 and the protrusion 112 so that ability to resist the bending strength increases.

The first portion coupling portion 232 and the second portion coupling portion 233 may be coupled to each other. The first and second portion coupling portions 232 and 233 may be provided as separate portions to be coupled to each other or may be provided as a single portion from the design stage.

A gas formation portion 234 that further extends from the inner end of the second portion coupling portion 233 to the inside of the refrigerator may be further provided. The gap formation portion 234 may serve as a portion for providing an interval or space in which components necessary for operation of the appliance such as the refrigerator provided with the vacuum adiabatic body are disposed.

An inclined portion 235 that is inclined to the inside of the refrigerator (hereinafter, referred to as an inward inclined portion) is further provided. The inward inclined portion 235 may be provided so as to be inclined toward the end, that is, toward the first plate 10 toward the inside of the refrigerator. The inward inclined portion 235 may be provided so that a gap between the sealing frame and the first plate becomes smaller inward. Thus, it is possible to secure a space for mounting a component such as a lamp by cooperation with the gap forming portion 234 while minimizing the volume occupying the inner space of the sealing frame 200 as much as possible.

A contact portion 236 within the refrigerator (hereinafter, referred to as an inside contact portion) is disposed on an inner end of the inward inclined portion 235. The inside contact portion 236 may be provided with a structure in which an end of the inward inclined portion 235 is slightly bent toward the inner surface of the second plate 10. Thus, the sealing due to the contact between the inner surface 230 and the second plate 10 may be completed to prevent foreign substances from being introduced.

When an accessory component such as a lamp is installed on the inner surface 230, the inner surface 230 may be divided into two parts to achieve the purpose of the installation convenience of the component. For example, the inner surface 230 may be divided into a first portion for providing the inward extension 231 and the first portion coupling portion 232 and a second portion providing the second portion coupling portion 233, the gap formation portion 234, the inward inclined portion 235, and inside contact portion 236. In a state in which a product such as the lamp is mounted on the second portion, the first portion and the second portion may be coupled to each other in such a manner that the second portion coupling portion 233 is coupled to the first portion coupling portion 232. Alternatively, it does not exclude that the inner surface 230 is provided in more various manners. For example, the inner surface 230 may be provided as a single portion.

FIG. 12 is a cross-sectional view illustrating a contact portion of a main body and a door according to another embodiment. This embodiment is characteristically different in the position of the conductive resistance sheet and accordingly the change of other portions.

Referring to FIG. 12, in this embodiment, the conductive resistance sheet 60 may be provided inside the refrigerator, but not provided on the edge of the end of the vacuum adiabatic body. The second plate 20 may extend over the outside of the refrigerator and the edge of the vacuum adiabatic body. In some cases, the second plate 20 may extend by a predetermined length up to the inside of the refrigerator. In this embodiment, it may be seen that a conductive resistance sheet is provided at a position similar to the conductive resistance sheet of the door-side vacuum adiabatic body illustrated in FIG. 4b.

In this case, the second reinforcement 110 may move to the inside of the refrigerator without contacting the conductive resistance sheet 60 in order not to affect the high thermal conductive adiabatic performance of the conductive resistance sheet 60. This is done for achieving a function of a heat bridge of the conductive resistance sheet. Thus, the conductive resistance sheet 60 and the second reinforcement 110 do not contact each other so that the conductive adiabatic performance by the conductive resistance sheet and the strength reinforcement performance of the vacuum adiabatic body by the reinforcement are achieved at the same time.

In this embodiment, it may be applied to the case in which perfect thermal protection and physical protection for the edge of the vacuum adiabatic body are required.

FIGS. 13 and 14 are partial cutaway perspective views illustrating the coupling of the two portions in the embodiment in which the inner surface is divided into two portions, wherein FIG. 13 is a state in which the coupling is completed, and FIG. 14 is a view illustrating the coupling process.

Referring to FIGS. 13 and 14, a first portion coupling portion 232 is hooked with a protrusion 112 of a second reinforcement 110, and an outer surface 210 is supported by a second plate 20. Thus, a sealing frame 200 may be fixed to an edge of the vacuum adiabatic body.

At least one or more first portion insertion portions 237 that is bent to extend to the inside of the refrigerator may be provided at ends of the first portion coupling portion 232. For example, at least one or more first portion insertion portions 237 may be provided for each sealing frame 200 installed in the refrigerator. A second portion insertion recess 238 may be provided in a position corresponding to the first portion insertion portion 237. The first portion insertion portion 237 and the second portion insertion recess 238 may be similar in size and shape to each other. Thus, the first portion insertion portion 237 may be inserted into the second portion insertion recess 238 and then be fitted and fixed.

The coupling of the first portion and the second portion will be described. In the state in which the first portion is coupled to the edge of the vacuum adiabatic body, the second portion may be aligned with respect to the first portion so that the second portion insertion recess 238 corresponds to the first portion insertion portion 237. When the first portion insertion portion 237 is inserted into the second portion insertion recess 238, the two portions may be coupled to each other.

To prevent the coupled second portion from being separated from the first portion, at least a portion of the second portion insertion recess 238 may have a size less than that of the first portion insertion portion 237. Thus, the two portions may be forcibly fitted. To perform an operation of being hooked and supported after the second portion insertion recess 238 and the first portion insertion portion 237 are inserted by a predetermined depth, a protrusion and a groove may be respectively provided on/in any point after the predetermined depth. Here, after the two portions are inserted at a certain depth, the two portions may be inserted further beyond the jaws to allow the two portions to be more firmly fixed. Here, the worker may feel that he/she is correctly inserted through the feeling.

The two portions constituting the inner surface may be fixed at the position and the coupling relation by the structure in which the two portion are inserted and coupled to each other. Alternatively, when a load is large due to the operation of the second portion that fixes a separator component, the first portion and the second portion may be coupled to each other by a separate coupling portion such as an inner coupling tool 239.

FIG. 15 is a view for sequentially explaining coupling of the sealing frame when the sealing frame is provided in two portions according to an embodiment. Particularly, a case in which a component is installed on the inner surface will be described as an example.

Referring to FIG. 15(a), the sealing frame 200 is coupled to the edge of the vacuum adiabatic body. Here, the coupling may be performed by using elastic deformation of the sealing frame 200 and restoring force due to the elastic deformation without a separate portion such as a screw.

For example, in the state in which the inner surface 230 is hooked with the second reinforcement 110, the side surface 220 and the outer surface 210 rotate in the direction of the second plate 20 by using a connection point between the inner surface 230 and the side surface 220 as a rotation center. This operation may cause elastic deformation of the side surface 220.

Thereafter, the outer surface 210 may move inward from the outer surface of the second plate 20 so that the elastic force of the side surface 220 acts on the outer surface 210 and thus lightly coupled. When the coupling of the sealing frame is completed, the sealing frame may be seated in its original position designed in its original shape designed.

Referring to FIG. 15(b), a state in which the first portion of the sealing frame 200 is completely coupled is shown. The side surface 220 may be formed with a thin thickness when compared to that of each of the outer surface 210 and the inner surface 230 so that the sealing frame 200 is coupled to the edge of the vacuum adiabatic body by the elastic deformation and the elastic restoring operation of the sealing frame.

Referring to FIG. 15(c), a component seating portion 250 as a separate component is provided as the second portion providing the inner surface 230. The component seating portion 250 may be a component on which the component 399 is placed so that its set position is supported, and an additional function that is necessary for the operation of the component 399 may be further performed. For example, in this embodiment, when the component 399 is the lamp, the gap formation portion 234 made of a transparent portion may be disposed on the component seating portion 250. Thus, light irradiated from the lamp may pass through the inner surface 230 and be irradiated into the refrigerator, and the user may identify the article in the refrigerator.

The component seating portion 250 may have a predetermined shape that is capable of being fitted with the component 399 to fix a position of the component 399.

FIG. 15(d) illustrates a state in which the component 399 is paced on the component seating portion 250.

Referring to FIG. 15(e), the component seating portion 250 on which the component 399 is seated is aligned in a predetermined direction so as to be coupled to the first portion providing the inner surface. In this embodiment, the first portion coupling portion 232 and the second portion insertion recess 238 may be aligned with each other in the extension direction so that the first portion coupling portion 232 is inserted into the second portion insertion recess 238. Alternatively, although not limited in this way, it may be advantageously proposed to enhance the ease of assembly.

To allow the first portion coupling portion 232 and the second portion insertion recess 238 to be forcibly fitted with respect to each other, the first portion coupling portion 232 may be slightly larger than the second portion insertion recess 238 and have a hook structure such as a protrusion and a projection so as to realize easy insertion.

Referring to FIG. 15(f), the inner surface in a completely assembled state is illustrated.

FIGS. 16 and 17 are views illustrating one end of the sealing frame, wherein FIG. 16 illustrates a state before a door hinge is installed, and FIG. 17 illustrates a state in which the door hinge is installed.

In the case of the refrigerator, a door hinge is provided at the connection so that the door-side vacuum adiabatic body is rotatably coupled to the main body-side vacuum adiabatic body. The door hinge has to have predetermined strength and also be capable of preventing drooping of the door due to its own weight in a state in which the door is coupled and preventing the main body from being twisted.

Referring to FIG. 16, to couple the door hinge 263, a door coupling tool 260 is provided on the main body-side vacuum adiabatic body. The door coupling tool 260 may be provided in three. The door coupling tool 260 may be directly or indirectly fixed to the second plate 20 and/or the reinforcements 100 and 110 and/or a separate additional reinforcement (for example, an additional plate further provided on the outer surface of the second plate). Here, the expression 'direct' may be referred to as a fusing method such as welding, and the expression 'indirect' may refer to a coupling method using an auxiliary coupling tool or the like instead of the fusion or the like.

Since the door coupling tool 260 requires high supporting strength, the door coupling tool 260 may be coupled to the second plate 20. For this, the sealing frame 200 may be cut, and the sealing frame 200 to be cut may be the upper sealing frame 200b at an upper edge of the main body-side vacuum adiabatic body. Also, the sealing frame 200 may include right sealing frames 200a, 200f, and 200g on a right edge of the main body-side vacuum adiabatic body, and a lower side sealing frame 200e on a lower edge of the main body-side vacuum adiabatic body. If the door installation direction is different, the left sealing frames 200a, 200f, and 200g at the left edge of the main body-side vacuum adiabatic body may be used.

The sealing frame 200 to be cut may have a cutoff surface 261, and the second plate 20 may have a door coupling tool seating surface 262 to which the door coupling tool 260 is coupled. Thus, the sealing frame 220 may be cut to be exposed to the outside of the door coupling tool seating surface 262, and an additional plate may be further inserted into the door coupling tool seating surface 262.

The end of the sealing frame 200 may not be entirely removed, but a portion of the sealing frame 200 may be removed only at a portion at which the door coupling tool 260 is provided. However, it may be more preferable that all the ends of the sealing frame 200 are removed to facilitate the manufacture and to firmly support the door hinge 263 on the side of the vacuum adiabatic body.

FIG. 18 is a view for explaining an effect of the sealing frame according to an embodiment in comparison with the technique according to the related art, wherein FIG. 18(a) is a cross-sectional view of the contact portion of the main body-side vacuum adiabatic body and the door according to an embodiment, and FIG. 18(b) is a cross-sectional view of the main body and the door according to the related art.

Referring to FIG. 18, in the refrigerator, a hot line may be provided at the contact portion between the door and the main body to prevent dew formation due to sharp temperature change. As the hot line is closer to the outer surface and the edge of the main body, the dew condensation may be removed even with small heat capacity.

According to an embodiment, the hot line 270 may be disposed in an inner space of a gap between the second plate 20 and the sealing frame 200. A hot line accommodation portion 271 in which the hot line 270 is disposed may be further provided in the sealing frame 200. Since the hot line 270 is placed outside the conductive resistance sheet 60, an amount of heat transferred to the inside of the refrigerator is small. Thus, the dew condensation on the main body and the door contact portion may be prevented by using smaller heat capacity. In addition, the hot line 270 may be disposed on a relative outside of the refrigerator, i.e., a bent portion between the edge of the main body and the outer surface of the main body to prevent heat from being introduced into the inner space of the refrigerator.

In this embodiment, the side surface 220 of the sealing frame 200 may have a portion w1 that is aligned with the gasket 80 and the vacuum space 50 and a portion w2 that is not aligned with the vacuum space 50 but aligned with the gasket 80 and the inner space of the refrigerator. This is a portion provided by the side surface 220 to ensure sufficient cool air interruption by the magnet. Thus, the sealing effect by the gasket 80 may be sufficiently achieved by the sealing frame 200.

In this embodiment, the inward inclined portion 235 is provided to be inclined toward the inner surface of the first plate 10 at a predetermined angle β. This makes it possible to give the effect in which the capacity within the refrigerator increases so that the narrow space within the refrigerator is more widely used. That is to say, like the related art, the inward inclined portion may be inclined to a direction opposite to the predetermined angle β toward the inner space of the refrigerator to widely utilize a space that is close to the door. For example, more foods may be accommodated in the door, and more space for accommodating various components that are necessary for operation of the device may be defined.

Hereinafter, various examples in which the sealing frame 200 is installed will be described with reference to FIGS. 19 to 24.

Referring to FIG. 19, the second reinforcement 110 may include only a base 111 but do not include a protrusion 112. In this case, a groove 275 may be provided in the base 111. An end of the first portion coupling portion 232 may be inserted into the groove 275. In this embodiment, it may be applied in a case of an article which provides sufficient strength without providing the protrusion 112 on the second reinforcement 110.

In this embodiment, the sealing frame 200 may be coupled to the end of the vacuum adiabatic body by aligning the first portion coupling portion 232 to be inserted into the groove 275 when the sealing frame 200 is coupled.

According to the coupling operation of the groove 275 and the first portion coupling portion 232, the movement of the sealing frame 200 in the y-axis direction may be stopped through only the coupling of the inner surface 230 of the sealing frame 200 and the second reinforcement 110.

Referring to FIG. 20, this embodiment is different from the above-described embodiment of FIG. 19 except that the base 111 is further provided with a reinforcement base 276. A groove 277 may be further provided in the reinforcement base 276 so that an end of the first portion coupling portion 232 is inserted. In this embodiment, even though the second reinforcement 110 is not provided with the protrusion 112 because of an insufficient space or interference with the installation space, it may be applied when it is necessary to reinforce the strength to a predetermined level. That is to say, it may be applied when the strength reinforcement of the main body-side vacuum adiabatic body is provided at a level of strength reinforcement which is obtained by further providing a reinforcement base 276 at the outer end of the base 111.

A groove 277 is provided in the reinforcement base 276, and an end of the first portion coupling portion 232 is inserted into the groove 277 to align the sealing frame 200 with the vacuum adiabatic body. Thus, the sealing frame 200 may be coupled to the end of the vacuum adiabatic body.

According to the coupling operation of the groove 277 and the first portion coupling portion 232, the movement of the sealing frame 200 in the y-axis direction may be stopped through only the coupling of the inner surface 230 of the sealing frame 200 and the second reinforcement 110.

Referring to FIG. 21, this embodiment is different from the above-described embodiment of FIG. 19 except that the base 111 is further provided with a reinforcement protrusion 278. The end of the first portion coupling portion 232 may be hooked on the reinforcement protrusion 278. In this embodiment, even though the second reinforcement 110 is not provided with the protrusion 112 or the reinforcement base 276 because of an insufficient space or interference with the installation space, it may be applied when it is necessary to reinforce the strength to a predetermined level and to allow the first portion coupling portion 232 to be hooked. That is to say, the reinforcement protrusion 278 may be further disposed on an outer end of the base 111 to obtain a strength reinforcement effect of the main body-side vacuum adiabatic body.

Also, the reinforcement protrusion 278 may be applied because it provides a hook operation of the first portion coupling portion 232.

The first portion coupling portion 232 may be hooked to be supported by the reinforcement protrusion 278 so that the sealing frame 200 is coupled to the end of the vacuum adiabatic body.

The embodiment proposed in FIGS. 19 to 21 illustrates a case in which the inner surface 230 is not dived into the first portion and the second portion but is provided as a single product to be coupled to the vacuum adiabatic body. However, this embodiment is not limited thereto. For example, the sealing frame 200 may be divided into the two portions.

Although the second reinforcement 110 is provided in the above embodiment, a case in which the sealing frame 200 is coupled when a separate reinforcement is not provided inside the first plate 10 will be described in the following embodiment.

Referring to FIG. 22, although the first reinforcement 100 is provided to reinforce the strength of the vacuum adiabatic body, the second reinforcement 110 is not provided separately. In this case, an inner protrusion 281 may be provided on the inner surface of the first plate 10 so that the sealing frame 200 is coupled. The inner protrusion 281 may be coupled to the first plate 10 by welding or fitting. This embodiment may be applied to a case in which the sufficient strength of the main body-side vacuum adiabatic body is obtained only by the reinforcement provided in the first reinforcement 100, that is, the inside of the vacuum space 50, and the reinforcement is installed on a side of the second plate 20.

The first portion coupling groove 282 may be provided in the first portion coupling portion 232 so as to be inserted and fixed to the inner protrusion 281. The inner protrusion 281 may be inserted into the first portion coupling groove 282 so that a coupled position of the sealing frame 200 is fixed.

Referring to FIG. 23, it is characteristically different that the first portion coupling groove 282 is not provided as compared with the embodiment illustrated in FIG. 22. According to this embodiment, one end of the first portion coupling portion 232 may be supported by the inner protrusion 281 so that the position of the sealing frame 200 is supported.

When compared to the embodiment proposed in FIG. 22, this embodiment may have a disadvantage in that the movement of the sealing frame 200 is stopped in only one direction, instead that the movement of the sealing frame 200 in the y-axis direction is stopped by the inner protrusion 281 and the first portion coupling groove 282 in both directions. However, an advantage that the worker conveniently works when the sealing frame 200 is coupled may be expected.

In the embodiment proposed in FIGS. 19 to 23, a side of the first plate 10 is fixed, and a side of the second plate 20 is provided with a constituent in which the movement such as sliding or the like is allowed. That is to say, the second plate 20 and the outer surface 210 are allowed to be relatively slidable, and relative movement of the first plate 10 and the inner surface 230 is not allowed. Such the constituent may be configured opposite to each other. Hereinafter, such the constituent will be proposed.

Referring to FIG. 24, an outer protrusion 283 may be provided on the outer surface of the second plate 20, and an outer hook 213 may be provided on the outer surface 210 of the sealing frame 200. The outer hook 213 may be hooked to be supported by the outer protrusion 283.

In case of this embodiment, the inner surface 230 of the sealing frame 200 may be allowed to move with respect to the inner surface of the first plate 10 such as the sliding or the like. In this embodiment, mounting and fixing of the sealing frame 200 are different only in the direction, and the same description may be applied.

Various embodiments may be further proposed in addition to the embodiment related to FIG. 24. For example, the reinforcement 100 and 110 may be further provided on the second plate 20, and various structures of FIGS. 19 to 21 may be provided for the reinforcement. Also, the outer hook 213 may be provided as a groove structure as illustrated in FIG. 22.

According to this embodiment, there is a difference in configuration such that the coupling direction of the sealing frame 200 is provided in the opposite direction of the original embodiment. However, the fundamental function of the sealing frame may be obtained in the same way.

Hereinafter, a description will be given of a constituent in which constitution in which components are installed in a device such as the refrigerator to which the vacuum adiabatic body is applied, and the electric wire is applied to a component.

FIG. 25 is a view observing an upper right side of the main body-side adiabatic body when viewed from a front side.

Referring to FIG. 25, a reinforcement 100, more particularly, a second reinforcement 110 are provided together with the first plate 10 and the second plate 20. The second reinforcement 110 is placed on the inner surface of the first plate 10 to reinforce the strength of the main body-side vacuum adiabatic body. The second reinforcement 110 is provided in a long rod shape along the edge of the vacuum adiabatic body to reinforce the strength of the vacuum adiabatic body.

A slit may be provided in the protrusion 112 of the second reinforcement 110. The slits 115 and 116 serve as holes through which the electric wires pass so that the operator conveniently locates the electric wires. Since the electric wires are disposed in the slits, damage of the electric wires due to bending of the electric wires may be prevented.

The slit may be provided with a first slit 115 provided in the second reinforcement 110 at the edge of the upper surface of the vacuum adiabatic body or a second slit 115 provided in the second reinforcement 11 at the edge of the side surface of the vacuum adiabatic body. The slit may be provided to correspond to a portion through which the electric wire passes and may be disposed at another position of the second reinforcement 110.

In the case of the embodiment, the lamp for illuminating the inside of the refrigerator is exemplified as a component, and the slit may be provided in the end of each edge to guide the electric wire of the component (see reference numeral 399 in FIG. 26).

Since the slits 115 and 116 act as stress concentration points for weakening the strength of the reinforcement, the slits 115 and 116 may not remove the entire protrusion 112 as much as possible but be remove the protrusion up to a height at which the electric wire is led out.

Vertex portions of the slits 115 and 116 may be chamfered to provide smooth rounded-shape. Thus, the electric wire passing through the slit may be prevented from being damaged.

FIGS. 26 and 27 are cross-sectional views of the edge of the vacuum adiabatic body in a state in which a lamp is installed, wherein FIG. 26 is a cross-sectional view of a portion through which an electric wire of the lamp does not pass, and FIG. 27 is a cross-sectional view of a portion through the electric wire of the lamp pass. Hereinafter, the lamp will be described as a component, for example, and referred to as a lamp, but it may be called a component.

Referring to FIGS. 26 and 27, a state in which the component 399 is installed may be confirmed, and the lamp is placed as one component that is necessary for the refrigerator in the gap forming part 234. Electric wires 402 and 403 of the component 399 extend outward at a gap between the inner surface 230 and the second reinforcement 110. In detail, the electric wires 402 and 403 may extend outward from gaps between the first portion coupling portion 232, the second portion coupling portion 233, and the second reinforcement 110.

The end of the second portion coupling portion 233 is spaced a predetermined distance from the base 112 to provide a gap through which the second portion coupling portion 233 pass the electric wire 402. Alternatively. the second portion coupling portion 233 may be provided with a slit such as that provided in the protrusion 112.

Referring to FIG. 26, the first portion coupling portion 232 and the protrusion 112 contact each other to support the sealing frame 200. Referring to FIG. 27, the slits 115 and 116 may extend beyond the ends of the first portion coupling portion 232. The electric wire may be led out of the protrusion 112 through the gap between the slits 115 and 116 and the end of the first portion coupling portion 232. According to the configuration of the slits 115 and 116, the electric wires 402 and 403 may be guided to the outside through the slits. Here, an interference structure capable of damaging the electric wires 402 and 403 may not be provided.

FIG. 28 is an exploded perspective view of a peripheral portion of a component.

Referring to FIG. 28, a component 399, a component fixing frame 400 on which the component 399 is seated, and the sealing frame 200 are illustrated.

The component fixing frame 400 provides a portion of the inner surface 230 of the sealing frame 200. The component fixing frame 400 has components for seating the component 399.

The component fixing frame 400 may have a shape that extends in one direction and may be a portion corresponding to the second portion constituting the inner surface when viewed from a cross-section and may provide the second portion coupling portion 233 and the gap formation portion 234, the inward inclined portion 235, and the inside contact part 236. The above-described functions and operations as described above may be applied as they are when viewed in cross-section.

In the component fixing frame 400, a second portion insertion recess 238 may be provided in the end of the first portion coupling portion 232 at a position corresponding to the first portion insertion portion 237 which is bent to extend to the inside of the refrigerator. The first portion insertion portion 237 and the second portion insertion recess 238 may be similar in size and shape to each other. Thus, the first portion insertion portion 237 may be inserted into the second portion insertion recess 238 and then be fitted and fixed. The first portion insertion portion 237 and the second portion insertion recess 238 may be coupled to each other by an additional internal cooling tool 239. In other cases, the component fixing frame 400 may be directly coupled to the second reinforcement 110.

The inner space of the gap formation portion 234 and the inward inclined portion 235 may form a space in which the component 399 is seated. A seating rib 404 may be disposed on inner surfaces of the gap formation portion 234 and the inward inclined portion 235. The component seating rib 404 may fix the lamp seating position as a portion at which both ends of the lamp are supported.

An electric wire accommodation rib 406 may be provided outside the component seating rib 404. A gap between the component seating rib 404 and the electric wire accommodation rib 406 may provide an electric wire accommodation portion 405. The electric wire accommodation portion 405 provides a space in which the electric wire for applying power to the component 399 is disposed, or a predetermined component that is necessary for the operation of the component 399 is accommodated. The electric wire accommodation ribs 406 and the electric wire accommodation portion 405 may be provided on both sides of the component fixing frame 400. Thus, inventory costs may be reduced through the commonality of the components.

The electric wires 402 and 403, which are led out of the electric wire accommodation portion 405, may pass through the gap between the upper end of the first portion coupling portion 233 and the base 111. The electric wires 402 and 403 may pass through the slits 115 and 116 and led into the gap between the side surface 220 of the sealing frame 200 and the protrusion 112 and then be guided to other places along the gap.

An inclined rib 407 may be disposed on both ends of the component fixing frame 400. The inclined rib 407 are provided so as to be widened backward from a front end of the component fixing frame 400. In the drawings, when referring to an indication line extending along the electric wire along the electric wire accommodation rib 406 and an indication line extending along an end of the inclined rib 407, it will be more clearly understood when referring to an angle γ between the indication lines.

The inclined rib 407 is configured so that the component fixing frame 400 contacts the inner surface 230 of the sealing frame 200 adjacent to the component fixing frame 400 to remove a gap between the portions. Thus, in the case of a refrigerator, it is possible to provide a wider inner space within the refrigerator. For example, the sealing frame 200 adjacent to the component fixing frame 400 may accurately contact corresponding to an inclined angle of the inward inclined portion 235 provided as the reference symbol β in FIG. 18.

FIGS. 29 and 30 are cross-sectional views taken along line A-A' and B-B' in FIG. 28 and are shown in time sequence. The coupling between the sealing frame and the component fixing frame may be understood with reference to FIG. 29, and the alignment of the sealing frame and the component fixing frame may be understood with reference to FIG. 30.

Referring to FIGS. 29 and 30, when the component 399 is placed on the component fixing frame 400, and the component is the lamp on the lower side of the component 399, the gap formation portion 234 may be provided as a transparent portion to emit light. Thus, light irradiated from the lamp may pass through the inner surface 230 and be irradiated into the refrigerator, and the user may identify the article in the refrigerator.

The component fixing frame 400 on which the component 399 is seated is aligned in a predetermined direction so as to be coupled to the sealing frame 200. In this embodiment, the first portion insertion portion 237 and the second portion insertion recess 238 may be aligned with each other in the extending direction of each of the portions so that the first portion insertion portion 237 is inserted into the second portion insertion recess 238.

To allow the first portion insertion portion 237 and the second portion insertion recess 238 to be forcibly fitted with respect to each other, the first portion insertion portion 237 may be slightly larger than the second portion insertion recess 238 and have a hook structure such as a protrusion and a projection so as to realize easy insertion.

A path of the electric wire led out to the outside of the protrusion 112 of the second reinforcement 110 through the slits 115 and 116 will be described.

FIG. 31 is a view observing a portion of an upper portion of the refrigerator when viewed from a front side.

Referring to FIG. 31, the electric wires 402 and 403 led out through the slit 115 may move in any direction along the gap between the protrusion 112 and the side surface 220 of the sealing frame 200.

The moving wiring may led out to the outside through an appropriate position of the wire, for example, a central portion of the top surface. The lead-out wiring may be connected to a controller.

A flow of the cool air in the refrigerator will be described. A refrigerator in which a single vacuum adiabatic body is divided into two accommodation spaces by the mullion 300 will be described as an example of the refrigerator according to an embodiment. An accommodation space having a relatively low temperature may be referred to as a first accommodation space (e.g., a freezing compartment), and an accommodation space having a relatively high temperature may be referred to as a second accommodation space (e.g., a refrigerating compartment). The mullion may be referred to as a partition that partitions a space.

In more detail, the single vacuum adiabatic body may be partitioned vertically by the mullion, and the partitioned upper side may operate as the refrigerating compartment, and the partitioned lower side may operate as the freezing compartment. The evaporator is placed in the freezing compartment. The cool air generated in the evaporator is guided to the upper refrigerating compartment through a predetermined passage structure to create a temperature atmosphere of the refrigerating compartment. Thereafter, the cool air is guided downward from the refrigerating compartment to the evaporator.

FIG. 32 is a front view of the refrigerator according to an embodiment, and FIG. 33 is a rear perspective view of the refrigerator according to an embodiment.

Referring to FIGS. 32 and 33, the evaporator 7 may be placed side by side with a rear surface of the vacuum adiabatic body at a rear side of the space within the refrigerator. A freezing compartment passage guide 700 may be placed in front of the evaporator.

A fan module 503 is provided above an upper portion of the freezing compartment passage guide 700 to discharge air from a rear space to a front space of the freezing compartment passage guide 700. Here, the discharged air may be air cooled through the evaporator, and a flow direction of the air passing through the evaporator may be entirely directed in an upward direction.

The cool air discharged from the fan module 503 may be guided to a predetermined position by the rib 706 provided as a partition wall to perform a cooling operation. The cool air discharged from the fan module 503 may pass through a passage guided to the refrigerating compartment R and a passage guided to the freezing compartment F to perform the cooling operation.

First, a passage of the cool air guided to the refrigerating compartment R will be described.

A portion of the cool air discharged from the fan module 503 is guided along the rib 706 to reach an inlet of a cool air discharge pipe 502. The inlet of the cool air discharge pipe 502 may be disposed at a right side of the fan module 503 when viewed in FIG. 32.

The cool air flowing along the cool air discharge pipe 502 passes through the mullion 300 to reach a lower end of a refrigerating compartment passage guide 550. The refrigerating compartment passage guide 550 may extend vertical in the refrigerating compartment R to evenly discharge the cool air inside the refrigerating compartment.

The air cooling the inner space of the refrigerating compartment R may be introduced into a lower side of the evaporator through first and second cool air collection pipes 501 and 5011. At least a portion of the first and second cool air collection pipes 501 and 5011 is disposed outside both side ends of the evaporator. The first and second cool air collection pipes 501 and 5011 are placed in the spaces of the left and right ends of the rear surface of the inner space of the freezing compartment F. The detailed configuration of the first and second cool air collection pipes 501 and 5011 will be described later. The cool air collection pipe may be abbreviated as a collection pipe.

A passage of the cool air guided to the freezing compartment F will be described.

A portion of the cool air discharged from the fan module 503 is guided along the rib 706 and discharged to freezing compartment discharge holes 703, 704, 705, and 7051. The cool air discharged from the freezing compartment discharge hole may be suctioned into the freezing compartment through first and second freezing compartment-side collection holes 7052 and 7053 after freezing articles within the freezing compartment.

First and second collected cool air suction holes 707 and 708 are provided in rear upper sides of the first and second freezing compartment-side collection holes 7052 and 7053, respectively. The first and second freezing compartment-side collection holes 7052 and 7053 and the first and second collected cool air suction holes 707 and 708 may be provided in the freezing compartment passage guide 700 to provide paths through which the cool air used for the freezing in the freezing compartment F and the cool air used for the refrigerating in the refrigerating compartment R are introduced.

As may be seen, the first and second freezing compartment-side collection holes 7052 and 7053 and the first and second collected cool air suction holes 707 and 708 may be provided in a pair that are balanced at left and right sides of the evaporator. Thus, heat exchange efficiency of the evaporator may be improved.

The first and second collected cool air suction holes 707 and 708 may be connected to discharge sides of the first and second cool air collection pipes 501 and 5011, respectively. Suction sides of the first and second cool air collection pipes 501 and 5011 may be exposed to left and right sides of a lower rear surface of the refrigerating compartment, respectively.

Hereinafter, a configuration and operation of the first and second cool air collection pipes 501 and 5011 will be described in detail. However, only the first cool air collection pipe 501 will be described, and the same description may also be applied to the second cool air collection pipe 5011.

FIGS. 34 to 38 are views of the first cool air collection pipe, wherein FIG. 34 is a front view, FIG. 35 is a front view, FIG. 36 is a left view, FIG. 37 is a rear view, and FIG. 38 is a top view. In FIG. 34, an arrow represents a front direction.

Referring to FIGS. 34 to 38, the first cool air collection pipe 501 may include a head 511 disposed on an upper end, a vertical transfer portion 512 extending from the head 511 to transfer the cool air downward, a side transfer portion 513 extending from a lower portion to a right side of the vertical transfer portion, and a lower base 514 disposed on a lower end of the vertical transfer portion 512.

The lower base 514 may allow the first cool air collection pipe to be situated. The lower base 514 may be provided to have a seal structure and configured so that external air is not introduced into the first cool air collection pipe, and also, internal air is not discharged to the inside of the freezing compartment.

A rear discharge hole 519 may be provided at a lower side of a right rear surface of the side transfer portion 513 to discharge the cool air, which is transferred to a right side, backward.

According to the above-described configuration, a flow of the cool air from the refrigerating compartment to the evaporator may sequentially include a downward flow, a lateral flow, and a backward flow.

A rear side of the head 511 may be blocked, and an upper suction hole 518 is defined in a front side of the head 511 to receive the cool air of the refrigerating compartment. The upper suction hole 518 may be configured to be gradually inclined downward toward the front side. According to the head, there is no obstruction to suction the air inside the refrigerator.

The head 511 is provided to be larger than the vertical transfer portion 512, and a mullion hook protrusion 515 is provided at a lower end of the head 511. The mullion hook protrusion 515 is placed on a top surface of the mullion (see reference numeral 300 in FIG. 43) so that the head 511 is supported on the mullion.

A groove may be provided between the head 511 and the vertical transfer portion 512. The groove may include a side groove 517 and a rear groove 516. The side groove 517 and the rear groove 516 may allow the first cool air collection pipe 501 to be conveniently situated. The side groove 517 and the rear groove 516 may be inserted into the mullion seating frame (see reference numeral 130 of FIG. 42) to be hooked.

A rear discharge hole 519 may be provided in only a lower portion of a rear surface of the side transfer portion 513. This is done for inducing the flow of the air to a lower space of the evaporator if possible to improve the heat exchange efficiency. When the air transferred from the vertical transfer portion 512 flows to the side transfer portion 513, it may also serve to eliminate a bottleneck phenomenon.

As described above, the first and second cool air collection pipes 501 and 5011 have the vertical transfer portions 512 at both sides of the evaporator with the evaporator therebetween. Thus, it is possible to obtain an advantage of increasing in space utilization. In other words, both spaces of the evaporator may be expected to have an advantage of increasing in space utilization in consideration that it is inappropriate as a space for accommodating the articles as the inner cover of the vacuum adiabatic body.

The first and second cool air collection pipes 501 and 5011 sequentially symmetrically perform the downward flow of the cool air, the lateral flow of the cool air, and the backward flow of the cool air. Accordingly, heat exchange by the evaporator may be symmetrically performed at both sides, and heat exchange efficiency may be improved.

Figure 39:
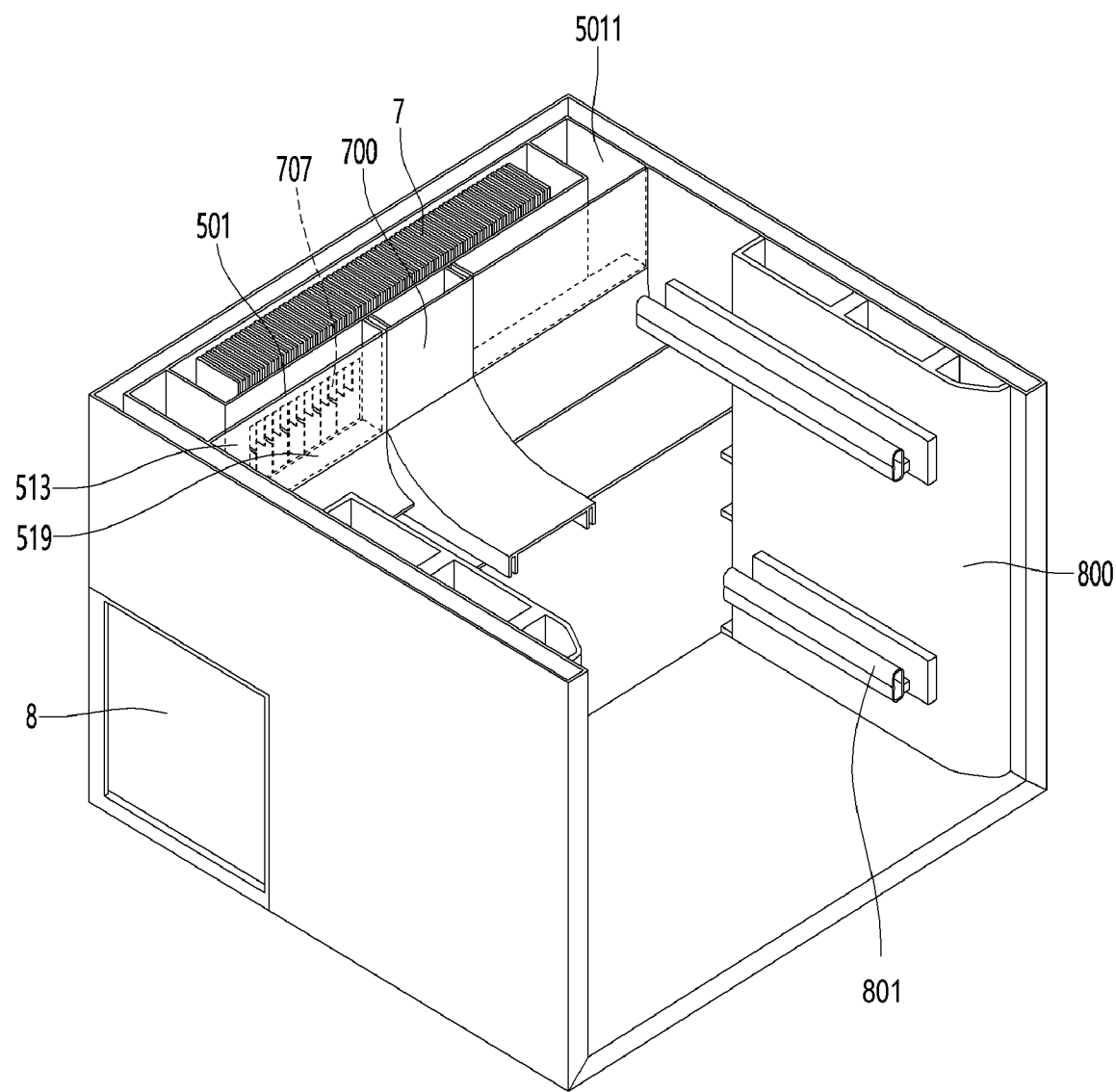
FIG. 39 is a cross-sectional perspective view illustrating a relationship between an evaporator and the cool air collection pipe.

FIGS. 39 and 40 are a cross-sectional perspective view and a cross-sectional view illustrating a relationship between the evaporator and the cool air collection pipe.

Referring to FIGS. 39 and 40, it is possible to create a flow of the cool air returning from the refrigerating compartment by sufficiently utilizing an interval between left and right sides of the evaporator 7. The left and right spaces of the evaporator 7 are a section with little contact with the inner space, and there is less possibility of an irreversible loss due to the heat exchange with the cool air cool air in the freezing compartment.

The air returning from the refrigerating compartment is introduced into the front surface of the evaporator together with the air returning to the freezing compartment. Therefore, when the heat exchange occurs at each place of the evaporator, the irreversible loss due to a nonuniform and large temperature difference may be reduced. In addition, since the air of the discharge-side of the cool air collection pipes 501 and 5011 is equally suctioned from the left and right sides of the evaporator, the irreversible loss may be further reduced.

A side panel 800 and a rail 801 that is capable of being fixed to the side panel 800 may be provided on a side wall providing the freezing compartment F. A shelf may be fixed to the rail 801 so that the shelf is pulled back and forth. It is natural that the side panel 800 is equipped with various components that are necessary for the operation of the freezing compartment as well as the rail.

The side panel 800 may mean any portion which is fixed to a side surface with a flat plate-shaped article and on which a component is mounted.

FIG. 41 is a view for explaining a flow of the cool air in the cool air collection pipe.

Referring to FIG. 41, the cool air used in the refrigerating compartment may be suctioned to flow downward at both left and right sides of the rear lower end of the refrigerating compartment. The cool air flowing downward may flow in a central direction of the evaporator and then be guided backward so as to be transferred to the evaporator.

FIG. 42 is a view for explaining a support relationship between the mullion seating frame and the cool air collection pipe, and FIG. 43 is a view for explaining a state in which the cool air collection pipe is placed in a state in which the mullion is illustrated by a virtual line.

Referring to FIGS. 42 and 43, a mullion seating frame 130 having a portion coupled to the inner surface of the vacuum adiabatic body and a portion extending from the inner space is provided on the inner surface of the vacuum adiabatic body. The mullion seating frame 130 is fitted into the side groove 517 and the rear groove 516 of each of the cool air collection pipes 501 and 5011 so that the two portions are fixed to each other.

In addition to the mullions, the cool air collection pipe may be fixed by the mullion seating frame 130.

The cool air collection pipes 501 and 5011 may pass through the mullion 300 to extend downward. The mullion hook protrusion 515 may be hooked on a top surface of the mullion 300 to support a weight of the mullion. It is preferable that the contact portion between the mullion and the cool air collection pipe is sealed so that an undesired heat loss due to heat exchange between the two spaces does not occur.

Hereinafter, a cool air collection pipe according to another embodiment and a configuration of the cool air collection pipe will be described. Since the cool air collection pipe according to another embodiment and a configuration of the cool air collection pipe are similar to the cool air collection pipe and the component of the cool air collection pipe illustrated in FIGS. 32 to 43, the same description will be applied, and also, the description will be focused on differences.

FIG. 44 is a front perspective view illustrating the cool air collection pipe and a peripheral portion of the cool air collection pipe, and FIG. 45 is a rear perspective view. In the description, only the cool air collection pipe disposed at the left side is illustrated and described, but the cool air collection pipe disposed at the right side may also be included.

Referring to FIGS. 44 and 45, in this embodiment, a cool air collection pipe 521 extends vertically along a side panel 800. The cool air collection pipe 521 may be inserted into the inside of the side panel 800 to extend, may be attached to one side to extend, or may be provided by cutting the side panel 800.

The side panel is spaced apart from both sides of the evaporator, and a rear end of the side panel may be disposed in slightly front of the evaporator for installation of the rail or the like.

Figure 46:
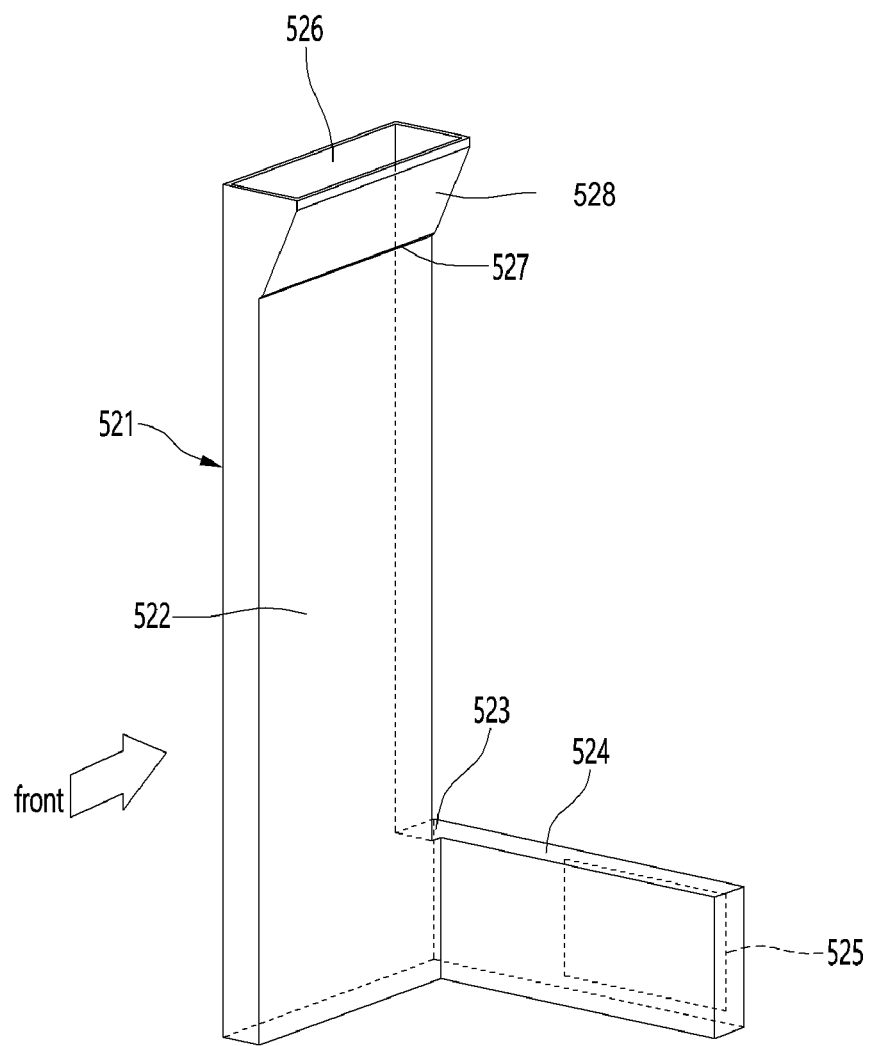

FIGS. 46 to 50 are views of the first cool air collection pipe 521, wherein FIG. 46 is a front perspective view, FIG.

47 is a front view, FIG. 48 is a rear view, FIG. 49 is a side view, and FIG. 50 is a top view. In FIG. 46, an arrow represents a front direction.

Referring to FIGS. 46 to 50, the first cool air collection pipe 521 includes a head 528 in which an upper suction hole 526 that suctions the cool air of the refrigerating compartment is defined, a vertical transfer portion 522 that transfers the cool air introduced into the head 528 downward, a rear transfer portion 523 disposed below the vertical transfer portion 522 to transfer the cool air backward, and a side transfer portion 524 provided at a right side of the rear transfer portion 523 to transfer the cool air in a lateral direction.

A rear discharge hole 525 is provided in the rear of the side transfer portion 524 to guide the cool air to the rear side at which the evaporator is disposed.

According to the above-described configuration, a flow of the cool air from the refrigerating compartment to the evaporator may sequentially include a downward flow, a first backward flow, a lateral flow, and the first backward flow.

The first backward flow is to allow the first cool air collection pipe 521 to be led out toward a rear side of the side panel 800 so as to approach the evaporator. Accordingly, the cool air transfer duct does not occupy the inner space of the freezing compartment F, and the wider inner space of the freezing compartment F may be utilized. The lateral flow is performed immediately after the downward flow. This is done because the first cool air collection pipe 521 invades the inner space, or the side panel has to extend up to the side surface of the evaporator.

The inside of the vertical transfer portion 522 may be provided to be long and narrow. This is done because the side panel 800 is provided narrowly to secure a wide inner space. As described above, the vertical transfer portion 522 is provided narrowly to correspond to the side panel 800, thereby maximally widely securing the inner space.

The vertical transfer portion 522 may be inserted into the side panel 800. The heat exchange between the cool air in the freezing compartment and the cool air in the refrigerator compartment transferred along the vertical transfer portion 522 may be blocked. According to this configuration, the irreversible loss may be reduced to improve efficiency.

A hook protrusion 527 is provided below the head 528 so as to be supported by the mullion.

FIG. 51 is a detailed view illustrating a direction in which the cool air flows along the first cool air collection pipe.

Referring to FIG. 51, the cool air in the refrigerating compartment, which is suctioned through the upper suction hole 526, is transferred downward through the vertical transfer portion 522. Here, the cool air may be transferred along the side panel. For efficient use of the space, improvement of thermal efficiency, and cost reduction, the vertical transfer portion 522 may be disposed inside the side panel 800. In some cases, the vertical transfer portion 522 is not provided separately, and an opened inner wall of the side panel 800 may provide a wall surface of the vertical transfer portion 522.

The air transferred downward is guided backward toward the evaporator.

The air guided backward is directed laterally toward the center of the evaporator.

The air guided laterally is directed backward towards the evaporator.

The suction of the air into the evaporator may be achieved through first and second collected cool air suction holes 707 and 708 provided in a freezing compartment passage guide 700. As described above, the two cool air collection pipes may be provided at the left and right sides, respectively.

FIGS. 52 and 53 are a cross-sectional perspective view and a cross-sectional view illustrating a relationship between the evaporator and the cool air collection pipe.

Referring to FIGS. 52 and 53, it is seen that the space of the side panel 800 is sufficiently utilized to guide the flow of the cool air returning from the refrigerating compartment.

The inner space of the side panel is a section that is thermally insulated from other spaces in the refrigerator, and thus, the irreversible loss may be reduced by the heat exchange with the cold cool air in the freezing compartment.

The air returning from the refrigerating compartment may be introduced into the front surface of the evaporator together with the air returning to the freezing compartment. The irreversible loss may be reduced as compared to the nonuniform heat exchange with respect to each other at different places of the evaporator. Since the discharge-side air of the cool air collection pipes 501 and 5011 are equally suctioned from both sides of the evaporator, the irreversible loss may be further reduced.

The refrigerator of the embodiment may include a first accommodation space having an evaporator 1 disposed along a rear surface. The refrigerator may further include a second accommodation space accommodating the cool air from the first accommodation space. The refrigerator may further include a mullion 300 partitioning the first accommodation space from the second accommodation space. The refrigerator may further include a fan module 503 disposed at one side of the evaporator. The refrigerator may further include a discharge pipe 502 extending from the first accommodation space to the second accommodation space. The refrigerator may further include a cool air collection pipe 501 extending from the second accommodation space to the first accommodation space.

After cooling the air by the evaporator, the cool air may be transferred to the discharge pipe 502 by the fan module 503. The transferred cool air may pass through the mullion 300 along the cool air discharge pipe 502 to reach a lower end of the passage guide 550 of the second accommodation space. The reached cool air may be discharged to the second accommodation space along the passage guide 550 of the second accommodation space extending vertically from the second accommodation space. The discharged cool air may flow into the cool air collection pipe 501 and then be collected toward the evaporator.

The first accommodating space may be provided with a wall surface by the vacuum adiabatic body.

The cool air collection pipe 501 may include a head 511 having a suction hole through which the air is introduced to the second accommodation space. The cool air collection pipe 501 may be disposed at a side surface inside the first accommodation space. The cool air collection pipe 501 may further include a vertical transfer portion 512 extending vertically to transfer the air. The cool air collection pipe 501 may include a side transfer portion 513 extending in a lateral direction from a lower portion of the vertical transfer unit to transfer the air. The cool air collection pipe 501 may further include a rear discharge hole 519 provided in a rear surface of the side transfer unit to discharge the air to the evaporator.

In the case of the general refrigerator, the cool air collection pipe is provided inside an adiabatic wall of the refrigerator. On the contrary, in the embodiment, since the wall of the first accommodation space is provided by the vacuum adiabatic body, it is difficult to form a component including the cool air duct inside the vacuum adiabatic body, that is, in the third space.

Specifically, since there is a component including a support supporting the vacuum adiabatic body in the third space, it may be difficult to locate the cool air duct between the supports in a work process. Also, when the component including the cool air duct is disposed in the third space, it may be difficult to support the component in the third space. Also, the cool air duct may have a size greater than a predetermined size for forming the passage, but a height of the third space may not be large so as to accommodate the duct. The cool air collection pipe may be disposed inside the first accommodation space to reduce such the difficulties.

It may be understood that the inner space of the first accommodation space is divided into a front space, a rear space, a side space, an upper space, and a lower space. When the evaporator is disposed in any one space of the front, rear, side, upper, and lower spaces, the cool air collection pipe may be disposed in the other space of the front, rear, side, upper, and lower spaces. For example, when the evaporator is disposed behind the first accommodation space, the cool air collection pipe may be disposed at a side of the first accommodation space.

That is, when the evaporator is disposed behind the first accommodation space, it may be advantageous that the cool air collection pipe is disposed in a space excluding the rear side of the first accommodation space.

If the cool air collection pipe is disposed behind the first accommodation space together with the evaporator, the cool air collection pipe or the evaporator may not be designed to be sufficiently large due to a space limitation. However, in the case of a small refrigerator having small cooling capacity, the cool air collection pipe may be disposed behind the first accommodation space together with the evaporator.

The side panel 800 disposed on a side surface inside the first accommodation space may be further provided to cover at least a portion of the cool air collection pipe. When the cool air collection pipe is disposed inside the first accommodating space, the side panel may be disposed in consideration of aesthetics when the consumer uses the refrigerator. A component mounting portion to which components are coupled may be disposed on an outer surface of the side panel. The component mounting portion may include a space in which at least one of a shelf, a drawer, a temperature sensor, a lighting, a filter, a basket, an evaporator, a defrosting water tray, and a fan module is coupled.

As a modified example, the side panel 800 in which at least a portion of the cool air collection pipe is provided may be provided. The component mounting portion to which the components are coupled may be provided on the outer surface of the side panel 800.

A freezing compartment passage guide 700 may be further provided in front of the evaporator. At least one of the evaporator and the defrosting water tray may be supported by the cool air passage guide. At least a portion of the cool air passage guide may be coupled to the side panel.

A portion of the upper surface of the side panel 800 may be coupled to the mullion.

It may be difficult to mount the components on an outer surface of the vacuum adiabatic body. To reduce vacuum leakage, each of the first plate and the second plate may be made of a metal material. For this reason, to mount the components on the outer surfaces of the first plate and the second plate, there may be a disadvantage in that the component mounting portion has to be welded. On the other hand, the side panel may be made of a nonmetal material. Various components may be mounted on the side panel. At least a portion of the side panel may be mounted on an outer surface of at least one of the first plate or the second plate.

FIG. 54 is a cross-sectional view for explaining coupling of the side panel and the vacuum adiabatic body.

Referring to FIG. 54, the side panel 800 may be coupled to the inner surface of the vacuum adiabatic body. For this, a side coupling portion 901 may be provided on an inner surface of the first plate 10. The side panel 800 may be coupled to the side coupling portion 901 by using a coupling portion such as a screw. The side coupling portion 901 may be coupled to the first plate 10 by a method such as welding as a boss made of a metal material.

The side coupling portion 901 may be provided on the side surface of the first plate 10. The side surface of the side panel 800 may be coupled to the side coupling portion 901.

Alternatively, the side panel 800 may be coupled to the mullion 300. The side panel 800 may be coupled to the mullion seating frame 130. The mullion seating frame 130 may be coupled to the mullion 300 to provide a portion of the mullion.

At least one of the shelf, the drawer, the temperature sensor, the lighting, the filter, the basket, the evaporator, the defrosting water tray, or the fan module may be coupled to the side panel 800. The freezing compartment passage guide 700 may be coupled to the side panel 800. At least one of the shelf, the drawer, the temperature sensor, the lighting, the filter, the basket, the evaporator, the defrosting water tray, or the fan module may be coupled to the freezing compartment passage guide 700.

To allow the rear surface of the side panel 800 to be coupled, a rear coupling portion 902 may be further provided. The rear coupling portion 902 may be provided on the rear surface of the first plate 10. The rear surface of the side panel 800 may be coupled to the rear coupling portion 902. The coupling and the operation of the rear coupling portion 902 may be provided in the same manner as the side coupling portion 901.

A rear panel may be further provided on the rear surface of the first accommodation space. The rear panel may provide an area for coupling various components. Hereinafter, a configuration related to the rear panel will be described in detail.

FIG. 55 is a schematic view illustrating the inside of the refrigerator in which the rear panel is provided, and FIG. 56 is a perspective view of the rear panel.

Referring to FIGS. 55 and 56, the side panel 800, the rail 801, and the mullion seating frame 130 are provided as in the previous embodiment. A rear panel 920 is coupled to the rear surface of the first accommodation space.

The evaporator 7 and the freezing compartment passage guide 700 are further provided in front of the rear panel 920, but the illustration thereof is omitted.

The rear panel 920 may be coupled to the inner surface of the vacuum adiabatic body, that is, the first plate 10. At least one of the shelf, the drawer, the temperature sensor, the lighting, the filter, the basket, evaporator, the defrosting water tray, the freezing compartment passage guide, or the fan module may be directly or indirectly coupled to the rear panel 920.

As a result, at least one of the shelf, the drawer, the temperature sensor, the lighting, the filter, the basket, the evaporator, the defrosting water tray, or the fan module may be coupled to at least one of the side panel 800, the rear panel 920, or the freezing compartment passage guide 700.

The rear panel 920 may include a rectangular flat frame 921 corresponding to an approximate shape of the rear surface of the freezing compartment and an upper bent portion 922 that is bent forward from an upper end of the flat frame 921. The rear surface of the flat frame 921 may be coupled to the first plate 10. A front surface of the flat frame 921 may be coupled to at least one of various components, which is exemplified by the evaporator.

An adiabatic sheet 930 may be provided between the rear panel 920 and the first plate 10. The adiabatic sheet 930 may be provided by allowing an adiabatic material and an aluminum sheet to overlap each other. The heat adiabatic sheet 930 may block heat transfer between the rear panel 920 and the vacuum adiabatic body.

A refrigerant through portion 923 may be provided in the rear panel 920. A refrigerant pipe may pass through the refrigerant through portion 923. A refrigerant may flow forward and backward through the refrigerant through portion 923. The refrigerant condensed in a machine room 8 may flow forward through the refrigerant through portion 923 of the rear panel 920. The refrigerant evaporated from the evaporator 7 may flow backward through the refrigerant through portion 923 of the rear panel 920.

The refrigerant through portion 923 may be provided in an 'U' shape at an upper end of the rear panel 920 to guide an inlet refrigerant pipe 9421 and an outlet refrigerant pipe 9242, which are aligned vertically.

In the state in which the inlet refrigerant pipe 9421 and the outlet refrigerant pipe 9242 are coupled to the vacuum adiabatic body, the rear panel 920 may be placed on the rear surface of the vacuum adiabatic body. The refrigerant through portion 923 is possible because of avoiding an interference between the inlet refrigerant pipe 9241 and the rear panel 920 and the outlet refrigerant pipe 9242 and the rear panel 920.

A component coupling portion 925 to which various components that are necessary for the operation of the refrigerator are coupled may be provided on the front surface of the rear panel 920. The component coupling portion 925 may be provided in various structures such as a protrusion, a groove, and a recess.

FIG. 57 is a schematic view of the refrigerator in which the rear panel is provided. In FIG. 57, the contents of the previously described embodiment may be applied as it is to descriptions that are not specifically described.

Referring to FIG. 57, the rear panel 920 and the vacuum adiabatic body may be coupled by the rear coupling portion 902. The configuration and operation of the rear coupling portion 902 may be applied as it is as described above.

The adiabatic sheet 930 may be provided between the rear panel 920 and the first plate 10. The adiabatic sheet 930 is illustrated as being provided only on a portion of the rear panel 920, but is not limited thereto. For example, the adiabatic sheet 930 may be provided with respect to an entire surface of the rear panel 920 or may be provided on only a portion that is aligned forward and backward with the evaporator.

The side panel 800 may be coupled to the rear panel 920.

INDUSTRIAL APPLICABILITY

The embodiments may propose the utilization method of each of the constituents of the refrigerator, which are partitioned from each other by mullions, when using the single vacuum adiabatic body.

According to the embodiments, in the refrigerator that requires both refrigerating and freezing, the method of actively controlling the environments in the refrigerator as necessary by using the vacuum adiabatic body may be proposed.

According to the embodiments, the heat exchange loss caused by the cool air returning from the refrigerating compartment may be reduced, and the inner space of the refrigerator may be more efficiently utilized to further develop the refrigerator manufacturing technology using the vacuum adiabatic body.

The invention claimed is:

1. A refrigerator comprising:
   a vacuum adiabatic body that includes:
      a first plate;
      a second plate;
      a sheet that seals the first plate and the second plate, providing a vacuum space; and
      a support configured to maintain the vacuum space;
   a partition configured to divide an interior of the refrigerator into two spaces;
   a partition seating frame configured to support the partition and including a first part coupled to a first wall of the first plate and a second part coupled to a second wall of the second plate, the second wall extending in a direction different from an extending direction of the first wall; and
   a connection pipe extending through the partition and being fixed in position, the connection pipe being configured to fluidly connect the two spaces to each other,
   wherein the connection pipe has a groove into which at least one of the first part of the second part of the partition seating frame is inserted.

2. A refrigerator comprising:
   a first accommodation space in which an evaporator is provided along a rear surface thereof, the first accommodation space being defined by a vacuum adiabatic body;
   a second accommodation space configured to receive cool air from the first accommodation space; and
   a pipe configured to guide air in the second accommodation space toward the evaporator,
   wherein the pipe includes:
      a head having a suction hole that is opened to the second accommodation space to receive the air;
      a vertical transfer duct extending vertically from a side of the evaporator to transfer the air in a vertical direction;
      a side transfer duct extending laterally from a lower region of the vertical transfer duct to transfer the air in a lateral direction; and
      a rear discharge hole defined in a rear surface of the side transfer duct to discharge the air backward toward the evaporator.

3. The refrigerator according to claim 2, further comprising:
   a partition configured to separate the first accommodation space from the second accommodation space; and
   a hook protrusion provided on the pipe and supported on the partition.

4. The refrigerator according to claim 2, wherein the vacuum adiabatic body is further configured to provide a wall defining the second accommodation space, and
   the partition is configured to separate the vacuum adiabatic body.

5. The refrigerator according to claim 4, further comprising a partition seating frame provided on an inner surface of the vacuum adiabatic body to seat the partition,
   wherein the pipe includes a groove into which the partition seating frame is fitted.

6. The refrigerator according to claim 2, wherein refrigerator includes a pair of the pipes that are provided at, respectively, left and right sides of the evaporator.

7. The refrigerator according to claim 2, wherein the vertical transfer duct is positioned at an inner corner of the vacuum adiabatic body.

8. The refrigerator according to claim 2, wherein the vertical transfer duct is provided on a side panel provided in the first accommodation space.

9. The refrigerator according to claim 8, wherein a component configured to support an accommodated item is mounted on the side panel.

10. The refrigerator according to claim 8, wherein the pipe includes a rear transfer duct configured to transfer the air backward between the vertical transfer duct and the side transfer duct.

11. The refrigerator according to claim 8, wherein the vertical transfer duct is accommodated in the side panel.

12. The refrigerator according to claim 2, wherein the evaporator and the side transfer duct are aligned with each other in a front and rear direction.

13. A refrigerator comprising:
a first accommodation space in which an evaporator is disposed along a rear thereof;
a second accommodation space;
a partition configured to separate the first accommodation space from the second accommodation space;
a fan provided at one side of the evaporator;
a discharge pipe extending from the first accommodation space toward the second accommodation space; and
a collection pipe extending from the second accommodation space toward the first accommodation space,
wherein:
air cooled by the evaporator is transferred to the discharge pipe by the fan,
the cooled air moves along the discharge pipe to pass through the partition and to be received at a lower end of a passage guide of the second accommodation space,
the cooled air moves along the passage guide and is discharged into the second accommodation space,
air from the second accommodation space is received by the collection pipe and is guided toward the evaporator, and
at least a portion of the first accommodation space is defined by a vacuum adiabatic body,
wherein the vacuum adiabatic body includes:
a first plate;
a second plate;
a sheet that seals the first plate and the second plate, providing a vacuum space; and
a support configured to maintain the vacuum space;
wherein the collection pipe includes:
a head having a suction hole that is opened to the second accommodation space to receive air;
a vertical transfer duct positioned on a side surface inside the first accommodation space, the vertical transfer duct extending vertically;
a side transfer duct extending laterally from a lower portion of the vertical transfer duct; and
a rear discharge hole defined in a rear surface of the side transfer duct to discharge air toward the evaporator.

14. The refrigerator according to claim 13, further comprising a side panel positioned on the side surface inside the first accommodation space to cover at least a portion of the collection pipe.

15. The refrigerator according to claim 13, further comprising a side panel, wherein a mount is positioned on an inside of the side panel to define a space in which at least a portion of the collection pipe is positioned, and a component is positioned on an outside of the side panel.

16. The refrigerator according to claim 14, further comprising a passage guide at a front side of the evaporator,
wherein at least one of the evaporator or a defrosting water tray is positioned in the passage guide, and
at least a portion of the passage guide is coupled to the side panel.

17. The refrigerator according to claim 14, wherein at least a portion of a top surface of the side panel is coupled to the partition.

18. The refrigerator according to claim 15, wherein the mount is coupled to at least one of a shelf, a drawer, a temperature sensor, a light, a filter, a basket, the evaporator, a defrosting water tray, or a fan module.

19. The refrigerator according to claim 13, further comprising a rear panel defining the rear of the first accommodation space.

20. The refrigerator according to claim 1, wherein the first plate defines a storage space of the refrigerator, and
wherein the first wall of the first plate forms a side wall of the storage space, and the second wall of the first plate forms a rear wall of the storage space.

* * * * *